US012726936B2

(12) United States Patent
Huang

(10) Patent No.: US 12,726,936 B2
(45) Date of Patent: Sep. 1, 2026

(54) REFERENCE SIGNAL TRANSMISSION POSITION INDICATION DETERMINING METHOD AND APPARATUS

(71) Applicant: DATANG MOBILE COMMUNICATIONS EQUIPMENT CO., LTD., Beijing (CN)

(72) Inventor: Qiuping Huang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 332 days.

(21) Appl. No.: 18/553,538

(22) PCT Filed: Mar. 24, 2022

(86) PCT No.: PCT/CN2022/082833
§ 371 (c)(1),
(2) Date: Sep. 29, 2023

(87) PCT Pub. No.: WO2022/213815
PCT Pub. Date: Oct. 13, 2022

(65) Prior Publication Data

US 2024/0188029 A1 Jun. 6, 2024

(30) Foreign Application Priority Data

Apr. 6, 2021 (CN) ......................... 202110368544.3

(51) Int. Cl.
*H04W 64/00* (2009.01)
*H04L 1/1607* (2023.01)
(Continued)

(52) U.S. Cl.
CPC ........... *H04W 64/00* (2013.01); *H04L 1/1642* (2013.01); *H04L 5/0051* (2013.01); *H04W 72/231* (2023.01)

(58) Field of Classification Search
CPC .. H04W 64/00; H04W 72/231; H04L 1/1642; H04L 5/0048; H04L 5/0051; H04L 5/0053; H04L 5/0094
(Continued)

(56) References Cited

U.S. PATENT DOCUMENTS

2020/0275480 A1 8/2020 Wong
2021/0204293 A1 * 7/2021 Shao ..................... H04W 76/11
(Continued)

FOREIGN PATENT DOCUMENTS

CN 110149178 A 8/2019
CN 110650001 A 1/2020
(Continued)

OTHER PUBLICATIONS

State Intellectual Property Office of the People's Republic of China, Notice of Allowance and Search Report issued in application No. 2021103685443 on Jul. 12, 2023.
(Continued)

*Primary Examiner* — Hirdepal Singh
(74) *Attorney, Agent, or Firm* — KILPATRICK TOWNSEND & STOCKTON LLP

(57) ABSTRACT

Disclosed are a reference signal (RS) transmission position indication determining method and apparatus, the method comprising: a network side indicating to a UE at least one set of time unit offset values corresponding to each of configured RS resources; the network side triggering at least one RS resource in the RS resources by means of DCI, and sending first indication information by means of the DCI; the UE determining, according to the first indication information in the DCI, a first time unit offset value corresponding to the at least one RS resource; and determining a transmission position of the corresponding RS resource according to the first time unit offset value. Associations
(Continued)

between the first time unit offset values corresponding to RS resources in the at least one RS resource and first time unit offset value sets corresponding to the RS resources are indicated by using the same first indication information, the first time unit offset values are time unit offset values corresponding to transmission positions of the RS resources, and the first time unit offset value set is one of the at least one set of time unit offset values.

20 Claims, 4 Drawing Sheets

(51) Int. Cl.
*H04L 5/00* (2006.01)
*H04W 72/231* (2023.01)

(58) Field of Classification Search
USPC .......................................................... 455/456.1
See application file for complete search history.

(56) References Cited

U.S. PATENT DOCUMENTS

| | | | | |
|---|---|---|---|---|
| 2022/0078826 | A1* | 3/2022 | Lee | H04L 5/0053 |
| 2022/0330300 | A1* | 10/2022 | Wang | H04W 72/1273 |
| 2023/0033910 | A1* | 2/2023 | Khoshnevisan | H04L 5/0048 |
| 2023/0114925 | A1* | 4/2023 | Yang | H04W 72/0446 |

FOREIGN PATENT DOCUMENTS

| | | | |
|---|---|---|---|
| CN | 110971367 | A | 4/2020 |
| CN | 111885683 | A | 11/2020 |
| EP | 3471327 | A1 | 4/2019 |
| JP | 2023534432 | A | 8/2023 |
| WO | 2020034305 | A1 | 2/2020 |
| WO | 2020084362 | A1 | 4/2020 |
| WO | 2020253641 | A1 | 12/2020 |
| WO | 2021003373 | A1 | 1/2021 |
| WO | 2022011253 | A1 | 1/2022 |

OTHER PUBLICATIONS

China Telecom, "Discussion on SCG deactivation", 3GPP TSG-RAN WG2 Meeting #113-e, Online, Jan 25-Feb. 5, 2021, total 3 pages, R2-2100426.
Japanese Patent Office, Office Action Issued in Application No. 2023-561370, Sep. 2, 2024.
European Patent Office, Extended European Search Report Issued in Application No. 22783882.8, Sep. 23, 2024, Germany, 8 pages.
Notice of Allwance of Corresponding JP Patent Application No. 2023-561370 Mailed Mar. 11, 2025.
Qualcomm Incorporated, "Discussion on SRS enhancement", 3GPP TSG-RAN WG1 Meeting #104-e, R1-2101451, e-Meeting, Jan. 25-Feb. 5, 2021.
Qualcomm Incorporated, "Enhancements on SRS flexibility, switching, coverage and capacity", 3GPP TSG-RAN WG1 Meeting #102-e, R1-2006795, e-Meeting, Aug. 17-28, 2020.
Vivo,"Further discussion on SRS enhancement", 3GPP TSG RAN WG1 #104-e, e-Meeting, Jan. 25-Feb. 5, 2021, total 22 pages, R1-2100426.
Huawei et al.,"Enhancements on SRS for Rel-17", 3GPP TSG RAN WG1Meeting #104-e, E-meeting, Jan. 25-Feb. 5, 2021, total 18 pages, R1-2100213.
Lenovo et al.,"Enhancements on SRS", 3GPP TSG RAN WG1#104-e, e-Meeting, Jan. 25-Feb. 5, 2021, total 10 pages, R1-2100277.
Oppo,"Enhancements on SRS flexibility, coverage and capacity", 3GPP TSG RAN WG1 #104-e, e-Meeting, Jan. 25-Feb. 5, 2021, total 9 pages, R1-2100123.
The office action issued in Korea corresponding application 10-2023-7038048, mailed on Nov. 21, 2025.

* cited by examiner

REFERENCE SIGNAL TRANSMISSION POSITION INDICATION DETERMINING METHOD AND APPARATUS

CROSS-REFERENCE OF RELATED APPLICATIONS

The present application is a National Stage of International Application No. PCT/CN2022/082833 filed Mar. 24, 2022, which claims the priority from Chinese Patent Application No. 202110368544.3, filed with the Chinese Patent Office on Apr. 6, 2021 and entitled "Reference Signal Transmission Position Indication Determining Method and Apparatus", which is hereby incorporated by reference in its entirety.

FIELD

The present application relates to the field of wireless communication technology, and in particular to a reference signal transmission position indication determining method and apparatus.

BACKGROUND

In current wireless communication system, the Aperiodic-Sounding Reference Signal, AP-SRS is triggered by the Downlink Control Information, DCI in the Physical Downlink Control Channel, PDCCH. One DCI for triggering the AP-SRS can trigger one or more SRS resource sets simultaneously. Each SRS resource set includes one or more SRS resources.

In Rel-15 and Rel-16 of New Radio, NR system of 3GPP, a User Equipment, UE transmits the AP-SRS triggered by a DCI in a time slot of $$\left\lfloor n\frac{2^{\mu_{SRS}}}{2^{\mu_{PDCCH}}}\right\rfloor + k$$

after receiving the DCI triggered the AP-SRS in a time slot n, k is a time-slot offset value indicated by a time-slot offset parameter which is configured to a SRS resource set associated to the AP-SRS by a Radio Resource Control, RRC signaling, where $\mu_{SRS}$ and $\mu_{PDCCH}$ are respectively a triggered SRS and a subcarrier configuration parameter of PDCCH carrying a trigger indication. This method for determining a transmission time-slot causes inflexible SRS trigger.

To increase the flexibility of AP-SRS trigger, the NR system of 3GPP uses a following way to determine a time slot for transmitting the AP-SRS: the AP-SRS resource set is transmitted in the $(t+1)^{th}$ available time slot (the value of t can be 0) from a reference time slot. The available time slot for a SRS resource set satisfies two following conditions: a time difference between a transmission time of any SRS resource in the SRS resource set and a transmission time for PDCCH triggering the SRS resource set satisfies a minimum transmission time requirement for the PDCCH triggering the AP-SRS and the AP-SRS; time-domain positions of all SRS resources in the SRS resource set are uplink symbols or flexible symbols in the time slot (that is, time-domain positions of any SRS resource in the SRS resource set are not downlink symbols in the time slot).

In aforementioned implementation, the RRC signaling can configure one SRS resource set with values of t (assuming the number of values is N, N is greater than or equal to 1). The network side indicates the selected value of t to the UE.

The transmission mechanism of the aperiodic-downlink reference signal (e.g. Channel State Information-Reference Signal, CSI-RS, Channel State Information-Interference Measurement, CSI-IM, and etc.) is similar to the transmission mechanism of the aperiodic-uplink AP-SRS in the related art. Currently, specific to a solution of indication for the aperiodic-reference signal transmission position, if there are much more aperiodic-reference signal resource sets, the overhead of DCI domain for transmitting positions is increased, and the demodulating performance of the Physical Downlink Shared Channel, PDSCH is affected by the increased overhead of the PDSCH.

BRIEF SUMMARY

The embodiment of the present application provides a method and device for determining a reference signal RS transmission position indication, which is used to solve the problem that when there are many aperiodic reference signal resource sets in the related art, the overhead of the DCI domain used to transmit the position will be very large, and the increase of the PDSCH overhead affects PDSCH demodulation performance.

In some embodiments of the present application provide a Reference Signal, RS transmission position indication method, including:

- indicating to a User Equipment, UE at least one set of time unit offset values corresponding to RS resources; and
- triggering at least one of the RS resources through Downlink Control Information, DCI, and sending first indication information through the DCI;
- and associations between a first time unit offset value corresponding to each RS resource in the at least one of the RS resources and a first time unit offset value set corresponding to the each RS resource are indicated by a same first indication information, and the first time unit offset value is a time unit offset value corresponding to a transmission position of the each RS resource, and the first time unit offset value set is one of at least one set of time unit offset values.

In some embodiments, the at least one of the RS resources includes RS resources;

- associations between the first time unit offset value corresponding to each RS resource in the at least one of the RS resources and the first time unit offset value set corresponding to the each RS resource are the same; and
- the first indication information indicates one association.

In some embodiments, the associations between the first time unit offset value and the first time unit offset value set include at least one of following:

- the first time unit offset value is a time unit offset value at a first position in the first time unit offset value set;
- the first time unit offset value is a time unit offset value associated with a first triggering state in the first time unit offset value set; or
- the first time unit offset value is a time unit offset value whose identifier is a first identifier in the first time unit offset value set;
- and the first position is a position indicated by the first indication information, the first triggering state is a triggering state indicated by the first indication information, and the first identifier is an identifier indicated by the first indication information.

In some embodiments, the first time unit offset value is a time unit offset value at a first position in the first time unit offset value set, and includes at least one of following:

the first time unit offset value is a time unit offset value of which sequence is a first sequence in the first time unit offset value set; or the first time unit offset value is a time unit offset value corresponding to a first sequence number in the first time unit offset value set;

and the first sequence is a sequence indicated by the first indication information, and the first sequence number is a sequence number indicated by the first indication information.

In some embodiments, the indicating to the UE at least one set of time unit offset values corresponding to the RS resources, includes:

indicating to the UE at least one set of time unit offset values corresponding to the first RS resource set associated with the first RS resource in the RS resources; where the first RS resource is an associated RS resource set, and the associated RS resource set is configured with RS resources of at least one set of time unit offsets, and the first RS resource set is a set of RS resources associated with at least one of the first RS resources and configured with at least one set of time unit offset values;

where the at least one RS resource includes at least one first RS resource, and the first time unit offset value corresponding to the first RS resource is the second time unit offset value corresponding to the first RS resource set associated with the first RS resource, the first time unit offset value set corresponding to the first RS resource is the second time unit offset value set corresponding to the first RS resource set associated with the first RS resource;

the first indication information indicates the association between the second time unit offset value corresponding to at least part of the first RS resource sets associated with each first RS resource in the at least one first RS resource and the second time unit offset value set corresponding to each first RS resource set.

In some embodiments, the first RS resource in the at least one of the RS resources includes first RS resources;

associations between the second time unit offset value corresponding to each first RS resource set associated with the first RS resource in the at least one RS resource and the second time unit offset value set corresponding to each first RS resource set are the same;

the first indication information indicates one association.

In some embodiments, the associations between the second time unit offset value and the second time unit offset value set include at least one of following:

the second time unit offset value is a time unit offset value at a first position in the second time unit offset value set;

the second time unit offset value is a time unit offset value associated with a first triggering state in the second time unit offset value set;

the second time unit offset value is a time unit offset value whose identifier is a first identifier in the second time unit offset value set;

and the first position is a position indicated by the first indication information, the first triggering state is a triggering state indicated by the first indication information, and the first identifier is an identifier indicated by the first indication information.

In some embodiments, the second time unit offset value is a time unit offset value at a first position in the second time unit offset value set, including at least one of following:

the second time unit offset value is a time unit offset value of which sequence is a first sequence in the second time unit offset value set; or the second time unit offset value is a time unit offset value corresponding to a first sequence number in the second time unit offset value set;

and the first sequence is a sequence indicated by the first indication information, and the first sequence number is a sequence number indicated by the first indication information.

In some embodiments, at least one of second time unit offset value sets corresponding to a second RS resource set is a set of time unit offset values corresponding to a triggering state indicated by the DCI;

and the second RS resource set is a first RS resource set satisfying following:

at least parts of triggering states are configured with at least one set of time unit offset values, and the at least parts of triggering states include triggering states indicated by the DCI.

In some embodiments, at least one of second time unit offset value sets corresponding to a first RS resource set includes at least one of following:

a set of time unit offset values including time unit offset values corresponding to each triggering state configured for the second RS resource set; or a set of time unit offset values including all time unit offset values corresponding to the first triggering state configured for the second RS resource set;

and the second RS resource set is a first RS resource set satisfying following:

at least parts of triggering states are configured with at least one set of time unit offset values, and the at least parts of triggering states include triggering states indicated by the DCI;

and the first triggering state is a triggering state when the DCI triggers the first RS resource set.

In some embodiments, the first time unit offset value set corresponding to at least one of the RS resources includes at least one of following:

a set of time unit offset values including time unit offset values corresponding to each triggering state configured for the RS resource; or a set of time unit offset values including all time unit offset values corresponding to a first triggering state configured for a first RS resource;

and the first triggering state is a triggering state when the DCI triggers the RS resource.

In some embodiments, the indicating to the UE at least one set of time unit offset values corresponding to the RS resources, includes:

for at least parts of the RS resources, independently configuring at least one set of time unit offset values corresponding to each RS resource.

In some embodiments, for at least parts of the RS resources, the independently configuring at least one set of time unit offset values corresponding to each RS resource, includes:

for at least one RS resource in the at least parts of the RS resources, independently configuring at least one set of time unit offset values corresponding to at least parts of triggering states.

In some embodiments, the RS resources indicated to the UE include first RS resources; and the indicating to the UE at least one set of time unit offset values corresponding to the RS resources, includes:

for at least parts of first RS resource sets associated with the first RS resources, independently configuring at least one set of time unit offset values corresponding to the respective first RS resource sets.

In some embodiments, the at least parts of first RS resource sets associated with the first RS resources include second RS resource sets; and the independently configuring at least one set of time unit offset values corresponding to the respective first RS resource sets, including:

for at least parts of the second RS resource sets, independently configuring at least one set of time unit offset values corresponding to at least parts of triggering states.

In some embodiments, the indicating to the UE at least one set of time unit offset values corresponding to the RS resources, includes:

indicating to the UE a configuration of the RS resources and at least one set of time unit offset values corresponding to the RS resources through Radio Resource Control, RRC signaling; or indicating to the UE a configuration of the RS resources and at least one set of time unit offset values corresponding to the RS resources through Medium Access Control-Control Element, MAC-CE, signaling; or indicating to the UE a configuration of the RS resources and time unit offset values corresponding to the RS resources through RRC signaling, and indicating to the UE at least one set of time unit offset values in the plurality of time unit offset values corresponding to at least parts of the RS resources through MAC-CE signaling.

In some embodiments, a bitwidth of the first indication information in the DCI is indicated to the UE through RRC signaling or MAC-CE signaling; or a bitwidth of the first indication information in the DCI is a predefined fixed value; or a bitwidth of the first indication information in the DCI is determined according to a quantity of time unit offset values included in the at least one set of time unit offset values.

In some embodiments, the RS resources are RS resources configured for the UE in a Bandwidth Part, BWP/serving cell/frequency band.

In some embodiments of the present application provide a reference signal RS transmission position determination method, including:

according to an indication of a network side, determining at least one set of time unit offset values corresponding to RS resources;

receiving DCI sent by the network side, and determining at least one of the RS resources according to the DCI;

determining a first time unit offset value corresponding to the at least one of the RS resources according to first indication information in the DCI; and determining a transmission position of the at least one of the RS resources according to the first time unit offset value corresponding to the at least one of the RS resource;

and an association between the first time unit offset value corresponding to each RS resource in the at least one of the RS resources and a first time unit offset value set corresponding to the each RS resource is indicated by a same first indication information, and the first time unit offset value is a time unit offset value corresponding to the transmission position of the RS resource, and the first time unit offset value set is one of at least one set of time unit offset values.

In some embodiments, the at least one of the RS resources includes RS resources;

associations between the first time unit offset value corresponding to each RS resource in the at least one of the RS resources and the first time unit offset value set corresponding to the each RS resource are the same; and the first indication information indicates one association.

In some embodiments, the associations between the first time unit offset value and the first time unit offset value set includes at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

and the first position is a position indicated by the first indication information, the first triggering state is a triggering state indicated by the first indication information, and the first identifier is an identifier indicated by the first indication information.

In some embodiments, the first time unit offset value is a time unit offset value at a first position in the first time unit offset value set, including any one of followings.

the first time unit offset value is a time unit offset value of which sequence is a first sequence in the first time unit offset value set; or the first time unit offset value is a time unit offset value corresponding to a first sequence number in the first time unit offset value set;

and the first sequence is a sequence indicated by the first indication information, and the first sequence number is a sequence number indicated by the first indication information.

In some embodiments, the determining at least one set of time unit offset values corresponding to the RS resources, includes:

determining at least one set of time unit offset values corresponding to a first RS resource set associated with a first RS resource in the RS resources indicated by the network side; the first RS resource is an associated RS resource set, and the associated RS resource set is configured with RS resources of at least one set of time unit offset values, the first RS resource set is a set of RS resources associated with at least one of the first RS resources and configured with at least one set of time unit offset values;

and the at least one RS resource includes at least one first RS resource, and the first time unit offset value corresponding to the first RS resource is the second time unit offset value corresponding to the first RS resource set associated the first RS resource, the first time unit offset value set corresponding to the first RS resource is the second time unit offset value set corresponding to the first RS resource set associated with the first RS resource;

the first indication information indicates the association between the second time unit offset value corresponding to at least part of the first RS resource sets associated with each first RS resource in the at least one first RS resource and the second time unit offset value set corresponding to each first RS resource set.

In some embodiments, the first RS resource in the at least one of the RS resources includes first RS resources;

association between the second time unit offset value corresponding to each first RS resource set associated with the first RS resource in at least one RS resource and the second time unit offset value set corresponding to the first RS resource set are the same;

the first indication information indicates one association.

In some embodiments, the associations between the second time unit offset value and the second time unit offset value set include at least one of following:

the second time unit offset value is a time unit offset value at a first position in the second time unit offset value set;

the second time unit offset value is a time unit offset value associated with a first triggering state in the second time unit offset value set;

the second time unit offset value is a time unit offset value whose identifier is a first identifier in the second time unit offset value set;

and the first position is a position indicated by the first indication information, the first triggering state is a triggering state indicated by the first indication information, and the first identifier is an identifier indicated by the first indication information.

In some embodiments, the second time unit offset value is a time unit offset value at a first position in the second time unit offset value set, including at least one of following:

the second time unit offset value is a time unit offset value of which sequence is a first sequence in the second time unit offset value set; or the second time unit offset value is a time unit offset value corresponding to a first sequence number in the second time unit offset value set;

and the first sequence is a sequence indicated by the first indication information, and the first sequence number is a sequence number indicated by the first indication information.

In some embodiments, at least one of second time unit offset value sets corresponding to a second RS resource set is a set of time unit offset values corresponding to a triggering state indicated by the DCI;

and the second RS resource set is a first RS resource set satisfying following:

at least parts of triggering states are configured with at least one set of time unit offset values, and the at least parts of triggering states include triggering states indicated by the DCI.

In some embodiments, the second time unit offset value set corresponding to at least one of first RS resource sets includes at least one of following:

a set of time unit offset values including time unit offset values corresponding to each triggering state configured for the first RS resource set;

a set of time unit offset values including all time unit offset values corresponding to a first triggering state configured for the first RS resource set;

and the first triggering state is a triggering state when the DCI triggers the first RS resource set.

In some embodiments, the first time unit offset value set corresponding to the at least one of the RS resources includes at least one of following:

a set of time unit offset values including time unit offset values corresponding to each triggering state configured for a second RS resource set; or a set of time unit offset values including all time unit offset values corresponding to a first triggering state configured for a second RS resource set;

and the second RS resource set is a first RS resource set satisfying following:

at least parts of triggering states are configured with at least one set of time unit offset values, and the at least parts of triggering states include triggering states indicated by the DCI;

and the first triggering state is a triggering state when the DCI triggers the first RS resource set.

In some embodiments, the according to the indication of the network side, determining the at least one set of time unit offset values corresponding to the RS resources, includes:

determining at least one set of time unit offset values corresponding to the RS resources according to at least one set of time unit offset values corresponding to each RS resource independently configured by the network side for at least parts of the RS resources.

In some embodiments, the according to the indication of the network side, determining the at least one set of time unit offset values corresponding to the RS resources, includes:

determine at least one set of time unit offset values corresponding to the RS resources according to at least one set of time unit offset values corresponding to at least one of parts of the RS resources independently configured by the network side in at least parts of triggering states.

In some embodiments, the RS resources include first RS resources; and the according to the indication of the network side, determining the at least one set of time unit offsets corresponding to the RS resources, includes:

determining at least one set of time unit offset values corresponding to the RS resources according to at least one set of time unit offset values corresponding to the each first RS resource sets independently configured by the network side for the first RS resource set to which at least parts of the first RS resources belong.

In some embodiments, the first RS resource set associated with the at least parts of the first RS resources includes second RS resource sets; and the according to the indication of the network side, determining the at least one set of time unit offset values corresponding to the RS resources, includes:

determining at least one set of time unit offset values corresponding to the RS resources according to at least one set of time unit offset values corresponding to at least parts of the second RS resource sets independently configured by the network side in at least parts of triggering states.

In some embodiments, the according to the indication of the network side, determining at least one set of time unit offset values corresponding to the RS resources, includes:

determining a configuration of the RS resources and at least one set of time unit offset values corresponding the RS resources according to RRC signaling sent by the network side; or determining a configuration of the RS resources and at least one set of time unit offset values corresponding to the RS resources according to MAC-CE signaling sent by the network side; or determining a configuration of the RS resources and time unit offset values corresponding to the RS resources according to RRC signaling sent by the network side, and determining at least one set of time unit offset values in the plurality of time unit offset values corresponding to at least parts of the RS resources according to MAC-CE signaling sent by the network side.

In some embodiments, a bitwidth of the first indication information in the DCI is determined according to RRC signaling or MAC-CE signaling sent by the network side; or a bitwidth of the first indication information in the DCI is a predefined fixed value; or a bitwidth of the first indication information in the DCI is determined according to a quantity of time unit offset values included in the at least one set of time unit offset values.

In some embodiments, the RS resources are RS resources configured for the UE in a Bandwidth Part, BWP/serving cell/frequency band.

In some embodiments, the determining the first time unit offset value corresponding to the at least one of the RS resources according to the first indication information in the DCI, includes at least one of following:

determining a third RS resource that is not configured with at least one set of time unit offset values, and adopting a pre-agreed time unit offset value for the third RS resource;

determining a fourth RS resource of a time unit offset value which corresponds to the association indicated by the first indication information and is not in the first time unit offset value set, and adopting a pre-agreed time unit offset value for the fourth RS resource, or adopting a minimum time unit offset value or a maximum time unit offset value or a time unit offset value of a specified position in the first time unit offset value set corresponding to the fourth RS resource.

In some embodiments of the present application further provide a reference signal RS transmission position indication device including a memory, a transceiver, and a processor:

the memory is configured to store computer programs; the transceiver is configured to send and receive data under the control of the processor; the processor is configured to read the computer programs in the memory and perform following operations:

indicating to a User Equipment, UE at least one set of time unit offset values corresponding to RS resources; and triggering at least one of the RS resources through Downlink Control Information, DCI, and sending first indication information through the DCI;

and associations between a first time unit offset value corresponding to each RS resource in the at least one of the RS resources and a first time unit offset value set corresponding to the each RS resource are indicated by a same first indication information, and the first time unit offset value is a time unit offset value corresponding to a transmission position of the each RS resource, and the first time unit offset value set is one of at least one set of time unit offset values.

In some embodiments, the at least one of the RS resources includes RS resources; associations between the first time unit offset value corresponding to each RS resource in the at least one of the RS resources and the first time unit offset value set corresponding to the each RS resource are the same; and the first indication information indicates one association.

In some embodiments, the associations between the first time unit offset value and the first time unit offset value set includes at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

the first time unit offset value is a time unit offset value of which sequence is a first sequence in the first time unit offset value set; or the first time unit offset value is a time unit offset value corresponding to a first sequence number in the first time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, the processor is configured to:

indicate to the UE at least one set of time unit offset values corresponding to a first RS resource set to which a first RS resource belongs in the RS resources;

and an association between a second time unit offset value corresponding to the first RS resource set and a second time unit offset value set corresponding to the first RS resource set is indicated by the first indication information, and the second time unit offset value is a time unit offset value corresponding to a transmission position of the first RS resource set, and the second time unit offset value set is a set of time unit offset values corresponding to the first RS resource set.

In some embodiments, the first RS resource in the at least one of the RS resources includes first RS resources;

associations between the second time unit offset value corresponding to each first RS resource set and the second time unit offset value set corresponding to the each first RS resource set are the same; and the first indication information indicates one association.

In some embodiments, the associations between the second time unit offset value and the second time unit offset value set include at least one of following:

the second time unit offset value is a time unit offset value at a first position in the second time unit offset value set;

the second time unit offset value is a time unit offset value associated with a first triggering state in the second time unit offset value set;

the second time unit offset value is a time unit offset value whose identifier is a first identifier in the second time unit offset value set;

the second time unit offset value is a time unit offset value of which sequence is a first sequence in the second time unit offset value set;

the second time unit offset value is a time unit offset value corresponding to a first sequence number in the second time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, at least one of second time unit offset value sets corresponding to a second RS resource set is a set of time unit offset values corresponding to a triggering state indicated by the DCI;

and the second RS resource set is a first RS resource set satisfying following:

at least parts of triggering states are configured with at least one set of time unit offset values, and the at least parts of triggering states include triggering states indicated by the DCI.

In some embodiments, at least one of second time unit offset value sets corresponding to a first RS resource set includes at least one of following:

a set of time unit offset values including time unit offset values corresponding to each triggering state configured for a second RS resource set; or a set of time unit offset values including all time unit offset values corresponding to the first triggering state configured for a second RS resource set;

and the second RS resource set is a first RS resource set satisfying following:

at least parts of triggering states are configured with at least one set of time unit offset values, and the at least parts of triggering states include triggering states indicated by the DCI;

and the first triggering state is a triggering state when the DCI triggers the first RS resource set.

In some embodiments, the first time unit offset value set corresponding to the at least one of the RS resources includes at least one of following:

a set of time unit offset values including time unit offset values corresponding to each triggering state configured for the RS resource; or a set of time unit offset values including all time unit offset values corresponding to a first triggering state configured for a first RS resource;

and the first triggering state is a triggering state when the DCI triggers the RS resource.

In some embodiments, the processor is specially configured to:

for at least parts of the RS resources, independently configure at least one set of time unit offset values corresponding to each RS resource.

In some embodiments, the processor is specially configured to:

for at least one RS resource in the at least parts of the RS resources, independently configure at least one set of time unit offset values corresponding to at least parts of the triggering states.

In some embodiments, the RS resources indicated to the UE include first RS resources, and the processor is configured to:

for at least parts of first RS resource sets associated with the first RS resources, independently configure at least one set of time unit offset values corresponding to the respective first RS resource sets.

In some embodiments, the at least parts of first RS resource sets associated with the first RS resources include second RS resource sets, and the processor is configured to:

for at least parts of the second RS resource sets, independently configure at least one set of time unit offset values corresponding to at least parts of triggering states.

In some embodiments, the processor is specially configured to:

indicate to the UE a configuration of the RS resources and at least one set of time unit offset values corresponding to the RS resources through Radio Resource Control, RRC signaling; or indicate to the UE a configuration of the RS resources and at least one set of time unit offset values corresponding to the RS resources through Medium Access Control-Control Element, MAC-CE signaling; or indicate to the UE a configuration of the RS resources and time unit offset values corresponding to the RS resources through RRC signaling, and indicating to the UE at least one set of time unit offset values in the plurality of time unit offset values corresponding to at least parts of the RS resources through MAC-CE signaling.

In some embodiments, a bitwidth of the first indication information in the DCI is indicated to the UE through RRC signaling or MAC-CE signaling; or a bitwidth of the first indication information in the DCI is a predefined fixed value; or a bitwidth of the first indication information in the DCI is determined according to a quantity of time unit offset values included in the at least one set of time unit offset values.

In some embodiments, the RS resources are RS resources configured for the UE in a Bandwidth Part, BWP/serving cell/frequency band.

In some embodiments of the present application further provide a reference signal RS transmission position determination device including a memory, a transceiver, and a processor:

the memory is configured to store computer programs;

the transceiver is configured to send and receive data under the control of the processor; and the processor is configured to read the computer programs in the memory and perform following operations:

according to an indication of a network side, determining at least one set of time unit offset values corresponding to RS resources;

receiving DCI sent by the network side, and determining at least one of the RS resources according to the DCI;

determining a first time unit offset value corresponding to the at least one of the RS resources according to first indication information in the DCI; and determining a transmission position of the at least one of the RS resources according to the first time unit offset value corresponding to the at least one of the RS resource;

and an association between the first time unit offset value corresponding to each RS resource in the at least one of the RS resources and a first time unit offset value set corresponding to the each RS resource is indicated by a same first indication information, and the first time unit offset value is a time unit offset value corresponding to the transmission position of the RS resource, and the first time unit offset value set is one of at least one set of time unit offset values.

In some embodiments, the at least one of the RS resources includes RS resources;

associations between the first time unit offset value corresponding to each RS resource in the at least one of the RS resources and the first time unit offset value set corresponding to the each RS resource are the same; and the first indication information indicates one association.

In some embodiments, the associations between the first time unit offset value and the first time unit offset value set includes at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

the first time unit offset value is a time unit offset value of which sequence is a first sequence in the first time unit offset value set; or the first time unit offset value is a time unit offset value corresponding to a first sequence number in the first time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, the processor is configured to:

determine at least one set of time unit offset values corresponding to a first RS resource set to which a first RS resource belongs in the RS resources indicated by the network side;

and an association between a second time unit offset value corresponding to the first RS resource set and a second time unit offset value set corresponding to the first RS resource set is indicated by the first indication information, and the second time unit offset value is a time unit offset value corresponding to a transmission position of the first RS resource set, and the second time unit offset value set is a set of time unit offset values.

In some embodiments, the first RS resource in the at least one of the RS resources includes first RS resources;

the plurality of first RS resources belong to first RS resource set;

the association between the second time unit offset value corresponding to the first RS resource set and the second time unit offset value set corresponding to the first RS resource set is the same for different first RS resource sets;

the first indication information indicates one association.

In some embodiments, the association between the second time unit offset value and the second time unit offset value set includes at least one of following:

the second time unit offset value is a time unit offset value at a first position in the second time unit offset value set;

the second time unit offset value is a time unit offset value associated with a first triggering state in the second time unit offset value set;

the second time unit offset value is a time unit offset value whose identifier is a first identifier in the second time unit offset value set;

the second time unit offset value is a time unit offset value of which sequence is a first sequence in the second time unit offset value set; or the second time unit offset value is a time unit offset value corresponding to a first sequence number in the second time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, at least one of second time unit offset value sets corresponding to a second RS resource set is a set of time unit offset values corresponding to a triggering state indicated by the DCI;

and the second RS resource set is a first RS resource set satisfying following:

at least parts of triggering states are configured with at least one set of time unit offset values, and the at least parts of triggering states include triggering states indicated by the DCI.

In some embodiments, the second time unit offset value set corresponding to at least one of first RS resource sets includes at least one of following:

a set of time unit offset values including time unit offset values corresponding to each triggering state configured for the first RS resource set; or a set of time unit offset values including all time unit offset values corresponding to a first triggering state configured for the first RS resource set;

and the first triggering state is a triggering state when the DCI triggers the first RS resource set.

In some embodiments, the first time unit offset value set corresponding to the at least one of the RS resources includes at least one of following:

a set of time unit offset values including time unit offset values corresponding to each triggering state configured for a second RS resource set; or a set of time unit offset values including all time unit offset values corresponding to a first triggering state configured for a second RS resource set;

and the second RS resource set is a first RS resource set satisfying following:

at least parts of triggering states are configured with at least one set of time unit offset values, and the at least parts of triggering states include triggering states indicated by the DCI;

and the first triggering state is a triggering state when the DCI triggers the first RS resource set.

In some embodiments, the processor is configured to:

determine at least one set of time unit offset values corresponding to the RS resources according to at least one set of time unit offset values corresponding to each RS resource independently configured by the network side for at least parts of the RS resources.

In some embodiments, the processor is configured to:

determine at least one set of time unit offset values corresponding to the RS resources according to at least one set of time unit offset values corresponding to at least one of parts of the RS resources independently configured by the network side in at least parts of triggering states.

In some embodiments, the RS resources include first RS resources, and the processor is configured to:

determine at least one set of time unit offset values corresponding to the RS resources according to at least one set of time unit offset values corresponding to each first RS resource sets independently configured by the network side for the first RS resource set to which at least parts of the first RS resources belong.

In some embodiments, the first RS resource set associated with the at least parts of the first RS resources includes second RS resource sets, and the processor is configured to:

determine at least one set of time unit offset values corresponding to the RS resources according to at least one set of time unit offset values corresponding to at least parts of the second RS resource sets independently configured by the network side in at least parts of triggering states.

In some embodiments, the processor is configured to:

determine a configuration of the RS resources and at least one set of time unit offset values corresponding the RS resources according to RRC signaling sent by the network side; or determine a configuration of the RS resources and at least one set of time unit offset values corresponding to the RS resources according to MAC-CE signaling sent by the network side; or determine a configuration of the RS resources and time unit offset values corresponding to the RS resources according to RRC signaling sent by the network side, and determining at least one set of time unit offset values in the plurality of time unit offset values corresponding to at least parts of the RS resources according to MAC-CE signaling sent by the network side.

In some embodiments, a bitwidth of the first indication information in the DCI is determined according to RRC signaling or MAC-CE signaling sent by the network side; or a bitwidth of the first indication information in the DCI is a predefined fixed value; or a bitwidth of the first indication information in the DCI is determined according to a quantity of time unit offset values included in the at least one set of time unit offset values.

In some embodiments, the RS resources are RS resources configured for the UE in a Bandwidth Part, BWP/serving cell/frequency band.

In some embodiments, determining the first time unit offset value corresponding to at least one of the RS resources according to the first indication information in the DCI, includes at least one of following:

determining a third RS resource that is not configured with at least one set of time unit offset values, and adopting a pre-agreed time unit offset value for the third RS resource;

determining a fourth RS resource of a time unit offset value which corresponds to the association indicated by the first indication information and is not in the first time unit offset value set, and adopting a pre-agreed time unit offset value for the fourth RS resource, or adopting a minimum time unit offset value or a maximum time unit offset value or a time unit offset value of a specified position in the first time unit offset value set corresponding to the fourth RS resource.

In some embodiments of the present application further provide a reference signal RS transmission position indication device including:

a configuration unit, configured to indicate to a User Equipment, UE at least one set of time unit offset values corresponding to RS resources; and an indication unit, configured to trigger at least one of the RS resources through Downlink Control Information, DCI, and send first indication information through the DCI;

and associations between a first time unit offset value corresponding to each RS resource in the at least one of the RS resources and a first time unit offset value set corresponding to the each RS resource are indicated by a same first indication information, and the first time unit offset value is a time unit offset value corresponding to a transmission position of the each RS resource, and the first time unit offset value set is one of at least one set of time unit offset values.

In some embodiments, the at least one of the RS resources includes RS resources;

associations between the first time unit offset value corresponding to each RS resource in the at least one of the RS resources and the first time unit offset value set corresponding to the each RS resource are the same; and the first indication information indicates one association.

In some embodiments, the associations between the first time unit offset value and the first time unit offset value set include at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

the first time unit offset value is a time unit offset value of which sequence is a first sequence in the first time unit offset value set; or the first time unit offset value is a time unit offset value corresponding to a first sequence number in the first time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, the configuration unit is configured to:

indicate to the UE at least one set of time unit offset values corresponding to a first RS resource set to which a first RS resource belongs in the RS resources;

and an association between a second time unit offset value corresponding to the first RS resource set and a second time unit offset value set corresponding to the first RS resource set is indicated by the first indication information, and the second time unit offset value is a time unit offset value corresponding to a transmission position of the first RS resource set, and the second time unit offset value set is a set of time unit offset values corresponding to the first RS resource set.

In some embodiments, the first RS resource in the at least one of the RS resources includes first RS resources;

associations between the second time unit offset value corresponding to each first RS resource set and the second time unit offset value set corresponding to the each first RS resource set are the same; and the first indication information indicates one association.

In some embodiments, the associations between the second time unit offset value and the second time unit offset value set include at least one of following:

the second time unit offset value is a time unit offset value at a first position in the second time unit offset value set;

the second time unit offset value is a time unit offset value associated with a first triggering state in the second time unit offset value set;

the second time unit offset value is a time unit offset value whose identifier is a first identifier in the second time unit offset value set;

the second time unit offset value is a time unit offset value of which sequence is a first sequence in the second time unit offset value set;

the second time unit offset value is a time unit offset value corresponding to a first sequence number in the second time unit offset value set;

the second time unit offset value is a time unit offset value of which sequence is a first sequence in the second time unit offset value set; or the second time unit offset value is a time unit offset value corresponding to a first sequence number in the second time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, at least one of second time unit offset value sets corresponding to a second RS resource set is a set of time unit offset values corresponding to a triggering state indicated by the DCI;

and the second RS resource set is a first RS resource set satisfying following:

at least parts of triggering states are configured with at least one set of time unit offset values, and the at least parts of triggering states include triggering states indicated by the DCI.

In some embodiments, at least one of second time unit offset value sets corresponding to a first RS resource set includes at least one of following:

a set of time unit offset values including time unit offset values corresponding to each triggering state configured for a second RS resource set; or a set of time unit offset values including all time unit offset values corresponding to a first triggering state configured for a second RS resource set;

and the second RS resource set is a first RS resource set satisfying following:

at least parts of triggering states are configured with at least one set of time unit offset values, and the at least parts of triggering states include triggering states indicated by the DCI;

and the first triggering state is a triggering state when the DCI triggers the first RS resource set.

In some embodiments, the first time unit offset value set corresponding to the at least one of the RS resources includes at least one of following:

a set of time unit offset values including time unit offset values corresponding to each triggering state configured for the RS resource; or a set of time unit offset values including all time unit offset values corresponding to a first triggering state configured for a first RS resource;

and the first triggering state is a triggering state when the DCI triggers the RS resource.

In some embodiments, the configuration unit is specially configured to:

for at least parts of the RS resources, independently configure at least one set of time unit offset values corresponding to each RS resource.

In some embodiments, the configuration unit is specially configured to:

for at least one RS resource in the at least parts of the RS resources, independently configure at least one set of time unit offset values corresponding to at least parts of triggering states.

In some embodiments, the RS resources indicated to the UE include first RS resources, and the configuration unit is specially configured to:

for at least parts of the first RS resource sets associated with the first RS resources, independently configure at least one set of time unit offset values corresponding to the respective first RS resource sets.

In some embodiments, the at least parts of first RS resource sets associated with the first RS resources include second RS resource sets, and the configuration unit is specially configured to:

for at least parts of the second RS resource sets, independently configure at least one set of time unit offset values corresponding to at least parts of triggering states.

In some embodiments, the configuration unit is specially configured to:

indicate the UE a configuration of the RS resources and at least one set of time unit offset values corresponding to the RS resources through Radio Resource Control, RRC signaling; or indicate to the UE a configuration of the RS resources and at least one set of time unit offset values corresponding to the RS resources through Medium Access Control-Control Element, MAC-CE signaling; or indicate to the UE a configuration of the RS resources and time unit offset values corresponding to the RS resources through RRC signaling, and indicate to the UE at least one set of time unit offset values in the plurality of time unit offset values corresponding to at least parts of the RS resources through MAC-CE signaling.

In some embodiments, a bitwidth of the first indication information in the DCI is indicated to the UE through RRC signaling or MAC-CE signaling; or a bitwidth of the first indication information in the DCI is a predefined fixed value; or a bitwidth of the first indication information in the DCI is determined according to a quantity of time unit offset values included in the at least one set of time unit offset values.

In some embodiments, the RS resources are RS resources configured for the UE in a Bandwidth Part, BWP/serving cell/frequency band.

In some embodiments of the present application further provide a reference signal RS transmission position determination device including:

a configuration unit, configured to determine at least one set of time unit offset values corresponding to RS resources;

a triggering unit, configured to receive DCI sent by the network side, and determining at least one of the RS resources according to the DCI;

a time unit offset value determining unit, configured to determine a first time unit offset value corresponding to the at least one of the RS resources according to first indication information in the DCI; and a transmission position determining unit, configured to determine a transmission position of the at least one of the RS resources according to the first time unit offset value corresponding to the at least one of the RS resource;

and, an association between the first time unit offset value corresponding to each RS resource in the at least one of the RS resources and a first time unit offset value set corresponding to the each RS resource is indicated by a same first indication information, and the first time unit offset value is a time unit offset value corresponding to the transmission position of the RS resource, and the first time unit offset value set is one of at least one set of time unit offset values.

In some embodiments, the at least one of the RS resources includes RS resources;

associations between the first time unit offset value corresponding to each RS resource in the at least one of the RS resources and the first time unit offset value set corresponding to the each RS resource are the same; and the first indication information indicates one association.

In some embodiments, the associations between the first time unit offset value and the first time unit offset value set includes at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

the first time unit offset value is a time unit offset value of which sequence is a first sequence in the first time unit offset value set; or the first time unit offset value is a time unit offset value corresponding to a first sequence number in the first time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, the configuration unit is configured to:

determine at least one set of time unit offset values corresponding to a first RS resource set to which a first RS resource belongs in the RS resources indicated by the network side;

and an association between a second time unit offset value corresponding to the first RS resource set and a second time unit offset value set corresponding to the first RS resource set is indicated by the first indication information, and the second time unit offset value is a time unit offset value corresponding to a transmission position of the first RS resource set, and the second time unit offset value set is a set of time unit offset values.

In some embodiments, the first RS resource in the at least one of the RS resources includes first RS resources;

the plurality of first RS resources belong to first RS resource set;

association between the second time unit offset value corresponding to the first RS resource set and the second time unit offset value set corresponding to the first RS resource set is the same for different first RS resource sets;

the first indication information indicates one association.

In some embodiments, the associations between the second time unit offset value and the second time unit offset value set includes at least one of following:

the second time unit offset value is a time unit offset value at a first position in the second time unit offset value set;

the second time unit offset value is a time unit offset value associated with a first triggering state in the second time unit offset value set;

the second time unit offset value is a time unit offset value whose identifier is a first identifier in the second time unit offset value set;

the second time unit offset value is a time unit offset value of which sequence is a first sequence in the second time unit offset value set; or the second time unit offset value is a time unit offset value corresponding to a first sequence number in the second time unit offset value set;

and the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

In some embodiments, at least one of second time unit offset value sets corresponding to a second RS resource set is a set of time unit offset values corresponding to a triggering state indicated by the DCI;

and the second RS resource set is a first RS resource set satisfying following:

at least parts of triggering states are configured with at least one set of time unit offset values, and the at least parts of triggering states include triggering states indicated by the DCI.

In some embodiments, the second time unit offset value set corresponding to at least one of first RS resource sets includes at least one of following:

a set of time unit offset values including time unit offset values corresponding to each triggering state configured for the first RS resource set; or a set of time unit offset values including all time unit offset values corresponding to a first triggering state configured for the first RS resource set;

and the first triggering state is a triggering state when the DCI triggers the first RS resource set.

In some embodiments, the first time unit offset value set corresponding to the at least one of the RS resources includes at least one of following:

a set of time unit offset values including time unit offset values corresponding to each triggering state configured for a second RS resource set; or a set of time unit offset values including all time unit offset values corresponding to a first triggering state configured for a second RS resource set;

and the second RS resource set is a first RS resource set satisfying following:

at least parts of triggering states are configured with at least one set of time unit offset values, and the at least parts of triggering states include triggering states indicated by the DCI;

and the first triggering state is a triggering state when the DCI triggers the first RS resource set.

In some embodiments, the configuration unit is configured to:

determine at least one set of time unit offset values corresponding to the RS resources according to at least one set of time unit offset values corresponding to each RS resource independently configured by the network side for at least parts of the RS resources.

In some embodiments, the configuration unit is configured to:

determine at least one set of time unit offset values corresponding to the RS resources according to at least one set of time unit offset values corresponding to at least one of parts of the RS resources independently configured by the network side in at least parts of triggering states.

In some embodiments, the RS resources include first RS resources, and the configuration unit is configured to:

determining at least one set of time unit offset values corresponding to the RS resources according to at least one set of time unit offset values corresponding to each first RS resource sets independently configured by the network side for the first RS resource set to which at least parts of the first RS resources belong.

In some embodiments, the first RS resource set associated with the at least parts of the first RS resources includes second RS resource sets, and the configuration unit is configured to:

determine at least one set of time unit offset values corresponding to the RS resources according to at least one set of time unit offset values corresponding to at least parts of the second RS resource sets independently configured by the network side in at least parts of triggering states.

In some embodiments, the configuration unit is configured to:

determine a configuration of the RS resources and at least one set of time unit offset values corresponding the RS resources according to RRC signaling sent by the network side; or determine a configuration of the RS resources and at least one set of time unit offset values corresponding to the RS resources according to MAC-CE signaling sent by the network side; or determine a configuration of the RS resources and time unit offset values corresponding to the RS resources according to RRC signaling sent by the network side, and determining at least one set of time unit offset values in the plurality of time unit offset values corresponding to at least parts of the RS resources according to MAC-CE signaling sent by the network side.

In some embodiments, a bitwidth of the first indication information in the DCI is determined according to RRC signaling or MAC-CE signaling sent by the network side; or a bitwidth of the first indication information in the DCI is a predefined fixed value; or a bitwidth of the first indication information in the DCI is determined according to a quantity of time unit offset values included in the at least one set of time unit offset values.

In some embodiments, the RS resources are RS resources configured for the UE in a Bandwidth Part, BWP/serving cell/frequency band.

In some embodiments, the determining the first time unit offset value corresponding to the at least one of the RS resources according to the first indication information in the DCI, includes at least one of following:

determining a third RS resource that is not configured with at least one set of time unit offset values, and adopting a pre-agreed time unit offset value for the third RS resource;

determining a fourth RS resource of a time unit offset value which corresponds to the association indicated by the first indication information and is not in the first time unit offset value set, and adopting a pre-agreed time unit offset value for the fourth RS resource, or adopting a minimum time unit offset value or a maximum time unit offset value or a time unit offset value of a specified position in the first time unit offset value set corresponding to the fourth RS resource.

In some embodiments of the present application further provide a processor-readable storage medium, where the processor-readable storage medium stores computer programs, and the computer programs are used to enable the processor to implement the method for indicating a reference signal RS transmission position described in the embodiments, or implement the method for determining a reference signal RS transmission position described in the embodiments.

The beneficial effects of this application are as follows.

The reference signal RS transmission position indication determination method and device provided in the embodiments of the present application use the same first indication information to indicate the association between the first time unit offset value and the first time unit offset value set for the RS resources triggered by DCI that need to transmit position indications, so to use less DCI signaling to indicate the transmission position of the RS resource, and increase the flexibility of triggering and sending of the RS resource.

DETAILED DESCRIPTION OF THE EMBODIMENTS

In embodiments of the present application, "and/or" describes the association relationship of the associated objects, and indicates that there may be three relationships, for example, A and/or B may represent: only A, both A and B, and only B. The character "/" generally indicates that the associated objects have a kind of "or" relationship.

The term "a plurality of" in embodiments of the present application refers to two or more, and other quantifiers are similar thereto. To increase the flexibility of AP-SRS trigger, 3GPP NR system uses following ways in Rel-17 to determine a time slot for transmitting the AP-SRS: the AP-SRS resource set is transmitted in the $(t+1)^{th}$ available time slot from the reference time slot (t is a time-slot offset value, and can be 0). To the aperiodic downlink reference signal (e.g. CSI-RS, CSI-IM, etc.), similar to the transmission mechanism for the aperiodic uplink SRS, the aperiodic downlink reference signal is transmitted in the $(t+1)^{th}$ available time slot from the reference time slot. The determination way for the reference time slot can be defined by agreement.

After a base station setting the aperiodic RS resource to the UE, how to set a time-slot offset value corresponding to the aperiodic RS source and indicate the time-slot offset value to the UE, may affect the overhead of the DCI. If the aperiodic RS is set with time-slot offset values, the overhead of DCI domain will be very large since the transmission position is indicated by a conventional way as there are lots of triggered aperiodic RS. The increased overhead of PDSCH affects the demodulating performance of the PDSCH.

In view of this, some embodiments of the present application provide a RS transmission position indication determining solution, which may indicate the RS resource transmission position with less DCI signaling, and increase the flexibility of the RS resource trigger and transmission.

Figure 1:
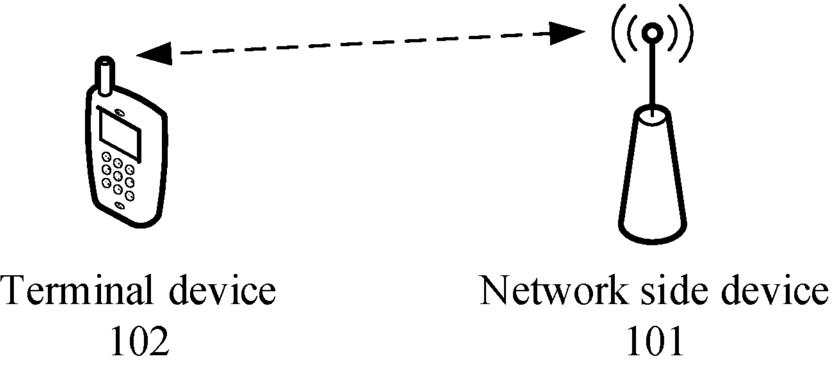
FIG. 1 is a schematic diagram of a system architecture applied by the RS transmission position indication determining method according to an embodiment of the present application.

FIG. 1 illustrates a system architecture applied by the RS transmission position indication determining method according to an embodiment of the present application. As shown in FIG. 1, the system applied by the RS transmission position indication determining method includes a network side device 101 and a terminal device 102.

The system can be various systems including but not being limited to 5G system, 6G system, or other Orthogonal Frequency Division Multiplexing, OFDM systems, Discrete Fourier Transform-Spread-OFDM, DFT-S-OFMD based systems, and etc. Especially to 5G system, for examples, the proper systems can be Global System of Mobile Communication, GSM system, Code division multiple Access, CDMA system, Wideband Code Division Multiple Access, WCDMA system, General packet Radio Service, GPRS system, Long Term Evolution, LTE system, LTE Frequency Division Duplex, FDD system, LTE Time Division Duplex, TDD system, Long Term Evolution Advanced, LTE-A system, Universal Mobile Telecommunication System, UMTS, Worldwide Interoperability for Microwave Access, WiMAX system, 5G NR system and etc. Each aforementioned system includes a terminal device and a network side device. Each aforementioned system may further include a core network portion, such as Evolved Packet System, EPS, 5G system (5GS) and etc.

The terminal device in embodiments of the present application may be a device for providing voice and/or data communication to a user, a handheld device of wireless connection function, or other processing devices connected to a wireless modem and etc. In different systems, names of terminal devices may be also different. For example, in 5G system, the terminal device can be called as a User Equipment, UE. The wireless terminal device can be communicated with one or more Core Network, CN through Radio Access Network, RAN. The wireless terminal device can be a mobile terminal, such as a mobile phone (i.e., cellular phone) and a computer with a mobile terminal, for examples, portable terminal devices, pocket terminal devices, handheld terminal devices, computer built-in terminal devices or vehicle-mounted terminal devices, which exchange languages and/or data with the wireless access network, such as Personal Communication Service, PCS phone, a cordless phone, a Session Initiated Protocol, SIP phone, a Wireless Local Loop, WLL station, a Personal Digital Assistant, PDA and etc. The wireless terminal devices can be also called a system, a subscriber unit, a subscriber station, a mobile station, a mobile, a remote station, an access point, a remote terminal, an access terminal, a user terminal, a user agent, and a user device, which are not limited in embodiments of the present application.

The network side device in embodiments of the present application can be a base station which includes cells for providing services to terminal devices. According to different application scenarios, the base station can be also called an access point, a device connected to the network and communicated with wireless terminal device through one or more sectors in the air interface, or have other names. The network side device can exchange the received air frames with the Internet Protocol, IP groups, and act as a router between the wireless terminal device and other parts of the access network. Other parts of the access network may include IP communication network. The network side device may also coordinate the property management for the air interface. For an example, the network side device in embodiments of the present application can be a network device (Base Transceiver Station, BTS) in the GSM or CDMA, a network device (NodeB) in the WCDMA, an evolutional network device (evolutional NodeB, eNB/e-NodeB) in the LTE system, a 5G base station (gNB) in the 5G network architecture (next generation system), a Home evolved NodeB, HeNB, a relay node, a femto, a pico and etc., which are not limited in embodiments of the present application. In some network structures, the network side device can include a centralized unit, CU node, and a distributed unit, DU node. The CU node and the DU node can be also separately distributed in geography.

The solutions in embodiments of the present application will be clearly and integrally described in combination with the drawings of embodiments of the present application. Described embodiments are only a part of embodiments of the present application, rather than all embodiments.

Figure 2:
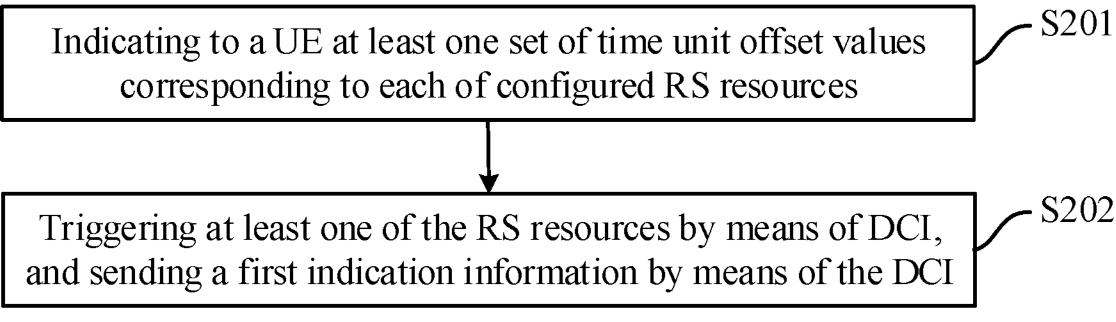
FIG. 2 is a flow diagram of a RS transmission position indication method according to an embodiment of the present application.

Some embodiments of the present disclosure provides a RS transmission position indication method applied to a network side device, as shown in FIG. 2, the method includes:

S201: indicating to a UE at least one set of time unit offset values corresponding to each of configured RS resources.

The RS resources may be aperiodic RS resources, Semi-persistent RS resources, or periodic RS resources. The types of RS resource include but are not limited to SRS resources, CSI-RS resources, CSI-IM resources and etc. Taking an example of the aperiodic RS resources, the aperiodic RS resources may include aperiodic-uplink RS resources, or aperiodic-downlink RS resources. The aperiodic-uplink RS resources include but are not limited to aperiodic SRS resources. The aperiodic-downlink RS resources include but are not limited to aperiodic CSI-RS resources, aperiodic CSI-IM resources. The RS resources in some embodiments of the present disclosure may be any one of aforementioned resources.

S202: triggering at least one of the RS resources by means of DCI, and sending first indication information by means of the DCI.

The first indication information is used for indicating associations between the first time unit offset values corresponding to RS resources in the at least one RS resource and a first time unit offset value set corresponding to the RS resources. The first time unit offset values are time unit offset values corresponding to transmission positions of the RS resources. The first time unit offset value set is one set of time unit offset values.

In some embodiments, the first indication information may indicate the first time unit offset values to the RS resources in the at least one RS resource by indicating the associations between the first time unit offset values corresponding to RS resources in the at least one RS resource and a first time unit offset value set corresponding to the RS resources. By means of indicating the first time unit offset values to the RS resources in the at least one RS resource, the UE can determine time domain transmission positions of the RS resources according to the first time unit offset values.

In the present disclosure, for the RS resources which are triggered by the DCI and need transmission position indication, the same first indication information is used for indicating the associations between the first time unit offset values and a first time unit offset value set corresponding to the RS resources, to use less DCI signaling to indicate to the RS resources the transmission positions, and improve the flexibility of the RS resources triggering and sending.

The first indication information is located in a specified information field of the DCI. The different values of the specified information field can be used to represent different first indication information.

In some embodiments of the present disclosure, a state of the specified information field of the DCI indicates a time unit value of the first time-slot corresponding to which time unit offset value in the first time unit offset value set. It should be understood that the DCI indicates associations between the time unit values of the first time-slot and the first time unit offset value set.

The time unit offset can be represented as a time-slot offset, when the time unit is the time slot.

In one embodiment, the indication information field of the DCI includes but is not limited to at least one of the followings:

(1) a time-slot offset information field for indicating time-slot offset values of the RS resources triggered by the DCI;

(2) a modulation and coding scheme, MCS, indication field, where some states of the MCS indication field are used for indicating a modulation and coding scheme of data scheduled by the DCI, and some states of the MCS indication field are used for indicating the time unit offset values;

(3) an SRS request field, where the SRS request field triggers at least one of the RS resources simultaneously, and indicates RS time-slot offset values.

When the indication information field of the DCI includes the time-slot offset information field for indicating time-slot offset values of the RS resources triggered by the DCI and the MCS indication field, the MCS indication field and the time-slot offset information field can be combined according to indicated information to indicate time domain positions of the RS resources and the associations.

In some embodiments, the DCI triggers the RS resources by triggering the RS resource set associated with the RS resources. That is, the RS resources associated with an RS resource set are triggered in response to the DCI triggering the RS resource set. In one embodiment, one RS resource associating with one RS resource set means the one RS resource is set in the one RS resource set.

In some embodiments, the DCI, meanwhile, triggers some other RS resources except for the at least one RS resource. Other RS resources triggered by the DCI are only configured with one corresponding time unit offset value, or are not configured with a time unit offset value.

In some embodiments, the at least one RS resource includes RS resources. Associations of first time unit offset values corresponding to the RS resources in the at least one RS resource and first time unit offset value sets corresponding to the RS resources are the same. The first indication information indicates an association. For the RS resources in the at least one RS resource, one first indication information indicates an association between a first time unit offset value corresponding to an RS resource and a first time unit offset value set corresponding to the RS resource.

In some embodiments, the time unit is a time slot, a sub time-slot, or a symbol.

In some embodiments, the association between the first time unit offset value and the first time unit offset value set includes at least one of followings.

(1) The first time unit offset value is a time unit offset value located in the first position of the first time unit offset value set. The first position is a position indicated by the first indication information.

The first time unit offset value at the first position of the first time unit offset value set corresponding to the RS resources can be determined by means of the first indication information. When the first indication information indicates an association, the first time unit offset values at a same position of the first time unit offset value set corresponding to the RS resources can be determined by means of the first indication information.

The first time unit offset value is a time unit offset value located in the first position of the first time unit offset value set, especially any one of followings.

1. The first time unit offset value is a time unit offset value with a first sequence in the first time unit offset value set. The first sequence is a sequence indicated by the first indication information.

Assuming the time unit is a time slot, the network side device configures a set of time-slot offset values to three RS resources respectively as {0, 1, 2, 3}, {1, 2}, {2, 3, 4, 5}. These three RS resources are triggered by DCI. When the first indication information carried by the DCI indicates the sequence as 2, the time-slot offset values corresponding to the three RS resources are 1, 2, 3 respectively.

2. The first time unit offset value is a time unit offset value corresponding to a first sequence number in the first time unit offset value set. The first sequence number is a number indicated by the first indication information.

If, to the same sequence number, the network side device configures different time unit offset values to each of the RS resources, the UE can transmit different RS resources over positions of different time unit offset values. The sequence number may be a function of sequence $n=m-k$, n is a sequence, m is a sequence number, k is a natural number less than m (a position of an initial time unit offset value is set to be 1), or k is a natural number less than or equal to m (a position of an initial time unit offset value is set to be 0). Assuming the time unit is a time slot, a position of an initial time-slot offset value is set to be 1. To a set of time-slot offset values, the sequence is $n=m-1$, the network side device configures a set of time-slot offset values to the three RS resources respectively as {0, 1, 2, 3}, {1, 2}, {2, 3, 4, 5}. These three RS resources are triggered by the DCI. When the first indication information carried by the DCI indicates that the sequence number is 1, the time-slot offset values corresponding to the three RS resources are 0, 1, 2 respectively.

(2) The first time unit offset value is a time unit offset value associated with a first triggering state in the first time unit offset value set. The first triggering state is a triggering state indicated by the first indication information.

In some embodiments, the first time unit offset value is predetermined as a time unit offset value associated with the first triggering state in the first time unit offset value set in advance. The first indication information indicates the first triggering state.

When the first indication information indicates an association, a first time unit offset value associated with the first triggering state in the first time unit offset value set corresponding to the RS resources can be determined by means of the first indication information. Assuming the time unit is a time slot, the network side device configures a set of time-slot offset values {2, 5, 4} to the RS resource 1. The triggering state 1 corresponds to the time-slot offset value 2, the triggering state 2 corresponds to the time-slot offset value 5, and the triggering state 3 corresponds to the time-slot offset value 4. The first indication information is used for indicating that the time-slot offset value is 5 in response to the first indication information indicating that the triggering state is 2.

(3) The first time unit offset value is a time unit offset value identified with a first identifier in the first time unit offset value set. The first identifier is an identifier indicated by the first indication information.

When the first indication information indicates an association, the first time unit offset value associated with the first triggering state in the first time unit offset value set corresponding to the RS resources can be determined by means of the first indication information. Assuming the time unit is a time slot, the network side device configures a set of time-slot offset values to one RS resource as {0, 1, 2, 3} respectively corresponding to identifiers {2, 1, 3, 0}. The RS resource is triggered by the DCI. When the first indication information carried by the DCI indicates that the identifier is 0, the time-slot offset value corresponding to the RS resource is 3.

The association indicated by the first indication information can be a combination of aforementioned associations. To be specific, the second association can be combined with any one of other associations. For example, in response to the second association being combined with the first association, the first time unit offset value at the first position under the first triggering state of the first time unit offset value set corresponding to the RS resources can be determined by means of the first indication information. Assuming the time unit is a time slot, the network side device configures the time-slot offset values for the RS resources respectively as: {0, 1, 2, 3} corresponding to the triggering state 1, {1, 2} corresponding to the triggering state 2, and {2, 3, 4, 5} corresponding to the triggering state 3. In response to the RS resource being triggered under the triggering state 2 by the DCI, the first indication information carried by the DCI indicates the time-slot offset value of a sequence 2 under the triggering state 2 as the time-slot offset value corresponding to the RS resource.

In some embodiments, the first indication information indicates that the association between the first time unit offset value and the first time unit offset value set includes at least one of followings.

The first indication information indicates that the first time unit offset value is a time unit offset value at a first position of the first time unit offset value set, or determines according to a pre-agreement that the first time unit offset value is a time unit offset value at a first position indicated by the first indication information in the first time unit offset value set. The first indication information indicates the first position.

The first indication information indicates that the first time unit offset value is a time unit offset value associated with the first triggering state in the first time unit offset value set, or determines according to a pre-agreement that the first time unit offset value is a time unit offset value associated with the first triggering state indicated by the first indication information in the first time unit offset value set. The first indication information indicates the first triggering state.

The first indication information indicates that the first time unit offset value is a time unit offset value whose identifier is a first identifier in the first time unit offset value set, or determines according to a pre-agreement that the first time unit offset value is a time unit offset value whose identifier is a first identifier indicated by the first indication information in the first time unit offset value set. The first indication information indicates the first identifier.

The manner of the pre-agreement may be pre-agreed according to a protocol, or may be that the network side device sends second indication information to a UE. The second indication information indicates that the first time unit offset value is a time unit offset value at a first position/under a first triggering state/associated with a first identifier in the first time unit offset value set, and the first position, the first triggering state or the first identifier is indicated by the first indication information.

If the second indication information is sent, the step of sending the second indication information can be before the step of triggering at least one RS resource in the RS resources and sending the first indication information by the DCI.

In some embodiments, the first indication information indicates that the first time unit offset value is a time unit offset value at a first position in the first time unit offset value set, or determines according to a pre-agreement that the first time unit offset value is a time unit offset value at a first position indicated by the first indication information in the first time unit offset value set; and the first indication information indicates the first position by any one of followings.

The first indication information indicates that the first time unit offset value is a time unit offset value of a first sequence in the first time unit offset value set, or determines according to a pre-agreement that the first time unit offset value is a time unit offset value of a first sequence indicated by the first indication information in the first time unit offset value set. The first indication information indicates the first sequence.

The first indication information indicates that the first time unit offset value is a time unit offset value corresponding to a first sequence number in the first time unit offset value set, or determines according to a pre-agreement that the first time unit offset value is a time unit offset value corresponding to a first sequence number indicated by the first indication information in the first time unit offset value set. The first indication information indicates the first sequence number.

The network side device can indicate at least one set of time unit offset values corresponding to the RS resources to the UE by sending configuration information to the UE.

Indicating at least one set of time unit offset values corresponding to the RS resources to the UE is also called configuring by the UE at least one set of time unit offset values corresponding to the RS resources. There are RS resources. The used configuration schemes are as follows.

Configuration scheme 1: configuring at least one RS resource in the RS resources with at least one set of time unit offset values corresponding to the respective RS resources.

The network side device configures the RS sources with the time unit offset values individually. For example, configuring RS resource 1 with a set of time-slot offset values {0, 1, 2, 3}, configuring RS resource 2 with a set of time-slot offset values {1, 2}, configuring RS resource 3 with a set of time-slot offset values {2, 3, 4, 5}.

Configuration scheme 2: configuring at least one first RS resource in the RS resources, and RS resource sets associated with the respective first RS resources with at least one set of corresponding time unit offset values.

Associating one RS resource with one RS resource set represents that a RS resource list configured in the RS resource set includes the RS resource. Each RS resource can be configured in RS resource lists. That is, each RS resource can be associated to multiple RS resource sets.

The first RS resource is a RS resource existing in a RS resource set associated therewith and the RS resource set associated is configured with RS resources of at least one set of time unit offset values. Each first RS resource set associated with one first RS resource is a RS resource set which is associated with at least one first RS resource, and configured with at least one set of time unit offset values.

In some embodiments, indicating at least one set of time unit offset values corresponding to the RS resources to the UE, includes:

- indicating at least one set of time unit offset values corresponding to the first RS resource set associated with the first RS resource in the RS resources to the UE. The first RS resource is a RS resource existing in a RS resource set associated therewith and the RS resource set associated is configured with RS resources of at least one set of time unit offset values. The first RS resource set is a RS resource set which is associated with at least one first RS resource, and configured with at least one set of time unit offset values;
- where the at least one RS resource includes at least one first RS resource, the first time unit offset value corresponding to the first RS resource is a second time unit offset value corresponding to a first RS resource set associated with the first RS resource, and a first time unit offset value set corresponding to the first RS resource is a second time unit offset value set corresponding to a first RS resource set associated with the first RS resource.

The first indication information indicates associations between second time unit offset values corresponding to at least parts of the first RS resource sets associated with the respective first RS resources in the at least one first RS resource and second time unit offset value sets corresponding to the respective first RS resource sets.

In a specific embodiment, indicating at least one set of time unit offset values corresponding to the respective configured RS resources to the UE, includes:

- indicating at least one set of time unit offset values corresponding to the first RS resource set to which the first RS resource in the RS resources belongs, to the UE.

The first indication information is configured for indicating associations between second time unit offset values corresponding to the first RS resource sets and second time unit offset value sets corresponding to the first RS resource sets. The second time unit offset values are time unit offset values corresponding to transmission positions of the first RS resource sets. The second time unit offset value sets are a set of time unit offset values corresponding to the first RS resource sets.

For example, the network side device configures time unit offset values for the first RS resources according to the first RS resource sets associated with the first RS resources. For example, RS resource 1, RS resource 2, and RS resource 3 are configured in a RS resource list of the RS resource set 1; RS resource 4 and RS resource 5 are configured in a RS resource list in the RS resource set 2. The RS resource set 1 is configured with a set of time-slot offset values {0, 1, 2, 3}; the RS resource set 2 is configured with a set of time-slot offset values {1, 2}.

In some embodiments, when the network side device configures time unit offset values for the first RS resources according to the first RS resource sets associated with the first RS resources, the first time unit offset values corresponding to the first RS resources are the second time unit offset values corresponding to the first RS resource sets associated with the first RS resources, and the first time unit offset value sets corresponding to the first RS resources are the second time unit offset value sets corresponding to the first RS resource sets associated with the first RS resources.

The first indication information indicates associations between the second time unit offset values corresponding to at least parts of first RS resource sets associated with the respective first RS resources in the at least one first RS resource and the second time unit offset value sets corresponding to the respective first RS resource sets.

In some embodiments, at least parts of first RS resource sets associated with one first RS resource are first RS resource sets which are associated with the first RS resources and are triggered by the DCI.

In aforementioned embodiments, the first indication information indicates associations between the first time unit offset values corresponding to the respective first RS resources in the at least one first RS resource and the first time unit offset value sets corresponding to the first RS resources by indicating the associations between the second time unit offset values corresponding to at least parts of first RS resource sets associated with the respective first RS resources in the at least one first RS resource and the second time unit offset value sets corresponding to the respective first RS resource sets.

Taking an example of configuring the RS resource set 1 with a set of time-slot offset values {0, 1, 2, 3}, configuring the RS resource set 2 with a set of time-slot offset values {1, 2}, triggering RS resource 4 and RS resource 5 by DCI, and indicating that the time-slot offset value is 2, the first indication information is configured for indicating an association between the time-slot offset value 2 of the RS resource set 2 and the set of time-slot offset values {1,2}.

In some embodiments, the method according to the embodiments includes:

- the first RS resource in the at least one RS resource includes first RS resources;
- associations between the second time unit offset values corresponding to the first RS resource set associated with the first RS resource in the at least one RS resource and the second time unit offset value sets corresponding to the first RS resource sets are the same to different first RS resource sets; and
- the first indication information indicates one association.

To the respective first RS resource sets associated with the first RS resources in the at least one RS resource, the associations between the second time unit offset values corresponding to the respective first RS resource sets and the second time unit offset value sets corresponding to the respective first RS resource sets by means of one first indication information.

In some embodiments, the associations between the second time unit offset values and the second time unit offset value sets include at least one of followings.

(1) The second time unit offset value is a time unit offset value at a first position of the second time unit offset value set. The first position is a position indicated by the first indication information.

The second time unit offset value at the first position of the second time unit offset value set corresponding to the respective first RS resource sets associated with the first RS resources may be determined via the first indication information. When the first indication information indicates one association, the indication information can be used for determining second time unit offset values at the same position of the second time unit offset value set corresponding to the respective first RS resource sets associated with the first RS resources.

The second time unit offset value is a time unit offset value at the first position of the second time unit offset value set, and is especially any one of followings.

1. The second time unit offset value is a time unit offset value of which the sequence in the second time unit offset value set is the first sequence. The first sequence is a sequence indicated by the first indication information.

Assuming the time unit is a time slot, the network side device configures three RS resource sets with sets of time-slot offset values which are {0, 1, 2, 3}, {1, 2}, {2, 3, 4, 5} respectively. When RS resources in these three RS resource sets are triggered by means of DCI, and the first indication information carried in the DCI indicates that the sequence is 2, time-slot offset values corresponding to the RS resources in these three RS resource sets are 1, 2, 3 respectively.

2. The second time unit offset value is a time unit offset value corresponding to a first sequence number of the second time unit offset value set. The first sequence number is a sequence number indicated by the first indication information.

If, for the same sequence number, different time unit offset values are configured by the network side device to the respective RS resources, the UE can transmit different RS resource sets over different time unit offset positions. The sequence number can be a function of sequence n=m−k, n is a sequence, m is a sequence number, k is a natural number (an initial time unit offset value position is set as 1) less than m, or k is a natural number (an initial time unit offset value position is set as 0) less than or equal to m. Assuming that the time unit is a time slot, the initial time-slot offset value position is set as 1, the sequence is n=m−1 for a set of time-slot offset values, the network side device configures three RS resource sets with sets of time-slot offset values which are {0, 1, 2, 3}, {1, 2}, {2, 3, 4, 5} respectively. When these three RS resource sets are triggered by means of DCI, and the first indication information carried in the DCI indicates that the sequence number is 1, the time-slot offset values corresponding to these three RS resource sets are 0, 1, 2 respectively.

(2) The second time unit offset value is a time unit offset value associated with the first triggering state in the second time unit offset value set. The first triggering state is a triggering state indicated by the first indication information.

When the first indication information indicates one association, the second time unit offset value corresponding to the first triggering state of the second time unit offset value set corresponding to the respective first RS resource sets is determined by means of the first indication information. Assuming that the time unit is a time slot, the network side device configures the RS resource set 1 with a set of time-slot offset values {2, 5, 4}. The triggering state 1 corresponds to a time-slot offset value 2; the triggering state 2 corresponds to a time-slot offset value 5, and the triggering state 3 corresponds to a time-slot offset value 4. When the first indication information indicates that the triggering state is the triggering state 2, the time-slot offset value is indicated as 5.

(3) The second time unit offset value is a time unit offset value of which the identifier is a first identifier in the second time unit offset value set. The first identifier is an identifier indicated by the first indication information.

When the first indication information indicates one association, the second time unit offset value corresponding to the first triggering state of the second time unit offset value set corresponding to the respective first RS resource sets may be determined via the first indication information. Assuming that the time unit is a time slot, the network side device configures a set of time-slot offset values {0, 1, 2, 3} for one RS resource set. The identifiers corresponding to the set of time-slot offset values are {2, 1, 3, 0}. When the RS resources in the RS resource set are triggered by means of DCI, the time-slot offset value corresponding to the RS resource in the RS resource set is 3 in response to an identifier indicated by the first indication information carried by the DCI being 0.

In some embodiments, to aforementioned associations and indication ways, indicating by the first indication information, associations between the second time unit offset values and the second time unit offset value sets, includes at least one of followings.

(1) The first indication information indicates that the second time unit offset value is a time unit offset value at a first position in the second time unit offset value set, or determines according to a pre-agreement that the second time unit offset value is a time unit offset value at a first position indicated by the first indication information in the second time unit offset value set. The first indication information indicates the first position.

(2) The first indication information indicates that the second time unit offset value is a time unit offset value associated with a first triggering state of the second time unit offset value set, or determines according to a pre-agreement that the second time unit offset value is a time unit offset value associated with a first triggering state indicated by the first indication information, of the second time unit offset value set. The first indication information indicates the first triggering state.

(3) The first indication information indicates that the second time unit offset value is a time unit offset value of which an identifier is a first identifier in the second time unit offset value set, or determines according to a pre-agreement that the second time unit offset value is a time unit offset value of which an identifier is a first identifier indicated by the first indication information in the second time unit offset value set. The first indication information indicates the first identifier.

The pre-agreement includes a pre-agreement according to a protocol, or may be that the network side device sends third indication information to a UE. The third indication information indicates that the second time unit offset value is a time unit offset value at a first position/under a first triggering state/associated with a first identifier in the second time unit offset value set, and the first position, the first triggering state or the first identifier is indicated by the first indication information.

If the third indication information is sent, the step of sending the third indication information can be before the S202 of "triggering at least one of the RS resources by means of DCI, and sending first indication information by means of the DCI".

In some embodiments, the third indication information is the same indication information as the second indication information.

In some embodiments, the first indication information indicates that the second time unit offset value is the time unit offset value at the first position in the second time unit offset value set, or determines according to a pre-agreement that the second time unit offset value is the time unit offset value at the first position indicated by the first indication information in the second unit offset value set, where the first indication information indicates the first position, including any one of the followings.

(1) The first indication information indicates that the second time unit offset value is a time unit offset value of which sequence is a first sequence in the second time unit offset value set, or pre-agrees that the second time unit offset value is a time unit offset value of which sequence is a first sequence indicated by the first indication information in the second time unit offset value set, and the first indication information indicates the first sequence.

(2) The first indication information indicates that the second time unit offset value is a time unit offset value corresponding to a first sequence number in the second time unit offset value set, or pre-agrees that the second time unit offset value is a time unit offset value corresponding to a first sequence number indicated by the first indication information in the second time unit offset value set, and the first indication information indicates the first sequence number.

The association indicated by the first indication information may be a combination of the aforementioned associations. Specifically, the second association may be combined with any other associations, such as when the second association is combined with the first association, the second time unit offset value at the first position under the first triggering state in the second time unit offset value set corresponding to the respective first RS resource sets can be determined through the first indication information. Assuming that the time unit is a time slot, the time-slot offset values configured by the network side device for the RS resource set are: {0, 1, 2, 3} corresponding to triggering state 1; {1, 2} corresponding to triggering state 2; {2, 3, 4, 5} corresponding to triggering state 3, when the RS resources in the RS resource set are triggered by DCI in the triggering state 2, the first indication information carried by the DCI indicates that a time-slot offset value of which the sequence is 2 in triggering state 2. The time-slot offset value corresponding to the RS resources in the RS resource set is 2.

When the network side device indicates at least one set of time unit offset values corresponding to RS resources, all RS resources may be configured using the aforementioned configuration scheme 1; or all RS resources may be configured using the aforementioned configuration scheme 2; or some RS resources may be configured using the aforementioned configuration scheme 1, and some RS resources may be configured using the aforementioned configuration scheme 2.

In one embodiment, the network side device indicates to the UE at least one set of time unit offset values corresponding to the RS resources, including:

for at least part of the RS resources, independently configuring at least one set of time unit offset values corresponding to the respective RS resources.

When the network side device determines that all RS resources need to be configured, at least one set of time unit offset values corresponding to the respective RS resources is independently configured, and the number of time unit offset values configured to the respective RS resources may be the same or different. In one embodiment, the network side device determines that some RS resources use pre-agreed time offset values, and may independently configure at least one set of time unit offset values corresponding to some RS resources, and the number of time unit offset values configured to the RS resources may be the same or different.

The at least one set of time unit offset values corresponding to the respective RS resources configured by the network side device for the UE may include at least one set of time unit offset values applicable to all triggering states, and may include at least one set of time unit offset values corresponding to at least some of the triggering states respectively.

In one embodiment, for at least part of the RS resources, independently configuring at least one set of time unit offset values corresponding to the respective RS resources includes:

for at least one RS resource among at least part of the RS resources, independently configuring at least one set of time unit offset values corresponding to the respective RS resources in at least part of the triggering states.

This scheme establishes a relationship between triggering states of the RS resources and RS time-domain transmission positions, so that in the case of the same DCI overhead as the previous schemes, more RS resource time-domain transmission position combinations can be indicated through the DCI.

In one embodiment, for at least one RS resource among at least part of the RS resources, at least one set of time unit offset values respectively corresponding to the respective RS resources in all triggering states are independently configured.

When independently configuring at least one set of time unit offset values corresponding to the respective RS resources in at least part of the triggering states, a set of time unit offset values consisting of time unit offset values corresponding to the respective triggering states in at least part of the triggering states may be configured for the respective RS resources. In one embodiment, a set of time unit offset values consisting of time unit offset values corresponding to the respective triggering states in a part of the triggering states is configured for the respective RS resources. For example, RS resource 1 has three triggering states, and a set of time-slot offset values {2,5} is configured for the RS resource 1, where triggering state 1 corresponds to a time-slot offset value 2, and triggering state 2 corresponds to a time-slot offset value 5. In one embodiment, the respective RS resources are configured with a set of time unit offset values consisting of time unit offset values corresponding to the respective triggering states in all triggering states. For example, RS resource 1 has three triggering states, and a set of time-slot offset values {2, 5, 4} is configured for the RS resource 1, where the triggering state 1 corresponds to a time-slot offset value 2, and the triggering state 2 corresponds to a time-slot offset value 5, the triggering state 3 corresponds to a time-slot offset value 4. For example, RS resource 1 has three triggering states, and a time-slot offset value is configured for each triggering state of RS resource 1, which are 1, 2, and 3 respectively, and a set of time-slot offset values including time-slot offset values corresponding to the respective triggering states configured for the RS resource 1 are {1, 2, 3}.

A set of time unit offset values corresponding to each triggering state in at least part of the triggering states may also be configured for the RS resources. In one embodiment, a set of time unit offset values corresponding to each triggering state in the part of the triggering states may be configured for the RS resources. For example, RS resource 1 has three triggering states, a set of time-slot offset values {2, 5, 4} is configured for the triggering state 1 of the RS resource 1, and a set of time-slot offset values {0, 1, 2} is configured for the triggering state 2 of the RS resource 1. In one embodiment, a set of time unit offset values corresponding to each triggering state in all triggering states may also be configured for the RS resources. For example, RS resource 1 has three triggering states, a set of time-slot offset values {2, 5, 4} is configured for the triggering state 1 of the RS resource 1, a set of time-slot offset values {0, 1, 2} is configured for the triggering state 2 of the RS resource 1, and a set of time-slot offset values {0, 3, 4} is configured for the triggering state 3 of the RS resource 1.

In some embodiments, the first time unit offset value set corresponding to at least one RS resource includes at least one of the followings.

(1) A set of time unit offset values composed of time unit offset values respectively corresponding to each triggering state configured for the RS resources.

(2) A set of time unit offset values composed of all time unit offset values corresponding to the first triggering state configured for the RS resources, and the first triggering state corresponds to a triggering state when the DCI triggers the RS resources.

When the network side device adopts the configuration scheme 2 to configure the time unit offset value for at least one RS resource, the RS resource for which the time unit offset value is configured includes at least one first RS resource. The corresponding at least one set of time unit offset values configured for the first RS resource set associated with the first RS resources may include at least one set of time unit offset values applicable to all triggering states, and may include at least one set of time unit offset values respectively corresponding to at least some triggering states.

In some embodiments, one or more time unit offset values are configured for an RS resource set. If a first RS resource is associated with a set of RS resources, then a set of time unit offset values configured for the set of RS resources is also a set of time unit offset values configured for the RS resource.

In one embodiment, the RS resources indicated to the UE include first RS resources, and indicating to the UE at least one set of time unit offset values corresponding to the RS resources includes:

for at least parts of first RS resource sets associated with the plurality of first RS resources, independently configuring at least one set of time unit offset values corresponding to the respective first RS resource sets.

In one embodiment, the at least part of first RS resource sets associated with the plurality of first RS resources includes second RS resource sets, and the second RS resource sets are some of the first RS resource sets. The some of the first RS resource sets are associated with at least some of triggering states which are configured with at least one set of time unit offset values, and the at least some of the triggering states include triggering states indicated by the DCI. For example, the triggered first RS resources include RS resource 1, RS resource 2, RS resource 3, RS resource 4, RS resource 5, RS resource 6, and RS resource 7; where RS resource 1, RS resource 2, and RS resource 3 are associated with RS resource set 1, RS resource 4 and RS resource 5 are associated with RS resource set 2, RS resource 5, RS resource 6, and RS resource 7 are associated with RS resource set 3, and one set of time unit offset values which are configured for RS resource set 1 are applicable to all triggering states, two sets of time unit offset values which are configured for RS resource set 2, are respectively a set of time unit offset values corresponding to triggering state 1, and a set of time unit offset values corresponding to triggering state 2. It is determined that one set of time unit offset values configured for RS resource set 1 is applicable to all triggering states. It is determined that three sets of time unit offset values are configured for RS resource set 3, which include one set of time unit offset values applicable to all triggering states, one set of time unit offset values corresponding to triggering state 1, and one set of time unit offset values corresponding to triggering state 2.

In some embodiments, independently configuring at least one set of time unit offset values corresponding to the respective first RS resource sets, includes: for at least part of the plurality of the second RS resource sets, independently configuring at least one set of time unit offset values corresponding to at least part of the triggering states.

In one embodiment, when independently configuring at least one set of time unit offset values corresponding to at least part of the triggering states for the respective second RS resource sets, a set of time unit offset values include time unit offset values corresponding to the respective triggering states of the second RS resource sets. In one embodiment, a set of time unit offset values including time unit offset values corresponding to each triggering state in a part of the triggering states is configured for the respective second RS resource sets. For example, RS resource set 1 has three triggering states, and a set of time-slot offset values {2, 5} is configured for RS resource set 1, where triggering state 1 corresponds to a time-slot offset value 2, and triggering state 2 corresponds to a time-slot offset value 5. In one embodiment, a set of time unit offset values consisting of time unit offset values corresponding to each triggering state in all triggering states are configured for the respective second RS resource sets. For example, RS resource set 1 has three triggering states, and a set of time-slot offset values {2, 5, 4} is configured for RS resource set 1, where triggering state 1 corresponds to a time-slot offset value 2, and triggering state 2 corresponds to a time-slot offset value 5, and triggering state 3 corresponds to a time-slot offset value 4.

When independently configuring at least one set of time unit offset values corresponding to the second RS resource sets corresponding to at least part of the triggering state, in one embodiment, each triggering state in some of the triggering states corresponding to the second RS resource sets may be configured with a set of time unit offset values. For example, RS resource set 1 has three triggering states, a set of time-slot offset values {2, 5, 4} is configured for triggering state 1 of RS resource set 1, and a set of time-slot offset values {0, 1, 2} is configured for triggering state 2 of RS resource set 1. In one embodiment, a set of time unit offset values corresponding to each triggering state in all triggering states is configured for the respective second RS resource sets. For example, RS resource set 1 has three triggering states, a set of time-slot offset values {2, 5, 4} is configured for triggering state 1 of RS resource set 1, a set of time-slot offset values {0, 1, 2} is configured for triggering state 2 of RS resource set 1, and a set of time-slot offset values {0, 3, 4} is configured for triggering state 3 of RS resource set 1.

In one embodiment, at least one of second time unit offset value sets corresponding to a first RS resource set includes at least one of the followings:

a set of time unit offset values composed of time unit offset values respectively corresponding to each triggering state configured for the second RS resource set;

a set of time unit offset values composed of all time unit offset values corresponding to the first triggering state configured for the second RS resource set;

where the first triggering state is a corresponding triggering state in response to the DCI triggering the first RS resource set.

The at least one of second time unit offset value sets corresponding to a second RS resource set is a set of time unit offset values corresponding to the triggering state indicated by the DCI. For example, RS resource set 1 has three triggering states, a set of time-slot offset values {2, 5, 4} is configured for triggering state 1 of RS resource set 1, a set of time-slot offset values {0, 1, 2} is configured for triggering state 2 of RS resource set 1, and a set of time-slot offset values {0, 3, 4} is configured for triggering state 3 of RS resource set 1. When DCI triggers RS resources in RS resource set 1 through the triggering state 2, the second time unit offset value set corresponding to the RS resource set 1 is {0, 1, 2}, and the corresponding second time offset value is 1 in response to the sequence indicated by the first indication information being 2.

When the network side device independently configures at least one set of time unit offset values corresponding to the RS resources, for an RS resource using the configuration scheme 1, among the at least one set of time unit offset values configured for the RS resource, each set of time unit offset values may be applicable to all triggering states, each set of time unit offset values may be applicable to triggering states corresponding to the each set of time unit offset values. In one embodiment, at least one set of time unit offset values may be applicable to all triggering states, at least one set of time unit offset values may be applicable to the set of triggering states corresponding to the at least one set of time unit offset values.

The network side device indicates to the UE at least one set of time unit offset values corresponding to the RS resources, which may be in any of the following schemes:

Scheme 1: the network side indicates to the UE the configuration of RS resources and at least one set of time unit offset values corresponding to the RS resources through RRC signaling.

In some embodiments, the network side indicates the configuration of an RS resource and at least one set of corresponding time unit offset values to the UE through RRC signaling, including: the network side, through RRC signaling, indicates the configuration of the RS resource, the configuration of the RS resource set associated with the RS resource, and at least one set of time unit offset values corresponding to the RS resource set associated with the RS resource, to the UE.

Scheme 2: the network side indicates to the UE the configuration of RS resources and at least one set of time unit offset values corresponding to the RS resources through MAC-CE signaling.

In some embodiments, the network side indicates to the UE the configuration of RS resources and at least one set of time unit offset values corresponding to the RS resources through MAC-CE signaling, including:

the network side indicates, through MAC-CE signaling, the configuration of the RS resources, the configuration of the RS resource set associated with the RS resources, and at least one set of time unit offset values corresponding to the RS resource set associated with the RS resources, to the UE.

Scheme 3: indicating, through RRC signaling, the configuration of RS resources and time unit offset values corresponding to the RS resources to the UE, and indicating, through MAC-CE signaling, at least one set of time unit offset values of the plurality of time unit offset values corresponding to at least part of the RS resources to the UE.

In some embodiments, indicating, through RRC signaling, the configuration of an RS resource and time unit offset values corresponding to the RS resource to the UE, and indicating, through MAC-CE signaling, at least one set of time unit offset values of the plurality of time unit offset values corresponding to the RS resource to the UE, includes: the network side indicates, through RRC signaling, to the UE the configuration of the RS resource set associated with the RS resource, and time unit offset values corresponding to the RS resource set associated with the RS resource, and indicates, through MAC-CE signaling, to the UE at least one set of time unit offset values in the plurality of time unit offset values corresponding to the RS resource set associated with the RS resource.

In one embodiment, the bitwidth of the first indication information in the DCI is a predefined fixed value. In one embodiment, the bitwidth of the first indication information in the DCI is determined according to the number of time unit offset values included in each of at least one set of time unit offset values. For example, the network side agrees with the UE that the first indication information occupies N bits (N is a positive integer) in the DCI, normally including 1 bit, 2 bits, 3 bits, 4 bits, etc.

In some embodiments, the bitwidth of the first indication information in the DCI is determined according to the number of time unit offset values included in each of the at least one set of time unit offset values, including:

the bitwidth of the first indication information in the DCI is determined according to the maximum value of the number of time unit offset values included in each of the at least one set of time unit offset values.

The bitwidth of the first indication information in the DCI is $\lceil \log_2 N \rceil$ or $\lceil \log_2(N+1) \rceil$, where N is the maximum value of the number of time unit offset values in each set of time unit offset values (Note, $\lceil x \rceil$ is a round up function). For example, the network side indicates to the UE three RS resource sets, i.e., RS set 1, RS set 2 and RS set 3, and the sets of time unit offset values corresponding to the three RS resource sets are respectively: {0, 1, 2, 3}; {1, 2}; {2, 2, 4, 4}. Since the maximum number of time unit offset values corresponding to the three RS resources is 4, the bitwidth of the first indication information in the DCI is $\lceil \log_2 4 \rceil = 2$ bits.

In some embodiments, the network side device indicates, through RRC signaling or MAC-CE signaling, the bitwidth of the first indication information in the DCI to the UE.

In some embodiments, the aperiodic RS resources configured by the network side are RS resources configured for the UE in one BWP/serving cell/frequency band.

In some embodiments, a set of time unit offset values of RS resources are configured in the following schemes.

(1) Configuring the maximum time unit offset value of the RS resource.

A set of time unit offset values corresponding to the RS resources include time unit offset values from the minimum time unit offset value to the maximum time unit offset value in default. The maximum time unit offset value can be indicated through the DCI. Taking the time unit as a time slot as an example, if a set of time-slot offset values corresponding to RS resource 1 is {0, 1, 2, 3}, 0 is the default minimum time-slot offset value, and the network side device configures a set of time-slot offset values corresponding to the RS resource 1 by configuring the maximum time-slot offset value 3 of the RS resource 1.

In some embodiments, configuring the maximum time unit offset value of the RS resource includes: configuring the maximum time unit offset value of the RS resource set associated with the RS resource. Taking the RS resources as SRS resources as an example, one or more sets of RS resources may be configured with respective maximum time unit offset values.

(2) Configuring the minimum time unit offset value and the maximum time unit offset value of the RS resource.

A set of time unit offset values corresponding to the RS resource include time unit offset values from the minimum time unit offset value to the maximum time unit offset value. The minimum and maximum time unit offset values can be indicated by DCI. Taking the time unit as a time slot as an example, if a set of time-slot offset values corresponding to RS resource 1 is {2, 3, 4, 5, 6}, the network side device configures a set of time-slot offset values corresponding to the RS resource 1 by configuring the minimum time-slot offset value 2 of RS resource 1 and the maximum time-slot offset value 6.

In some embodiments, configuring the minimum time unit offset value and the maximum time unit offset value of the RS resource includes: configuring the minimum time unit offset value and the maximum time unit offset value of the RS resource set associated with the RS resource. Taking the RS resources as SRS resources as an example, one or more RS resource sets may be configured with corresponding minimum time unit offset values and maximum time unit offset values respectively.

(3) Indicating the number of bits N occupied by the first indication information in the DCI.

A set of time unit offset values corresponding to the RS resource are from the default minimum time unit offset value to $2^N$ or $2^N-1$, which can indicate the number of bits N occupied by the first indication information in the DCI. Taking the time unit as a time slot as an example, a set of time-slot offset values corresponding to RS resource 1 is {1, 2, 3, 4}, and 1 is the default minimum time-slot offset value. The network side device configures a set of time-slot offset values corresponding to RS resource 1 by indicating that the bitwidth of the first indication information in the DCI is 2. If a set of time-slot offset values corresponding to the RS resource 1 is {0, 1, 2, 3}, and 0 is the default minimum slot offset value, the network side device configures a set of time-slot offset values corresponding to the RS resource 1 by indicating that the bitwidth of the first indication information in the DCI is 2.

In some embodiments, when at least one set of time unit offset values corresponding to RS resources includes one or more sets of time unit offset values corresponding to RS resource sets associated with the RS resources, a set of time unit offset values corresponding to the RS resource sets includes values from the default minimum time unit offset value to $2^N$ or $2^N-1$ which may indicate the number of bits N occupied by the first indication information in the DCI. ① If a set of time-slot offset values corresponding to RS resource set 1 is {1, 2, 3, 4}, and 1 is the default minimum time-slot offset value, the network side device configures a set of time-slot offset values corresponding to the RS resource set 1 by indicating that the bitwidth of the first indication information in the DCI is 2. ② If a set of time-slot offset values corresponding to RS resource set 1 is {0, 1, 2, 3}, and 0 is the default minimum time-slot offset value, the network side device configures a set of time-slot offset values corresponding to the RS resource 1 by indicating that the bitwidth of the first indication information in the DCI is 2.

(4) Indicating the number of bits N occupied by the first indication information in the DCI and configuring a minimum time unit offset value.

A set of time unit offset values corresponding to the RS resource include values from a configured minimum time unit offset value to $2^N$ or $2^N-1$, which may indicate the number of bits N occupied by the first indication information in the DCI. Taking the time unit as a time slot as an example, if a set of time-slot offset values corresponding to RS resource 1 is {2, 3, 4}, the network side device configures a set of time-slot offset values corresponding to the RS resource 1 by indicating that the bitwidth of the first indication information in the DCI is 2 and configuring the minimum time-slot offset value is 2. In one embodiment, if a set of time-slot offset values corresponding to RS resource 1 is {0, 1, 2, 3}, and a minimum time-slot offset value is configured as 0, the network side device configures a set of time-slot offset values corresponding to the RS resource 1 by indicating that the bitwidth of the first indication information in the DCI is 2.

In some embodiments, when at least one set of time unit offset values corresponding to RS resources includes one or more sets of time unit offset values corresponding to RS resource sets associated with RS resources, a set of time unit offset values corresponding to RS resource sets includes values from the default minimum time unit offset value to $2^N$ or $2^N-1$, which may indicate the number of bits N occupied by the first indication information in the DCI. Taking the time unit as a time slot as an example, ① a set of time-slot offset values corresponding to RS resource set 1 is {2, 3, 4}, and the network side device configures a set of time-slot offset values corresponding to the RS resource 1 by indicating that the bitwidth of the first indication information in the DCI is 2 and configuring the minimum time-slot offset value is 2. In one embodiment, ② if a set of time-slot offset values corresponding to RS resource set 1 is {0, 1, 2, 3}, and a minimum time-slot offset value is configured as 0, and the network side device configures a set of time-slot offset values corresponding to the RS resource 1 by indicating that the bitwidth of the first indication information in the DCI is 2.

In the following, taking that the network side device is a base station, the RS resource is an aperiodic SRS resource, the time unit is a time slot, and the aperiodic SRS adopts the configuration scheme 2 to configure the time-slot offset value as two corresponding embodiments.

The base station sends configuration information of an SRS resource set associated with an aperiodic SRS resource to the UE. For each SRS resource set, the base station configures at least one set of time-slot offset values for the SRS resource set. A set of time-slot offset values includes one or more time-slot offset values.

The base station sends a DCI that triggers aperiodic SRS resource transmission to the UE, where the DCI carries first indication information used to indicate a transmission time slot of at least one SRS resource set triggered by the DCI, and the first indication information indicates a sequence number. The sequence number indicates a sequence number configured by the base station, of a time-slot offset value corresponding to an actual transmission time slot of each SRS resource set triggered by the DCI in the plurality of time-slot offset values, that is, the each triggered SRS resource set corresponds to the same sequence number, and the sequence number m is a function of the sequence n, n=m−1, which refers to the above description for details.

Taking the example that the base station configures three aperiodic SRS resource sets for the UE through RRC signaling, the three aperiodic SRS resource sets are denoted as SRS set 1, SRS set 2 and SRS set 3 respectively. It is assumed that the corresponding sets of time-slot offset values configured by the base station for the three SRS resource sets are respectively: {0, 1, 2, 3}; {1, 2}; {2, 2, 4, 4}. The base station sends a DCI that triggers aperiodic SRS transmission to the UE. Assuming that this DCI triggers the transmissions of SRS set 1 and SRS set 2, and the first indication information indicates the sequence number 2, the time-slot offset values of SRS set 1 and SRS set 2 are 0 and 1, respectively. That is, the DCI indicates that SRS set 1 transmission is in the first available time slot from the reference time slot corresponding to SRS set 1, and the SRS set 2 transmission is in the second available time slot from the reference time slot corresponding to SRS set 2.

At least one set of time-slot offset values corresponding to different SRS resource sets may be independently configured, and the number of time-slot offset values in a set of time-slot offset values configured for any two SRS resource sets may be the same or different. For example, in the preceding embodiments, the base station configures the same number of time-slot offset values for SRS set 1 and SRS set 3, but the number of time-slot offset values configured for SRS set 2 is different from the number of time-slot offset values for SRS set 1 and SRS set 3.

In some embodiments, in at least one set of time-slot offset values corresponding to all SRS resource sets, the numbers of time-slot offset values are the same with each other.

For all aperiodic SRS resource sets, the base station independently configures at least one set of time-slot offset values corresponding to each aperiodic SRS resource set.

In one embodiment, when the base station determines that there is an aperiodic SRS resource set with a default time-slot value, at least one set of time-slot offset values corresponding to the aperiodic SRS resource set may not be configured for the UE. The base station independently configures at least one set of time-slot offset values corresponding to each aperiodic SRS resource set for a part of the aperiodic SRS resource sets. If the time-slot offset value corresponding to SRS set 1 is 0 by default, the base station configures at least one set of time-slot offset values corresponding to SRS set 2 and SRS set 3 respectively, and does not configure at least one set of time-slot offset values corresponding to SRS set 1.

The at least one set of time-slot offset values configured by the base station for the SRS resource set may be configured through RRC signaling. For example, it is configured in SRS resource set configuration information.

In one embodiment, the time-slot offset value configured by the base station for each SRS resource set may be configured through MAC-CE signaling. For example, it can be direct configuration or indirect configuration.

The direct configuration is to configure at least one set of time-slot offset values configured by the SRS resource set through MAC-CE signaling.

An indirect configuration scheme is that the base station configures multiple time-slot offset values for the SRS resource set, and for at least part of the SRS resource sets, indicates, through RRC signaling, to the UE the configuration of each SRS resource set in the part of the SRS resource sets and multiple time unit offset values corresponding to the each SRS resource set, and indicates, through MAC-CE signaling, to the UE at least one set of time unit offset values among the multiple time unit offset values corresponding to at least part of the SRS resource set, to activate several time-slot offset values. If the DCI triggers the SRS resource set, the first indication information in the DCI indicates a sequence number of a time-slot offset value corresponding to a transmission time slot of the SRS resource set in at least one set of time unit offset values configured by the base station for the SRS resource set through MAC-CE signaling. For example, the base station configures three SRS resource sets for the UE through RRC signaling: SRS set 1, SRS set 2 and SRS set 3, assuming that the base station configures the time-slot offset values for these three SRS resource sets through RRC signaling, which are: {0, 1, 2, 3}, {1, 2}, and {2, 2, 4, 4}. The base station indicates {1, 3} in {0, 1, 2, 3} as a set of time-slot offset values corresponding to SRS set 1 to the UE through MAC-CE signaling, and the base station indicates {2, 4} in {2, 2, 4, 4} as a set of time-slot offset values corresponding to SRS set 3 to the UE through MAC-CE signaling. Assuming that the base station sends a DCI that triggers aperiodic SRS transmission to the UE, and this DCI triggers the transmissions of SRS set 1 and SRS set 2, and the SRS transmission time-slot indication information in the DCI indicates a sequence number 1, the time-slot offset value corresponding to SRS set 1 is the first time-slot offset value 1 activated by MAC-CE signaling, and the time-slot offset value corresponding to SRS set 2 is the first time-slot offset value 1 configured by RRC signaling.

The bitwidth of the above sequence number in the DCI is a predefined fixed value.

In one embodiment, the bitwidth of the above sequence number in the DCI is determined according to the number of time unit offset values included in each of the at least one set of time unit offset values.

The bitwidth of the above sequence number in the DCI is determined according to the maximum number of time unit offset values included in each of the at least one set of time unit offset values. For example, the base station configures three SRS resource sets for the UE through RRC signaling: SRS set 1, SRS set 2 and SRS set 3, and the time-slot offset values configured for these three SRS resource sets are: {0, 1, 2, 3}, {1, 2} and {2, 2, 4, 4}, respectively. Since the maximum number of time-slot offset values corresponding to the three SRS resource sets is 4, the overhead of the transmission time-slot indication information in the DCI is $\lceil \log_2 4 \rceil = 2$ bits.

All aperiodic SRS resource sets configured by the base station for the UE may be all aperiodic SRS resource sets configured by the base station for the UE in one BWP/serving cell/frequency band.

The base station configures multiple time-slot offset values for one SRS resource set in one or a combination of the following schemes.

Scheme 1: the base station configures the maximum slot offset value M, or configures the minimum slot offset value m and the maximum slot offset value M, and the range of a set of slot offset values indicated by the DCI for the SRS resource set is from m to the value M. The value of the minimum slot offset value m can be the default slot 0 or 1, or other configured values. For example, taking the base station configuring three SRS resource sets for the UE through RRC signaling: SRS set 1, SRS set 2 and SRS set 3 as an example, the base station configures the maximum slot offset value for the three SRS resource sets respectively, for example 1, 2, 3 respectively. Then the slot offset values corresponding to the three SRS resource sets are {0, 1}, {0, 1, 2}, {0, 1, 2, 3} respectively.

In some embodiments, if the base station does not configure the maximum time-slot offset value for an SRS resource set, the time-slot offset value of this SRS resource set is 0.

Scheme 2: the base station configures multiple time-slot offset values through the overhead of the first indication information in the DCI, or configures multiple time-slot offset values through the overhead of the first indication information in the DCI and the configured minimum time-slot offset value.

The base station sends configuration information of an SRS resource set associated with an aperiodic SRS resource to the UE. For at least part of SRS resource sets, the base station configures at least one set of time-slot offset values for at least part of corresponding triggering states. In one embodiment, for all the SRS resource sets, the base station configures a set of time-slot offset values for each of triggering states corresponding to all the SRS resource sets.

The base station sends a DCI that triggers the transmission of aperiodic SRS resources to the UE. The DCI triggers aperiodic SRS resources in some aperiodic SRS resource sets through a triggering state, and the DCI carries the first indication information that indicates associations between transmission time-slots of all SRS resource sets triggered by the DCI and corresponding first time-slot offset value sets. The indication information indicates a sequence number, and the sequence number indicates an actual sequence number of a time-slot offset value corresponding to the actual transmission time-slot of each SRS resource set triggered by the DCI in at least one set of time-slot offset values configured by the base station in the triggering state indicated by the DCI.

In some embodiments, for an SRS resource set, the base station does not configure a time-slot offset value for the SRS resource set in each triggering state, but the base station configures at least one set of time-slot offset values for the SRS resource set, then the set of time-slot offset values are applicable to all triggering states, a time-slot offset value corresponding to the actual transmission time-slot of this SRS resource set is a time-slot offset value corresponding to a sequence number indicated by DCI in the first time-slot offset value set configured by the base station for the SRS resource set. In one embodiment, for an SRS resource set, the base station does not configure a time-slot offset value for the SRS resource set in each triggering state, at this time, the time-slot offset value corresponding to the actual transmission time-slot of this SRS resource set is a default value, such as 0.

Assume that for the SRS resource set 1, at least one set of time-slot offset values is configured as follows.

| Triggering states | Time-slot offset values |
|---|---|
| 1 | 1, 2, 3, 4 |
| 2 | 2, 3, 4, 5 |

For the SRS resource set 2, at least one set of time-slot offset values is configured as follows.

| Triggering states | Time-slot offset values |
|---|---|
| 1 | 6, 7, 8, 9 |
| 2 | 1, 2, 3, 5 |
| 3 | 1, 2, 3, 4 |

The associations between triggering states indicated by the DCI, indication values of SRS transmission time-slot indication information in the DCI, and time-slot offset values of respective SRS resources set are as follows (an initial position is set to 0).

| Triggering states | Positions | Time-slot offset values | |
|---|---|---|---|
| 1 | 0 | SRS set 1: | 1 |
| | | SRS set 2: | 6 |
| | 1 | SRS set 1: | 2 |
| | | SRS set 2: | 7 |
| | 2 | SRS set 1: | 3 |
| | | SRS set 2: | 8 |
| | 3 | SRS set 1: | 4 |
| | | SRS set 2: | 9 |
| 2 | 0 | SRS set 1: | 2 |
| | | SRS set 2: | 1 |
| | 1 | SRS set 1: | 3 |
| | | SRS set 2: | 2 |
| | 2 | SRS set 1: | 4 |
| | | SRS set 2: | 3 |
| | 3 | SRS set 1: | 5 |
| | | SRS set 2: | 5 |
| 3 | 0 | SRS set 2: | 1 |
| | 1 | SRS set 2: | 2 |
| | 2 | SRS set 2: | 3 |
| | 3 | SRS set 2: | 4 |

At least one set of time-slot offset values configured for different SRS resource sets in each triggering state can be configured independently, that is, the number of configured time-slot offset values for any two SRS resource sets in each triggering state can be same or different.

In some embodiments, for at least one set of time-slot offset values corresponding to each triggering state of all SRS resource sets, the numbers of time-slot offset values in each set of time-slot offset values are the same.

For all aperiodic SRS resource sets, the base station independently configures at least one set of time-slot offset values corresponding to each aperiodic SRS resource set in each triggering state.

If the base station does not configure at least one set of time-slot offset values for an aperiodic SRS resource set in each triggering state, then the corresponding time-slot offset value of the SRS resource set in each triggering state is 0 by default. For example, the base station configures three aperiodic SRS resource sets, and the first SRS resource set is not configured with a time-slot offset value in the triggering state 1, then the UE considers that the time-slot offset value corresponding to the first SRS resource set in the triggering state 1 is 0.

The time-slot offset value configured by the base station for each SRS resource set in each triggering state may be configured through RRC signaling, for example, configured in SRS resource set configuration information.

The time-slot offset value configured by the base station for each SRS resource set in each triggering state is configured through MAC-CE signaling, for example, in a direct configuration or in an indirect configuration.

The direct configuration is to configure the SRS resource set through MAC-CE signaling with at least one set of time-slot offset values in each triggering state.

An indirect configuration is that the base station configures multiple time-slot offset values for the SRS resource set in each triggering state, and for at least part of the SRS resource sets, indicates to the UE the configuration of each of the SRS resource sets in the part of SRS resource sets through RRC signaling and its corresponding multiple time unit offset values, and indicates to the UE at least one set of time unit offset values among the multiple time unit offset values corresponding to each triggering state in the at least part of the SRS resource sets through MAC-CE signaling, to activate several time-slot offset values. If the DCI triggers the SRS resource set, the first indication information in the DCI indicates a sequence number of the time-slot offset value corresponding to the transmission time-slot of the SRS resource set in at least one set of time unit offset values configured to the RSR resource set in each triggering state by the base station through MAC-CE signaling.

For example, the base station configures three SRS resource sets for the UE through RRC signaling: SRS set 1, SRS set 2 and SRS set 3. It is assumed that the base station configures the time-slot offset values for these three SRS resource sets through RRC signaling are: {0, 1, 2, 3}, {1, 2}, and {2, 2, 4, 4}. The base station indicates {1, 3} in {0, 1, 2, 3} as a set of time-slot offset values corresponding to SRS set 1 in triggering state 1 to the UE through MAC-CE signaling, and the base station indicates {2, 4} in {2, 2, 4, 4} as a set of time-slot offset values corresponding to SRS set 3 in triggering state 1 to the UE through MAC-CE signaling. Assuming that the base station sends a DCI that triggers aperiodic SRS transmission to the UE, this DCI triggers the transmissions of SRS set 1 and SRS set 2 through the triggering state 1, and the SRS transmission time-slot indication information in the DCI indicates the sequence number 1, then the time-slot offset value corresponding to SRS set 1 is the first time-slot offset value 1 activated by MAC-CE signaling for SRS set 1 in triggering state 1, and the time-slot offset value corresponding to SRS set 2 is the first timeslot offset value 1 configured by RRC signaling for SRS set 2 in triggering state 1.

The bitwidth of the above sequence number in the DCI is a predefined fixed value.

In one embodiment, the bitwidth of the above sequence number in the DCI is determined by the base station according to the number of time-slot offset values configured in each triggering state for all aperiodic SRS resource sets configured for the UE.

The bitwidth of the above sequence number in the DCI is determined by the base station according to the maximum value of the number of timeslot offset values configured in each triggering state according to all aperiodic SRS resource sets configured for the UE (here all aperiodic SRS resource sets configured by the base station for the UE may be all aperiodic SRS resource sets configured by the base station for the UE in one BWP/serving cell/frequency band).

In some embodiments, assuming that the maximum value is N, the overhead of the first indication information in the DCI is $\lceil \log_2 N \rceil$ bits. In one embodiment, assuming that the maximum value is N, the overhead of transmission time-slot indication information in the DCI is $\lceil \log_2(N+1) \rceil$ bits.

In some embodiments, the base station configures at least one set of time-slot offset values corresponding to each triggering state for an SRS resource set in the following schemes.

Scheme 1: the base station independently configures the maximum time-slot offset value for each triggering state of the SRS resource set, and a range of a set of time-slot offset values that can be indicated by the DCI for the SRS resource set is from m to M. The value of the minimum time-slot offset value m may be 0 or 1 by default. For example, if the base station configures three SRS resource sets for the UE through RRC signaling: SRS set 1, SRS set 2 and SRS set 3, the base station configures the maximum time-slot offset values for the three SRS resource sets in triggering state 1 respectively, for example, 1, 2, 3 respectively. Then the corresponding time-slot offset values of the three SRS resource sets in the triggered state 1 are {0, 1}, {0, 1, 2}, {0, 1, 3} respectively. In one embodiment, if the base station does not configure a maximum time-slot offset value for a triggering state of an SRS resource set, the time slot offset value of the SRS resource set in this triggering state is a default value (for example, 0).

Scheme 2: the base station configures multiple time-slot offset values through the overhead of the first indication information in the DCI; or, configures multiple time-slot offset values through the overhead of the first indication information in the DCI and the configured minimum time-slot offset value.

After introducing the RS transmission position indication method applied to the network side device, the RS transmission position determination method applied to the UE will be described in detail below.

Figure 3:
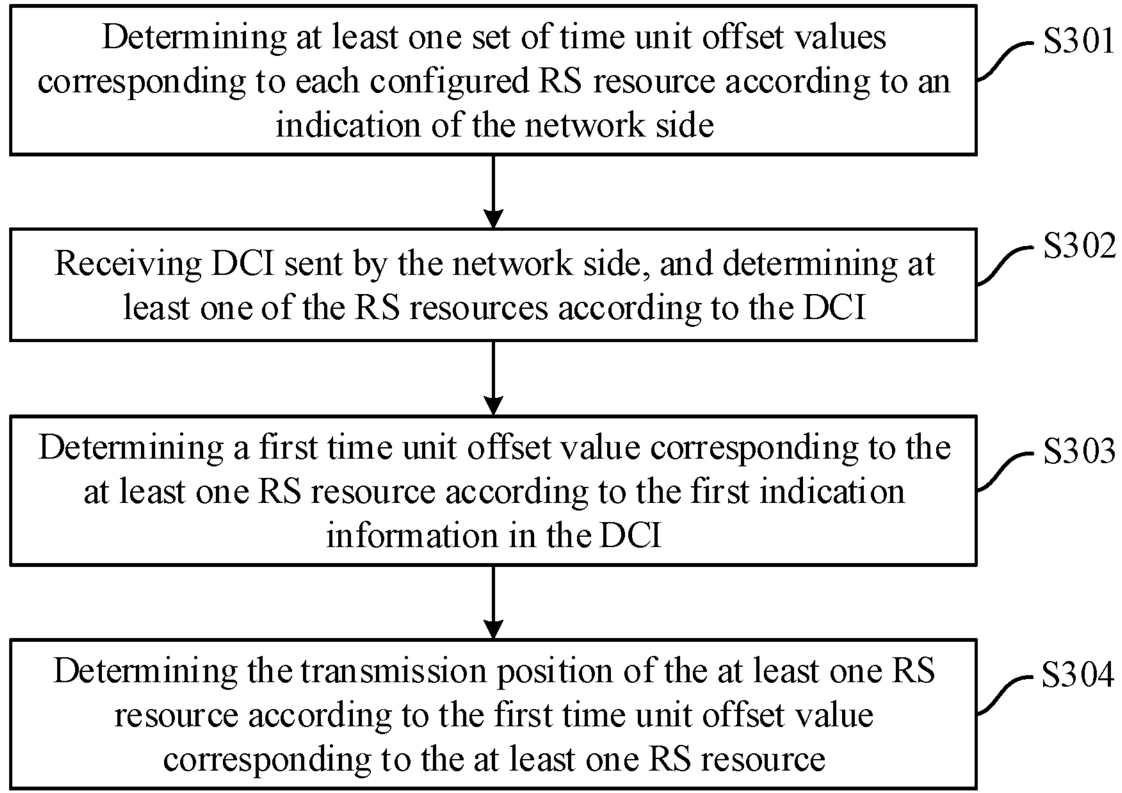
FIG. 3 is a flow diagram of a RS transmission position determining method according to an embodiment of the present application.

Embodiments of the present application further provide a method for determining an RS transmission position, which is applied to a UE, as shown in FIG. 3, the method includes:

S301, determining at least one set of time unit offset values corresponding to each configured RS resource according to an indication of the network side.

The aforementioned RS resources may be aperiodic RS resources, semi-persistent RS resources, or periodic RS resources. Types of RS resources include but are not limited to SRS resources, CSI-RS resources, CSI-IM resources and the like. Taking aperiodic RS resources as an example, aperiodic RS resources may include uplink aperiodic RS resources or downlink aperiodic RS resources, uplink aperiodic RS resources may include but be not limited to aperiodic SRS resources, and downlink aperiodic RS resources may include but be not limited to aperiodic CSI-RS resources and aperiodic CSI-IM resources. The RS resource described in embodiments of the present application may be any one of the foregoing resources.

S302: receiving DCI from the network side, and determining at least one RS resource among the RS resources according to the DCI.

S303: determining a first time unit offset value corresponding to the at least one RS resource according to the first indication information in the DCI.

S304: determining the transmission position of the at least one RS resource according to the first time unit offset value corresponding to the at least one RS resource.

In one embodiment, the association between the first time unit offset value corresponding to each RS resource in the at least one RS resource and the first time unit offset value set corresponding to each RS resource is indicated by the same first indication information. The first time unit offset value is a time unit offset value corresponding to the transmission position of each RS resource, and the first time unit offset value set is one of the at least one set of time unit offset values.

For the RS resources which are triggered by DCI and need transmission position indications, the present application uses the same first indication information to indicate the associations between the first time unit offset values and the first time unit offset value sets corresponding to the RS resources, so that the indication of the transmission position of the RS resource can be realized with less DCI signaling, and the flexibility of triggering and sending of the RS resource can be increased.

The aforementioned first indication information is located in a specified information field in the DCI, and different values of the specified information field may be used to represent different first indication information.

In some embodiments of the present application, a state of the specified information field in the DCI indicates that the first time-slot time unit value is which time-slot unit offset value in the first time unit offset value set, and can be interpreted as DCI indicating the association between the first time-slot time unit value and the first time unit offset value set.

When the time unit is a time slot, the time unit offset may be expressed as a time-slot offset.

In some embodiments, the specified information field includes at least one of the followings, that is, the UE determines the first time unit offset value corresponding to the at least one RS resource according to at least one of the following specified information fields.

(1) A time-slot offset information field configured to indicate a time-slot offset value of an RS resource triggered by DCI.

(2) an MCS indication field. Some states in the MCS indication field are configured to indicate a modulation and coding scheme of the data scheduled by the DCI, and some states in the MCS indication field are configured to indicate a time unit offset value.

(3) an SRS request field. The SRS request field simultaneously triggers at least one RS resource and indicates an RS time-slot offset value.

When the specified information field in the DCI includes the time-slot offset information field configured to indicate the time-slot offset value of the RS resource triggered by the DCI and the MCS indication field, the time domain position of the RS resource and the association can be determined according to the MCS indication field and the time-slot offset information field based on the indicated information.

Here, determining at least one RS resource among the RS resources according to the DCI includes:

determining the at least one RS resource according to a trigger signaling in the DCI.

Then, the at least one RS resource is an RS resource triggered by the trigger signaling in the DCI.

In some embodiments, the UE determines the transmission time unit of an RS resource in the following manner:

the time unit for transmitting one RS resource is the $(t+1)^{th}$ available time unit from a reference time unit, and t is a first time unit offset value.

In some embodiments, the reference time unit is a time unit where the DCI is located.

In some embodiments, the reference time unit is a time unit offset by k time units from a time unit where the DCI is located, and the k is determined according to information indicated by the network side device.

In some embodiments, the DCI triggers an RS resource by triggering an RS resource set. That is, DCI triggers one or more RS resource sets. At this point, the RS resources associated with the triggered RS resource set are triggered.

In some embodiments, a first time unit offset value of one RS resource is determined by a first time unit offset value of one RS resource set associated with this RS resource, and the UE determines a time unit for transmitting the RS resource set according to the first time unit offset value of the RS resource set. The time unit for transmitting the RS resource set is a time unit for transmitting the RS resource. That is, the first indication information in the DCI indicates the first time unit offset value corresponding to at least one RS resource, including that: the first indication information in the DCI indicates the first time unit offset value of at least one RS resource set.

In some embodiments, the UE determines the time unit for transmitting one RS resource set in the following manner: the time unit for transmitting one RS resource set is the $(t+1)^{th}$ available time unit from the reference time unit, and t is the first time unit offset value. In one embodiment, the reference time unit is the time unit where the DCI is located. In one embodiment, the reference time unit is a time unit offset by k time units from the time unit where the DCI is located, and the time unit k is determined according to information indicated by the network side device.

In some embodiments, the at least one RS resource includes RS resources.

The associations between the first time unit offset values corresponding to the respective RS resources in the at least one RS resource and the first time unit offset value sets corresponding to the respective RS resources are the same.

The first indication information indicates an association.

In some embodiments, the foregoing time unit is a time slot or a sub time-slot or a symbol.

In some embodiments, the association between the first time unit offset value and the first time unit offset value set includes at least one of the followings.

(1) The first time unit offset value is a time unit offset value at a first position in the first time unit offset value set, and the first position is a position indicated by the first indication information.

Through the first indication information, the first time unit offset value at the first position in the first time unit offset value set corresponding to each RS resource can be determined. When the first indication information indicates an association, the first indication information can be used to determine the first time unit offset value at the same position in the first time unit offset value set corresponding to each RS resource.

In some embodiments, the first time unit offset value is a time unit offset value at the first position in the first time unit offset value set, including any of the followings.

① The first time unit offset value is a time unit offset value of a first sequence in the first time unit offset value set, and the first sequence is a sequence indicated by the first indication information.

Assuming that the time unit is a time slot, a set of time-slot offset values configured by the network side device for three RS resources are: {0, 1, 2, 3}, {1, 2}, {2, 3, 4, 5} respectively, when the three RS resources are triggered by the DCI, and the first indication information carried in the DCI indicates that the sequence is 2, the UE determines that the time-slot offset values corresponding to the three RS resources are 1, 2, and 3, respectively.

② The first time unit offset value is a time unit offset value corresponding to a first sequence number in the first time unit offset value set, and the first sequence number is a sequence number indicated by the first indication information.

If for the same sequence number, the network side configures different time unit offset values for each RS resource, the UE may transmit different RS resources at different time unit offset positions. The sequence number can be a sequence function n=m−k, where n is the sequence, m is the sequence number, k is a natural number less than m (the initial time unit offset value position is set to 1) or k is a natural number less than or equal to m (the initial time offset value position is set to 0). Assuming that the time unit is a time slot, the position of the initial time-slot offset value is set to 1, and for a set of time-slot offset values, the sequence is n=m−1, and it is determined that three RS resources are configured according to the indication of the network side device with sets of time-slot offset values, respectively: {0, 1, 2, 3}, {1, 2}, {2, 3, 4, 5}, these 3 RS resources are triggered through DCI, UE indicates that the sequence number is 1 according to the first indication information carried in the DCI, and it is determined that the time-slot offset values corresponding to the three RS resources are 0, 1, and 2, respectively.

(2) The first time unit offset value is a time unit offset value associated with the first triggering state in the first time unit offset value set, and the first triggering state is a triggering state indicated by the first indication information.

In some embodiments, it is pre-agreed that the first time unit offset value is a time unit offset value associated with the first triggering state in the first time unit offset value set, and the first indication information indicates the first triggering state.

When the first indication information indicates an association, the first time unit offset value of the first triggering state in the first time unit offset value set corresponding to each RS resource can be determined through the first indication information. Assuming that the time unit is a time slot, the network side device configures a set of time-slot offset values {2, 5, 4} for RS resource 1. Here, a triggering state 1 corresponds to a time-slot offset value of 2, a triggering state 2 corresponds to a time-slot offset value of 5, and a triggering state 3 corresponds to a time-slot offset value of 4. When the UE determines the triggering state 2 according to the first indication information in the DCI, it determines that the time-slot offset value indicated by the network side is 5.

(3) The first time unit offset value is a time unit offset value whose identifier is a first identifier in the first time unit offset value set, and the first identifier is an identifier indicated by the first indication information.

When the first indication information indicates an association, the first time unit offset value of the first triggering state in the first time unit offset value set corresponding to each RS resource may be determined through the first indication information. Assuming that the time unit is a time slot, a set of time-slot offset values configured by the network side device for one RS resource are {0, 1, 2, 3}; the corresponding identifiers are {2, 1, 3, 0} respectively. The UE triggers the RS resource according to the DCI, and determines that the time-slot offset value corresponding to the RS resource is 3 when the identifier indicated by the first indication information carried in the DCI is 0.

In some embodiments, the UE determines a first time unit offset value corresponding to each RS resource in the at least one RS resource, according to the association between the first time unit offset value corresponding to each RS resource in the at least one RS resource and the first time unit offset value set corresponding to each RS resource, here the association is indicated by the first indication information.

The association indicated by the first indication information may be a combination of the aforementioned associations. Specifically, the second association may be combined with any other association, such as when the second association is combined with the first association, the first time unit offset value at the first position in the first triggering state in the first time unit offset value set corresponding to each RS resource can be determined through the first indication information. Assuming that the time unit is a time slot, the time-slot offset values configured by the network side device for RS resources are: {0, 1, 2, 3} corresponding to triggering state 1; {1, 2} corresponding to triggering state 2; {2, 3, 4, 5} corresponding to triggering state 3. When the UE triggers the RS resource in the triggering state 2 according to the DCI, the first indication information carried by the DCI indicates the time slot offset value of 2 in the triggering state 2, and determines that the time-slot offset value corresponding to the RS resource is 2.

In some embodiments, the UE determines the first time unit offset value according to at least one of the first location/first triggering state/first identifier indicated by the DCI.

The first indication information indicates that the association between the first time unit offset value and the first time unit offset value set includes at least one of the followings.

The first indication information indicates that the first time unit offset value is a time unit offset value at a first position in the first time unit offset value set or the first time unit offset value is pre-agreed as a time unit offset value at a first position indicated by the first indication information in the first time unit offset set, where the first indication information indicates the first position.

The first indication information indicates that the first time unit offset value is a time unit offset value associated with a first triggering state in the first time unit offset value set or the first time unit offset value is pre-agreed as a time unit offset value associated with a first triggering state indicated by the first indication information in the time unit offset value set, where the first indication information indicates the first triggering state.

The first indication information indicates that the first time unit offset value is a time unit offset value whose identifier is a first identifier in the first time unit offset value set or the first time unit offset value is pre-agreed as a time unit offset value of a first identifier indicated by the first indication information in the first time unit offset value set, where the first indication information indicates the first identifier.

The pre-agreed manner may be pre-agreed according to a protocol. It may also be that the UE receives second indication information from the network side device. The second indication information indicates that the first time unit offset value is a time unit offset value at a first position indicated by the first indication information in the first time unit offset value set, and/or a time unit offset value in a first triggering state indicated by the first indication information, and/or a time unit offset value with a first identifier indicated by the first indication information, etc.

If the second indication information is received, the step of receiving the second indication information may be before "determining the first time unit offset value corresponding to at least one RS resource according to the first indication information in the DCI".

In some embodiments, the first indication information indicates that the first time unit offset value is the time unit offset value at the first position in the first time unit offset value set or the first time unit offset value is pre-agreed as the first time unit offset value as the time unit offset value at the first position indicated by the first indication information in the time unit offset value set, where the first indication information indicates the first position, including any of the followings.

The first indication information indicates that the first time unit offset value is a time unit offset value of which sequence is a first sequence in the first time unit offset value set or the first time unit offset value is pre-agreed as a time unit offset of which sequence is a first sequence indicated by the first indication information, of the first time unit offset value set, where the first indication information indicates the first sequence.

The first indication information indicates that the first time unit offset value is a time unit offset value corresponding to a first sequence number in the first time unit offset value set or the first time unit offset value is pre-agreed as a first time unit offset value corresponding to a first sequence number indicated by the first indication information in the first time unit offset value set, where the first indication information indicates the first sequence number.

The UE may determine at least one set of time unit offset values corresponding to the RS resources indicated by the network side device according to the configuration information from the network side device. The network side device indicates to the UE at least one set of time unit offset values corresponding to the RS resources, which is also referred to as UE configuring at least one set of time unit offset values corresponding to the RS resources. Correspondingly, the UE determines at least one set of time unit offset values corresponding to the RS resources according to the indication of the network side, and when there are multiple RS resources, the corresponding determination schemes are as follows.

Determination scheme 1: determining at least one set of time unit offset values corresponding to each RS resource configured by the network side device for at least one RS resource among the RS resources.

The UE determines the time unit offset value configured by the network side according to a single RS resource. For example, it is determined that the network side device configures a set of time-slot offset values {0, 1, 2, 3} for RS resource 1, and configures a set of time-slot offset values {1, 2} for RS resource 2, and configures a set of time-slot offset values {2, 3, 4, 5} for RS resource 3.

Determination scheme 2: determining at least one set of time unit offset values corresponding to at least one first RS resource among the RS resources and the first RS resource set associated with each first RS resource configured by the network side device, the first RS resources are a set of associated RS resources, and the set of associated RS resources are configured with at least one set of time unit offset values. The RS resource set is associated with at least one of the first RS resources, and configured with at least one set of time unit offset values.

In some embodiments, determining at least one set of time unit offset values corresponding to the RS resource according to an indication from the network side, includes: according to the indication from the network side, at least one set of time unit offset values corresponding to the first RS resource set associated with the first RS resource among the RS resources is determined. For example, the UE determines RS resource 1, RS resource 2, and RS resource 3, which are configured in an RS resource list of RS resource set 1; the UE determines RS resource 4 and RS resource 5, which are configured in an RS resource list of RS resource set 2. The UE determines a set of time-slot offset values {0, 1, 2, 3} corresponding to RS resource set 1, and determines a set of time-slot offset values {1, 2} corresponding to RS resource set 2.

In some embodiments, when at least one set of time unit offset values corresponding to the first RS resource set associated with the first RS resource among the RS resources is determined according to an indication from the network side, the first time unit offset value corresponding to the first RS resource is a second time unit offset value corresponding to the first RS resource set associated with the first RS resource, and the first time unit offset value set corresponding to the first RS resource is a second time unit offset value set corresponding to the first RS resource set associated with the first RS resource.

The first indication information indicates associations between second time unit offset values corresponding to at least part of the first RS resource sets associated with each first RS resource in the at least one first RS resource and second time unit offset value sets corresponding to each first RS resource set.

In some embodiments, at least part of the first RS resource sets associated with one first RS resource is: the first RS resource set associated with the first RS resource and triggered by the DCI.

In the above embodiments, the first indication information may indicate the associations between the first time unit offset values of each first RS resource in the at least one of the first RS resources and the first time unit offset value sets corresponding to the first RS resources, by indicating associations between the second time unit offset values corresponding to at least part of the first RS resource sets associated with each first RS resource in the at least one first RS resource and the second time unit offset value sets corresponding to each of the first RS resource sets.

Taking the above configuration of a set of time-slot offset values {0, 1, 2, 3} for RS resource set 1 and a set of time-slot offset values {1, 2} for RS resource set 2 as an example, when the RS resource 4 and RS resource 4 are triggered through DCI, and the time-slot offset value 2 is indicated, the first indication information is used to indicate the association between the time-slot offset value 2 of the RS resource set 2 and {1, 2}.

In one embodiment, the method of the embodiment includes:

- the first RS resource in the at least one RS resource includes first RS resources;
- associations between the second time unit offset values corresponding to each first RS resource set associated with the first RS resource in the at least one RS resource and the second time unit offset value sets corresponding to each first RS resource set are the same; and
- the first indication information indicates an association.

For each first RS resource set associated with the first RS resource in the at least one RS resource, one first indication information can be used to indicate the association between the second time unit offset value corresponding to each first RS resource set and the second time unit offset value set corresponding to each first RS resource set.

In some embodiments, the association between the second time unit offset value and the second time unit offset value set includes at least one of the followings.

(1) The second time unit offset value is a time unit offset value at a first position in the second time unit offset value set, and the first position is a position indicated by the first indication information.

Through the first indication information, the second time unit offset value at the first position in the second time unit offset value set corresponding to each first RS resource set associated with the first RS resource can be determined. When the first indication information indicates an association, the second time unit offset value at the same position in the second time unit offset value set corresponding to each first RS resource set associated with the first RS resource may be determined through the first indication information.

In some embodiments, the second time unit offset value is the time unit offset value at the first position in the second time unit offset value set, any of the followings.

① The second time unit offset value is a time unit offset value with the first sequence in the second time unit offset value set, and the first sequence is a sequence indicated by the first indication information.

Assuming that the time unit is a time slot, the UE determines a set of time-slot offset values corresponding to three RS resource sets according to the indication of the network side: {0, 1, 2, 3}, {1, 2}, {2, 3, 4, 5}, respectively. When the UE triggers the RS resources in the three RS resource sets according to the DCI, the UE indicates that the sequence is 2 according to the first indication information carried in the DCI, and determines that the time-slot offset values corresponding to the RS resources in the three RS resource sets are 1, 2, 3 respectively.

② The second time unit offset value is a time unit offset value corresponding to a first sequence number in the second time unit offset value set, and the first sequence number is a sequence number indicated by the first indication information.

For the same sequence number, if the network side configures different time unit offset values for each RS resource set, the UE may transmit different RS resource sets at different time unit offset positions. The sequence number can be a sequence function $n=m-k$, where n is the sequence, m is the sequence number, k is a natural number less than m (the initial time unit offset value position is set to 1) or k is a natural number less than or equal to m (the initial time unit offset value position is set to 0). Assuming that the time unit is a time slot, the position of the initial time-slot offset value is set to 1, and for a set of time-slot offset values, the sequence is $n=m-1$, and the UE determines that sets of time slot offset values corresponding to three RS resource sets indicated by the network side device are: {0, 1, 2, 3}, {1, 2}, {2, 3, 4, 5}. The UE triggers the three RS resource sets according to the DCI, and when the sequence number indicated by the first indication information carried in the DCI is 1, determines that the time-slot offset values corresponding to the three RS resource sets are 0, 1, and 2 respectively.

(2) The second time unit offset value is a time unit offset value associated with the first triggering state in the second time unit offset value set, and the first triggering state is a triggering state indicated by the first indication information.

When the first indication information indicates an association, the second time unit offset value of the first triggering state in the second time unit offset value set corresponding to each first RS resource set may be determined through the first indication information. Assuming that the time unit is a time slot, the UE determines that the RS resource set 1 corresponds to a set of time-slot offset values {2, 5, 4} according to the indication of the network side device, where triggering state 1 corresponds to the time-slot offset value 2, triggering state 2 corresponds to the time-slot offset value 5, and triggering state 3 corresponds to the time-slot offset value 4. When the UE indicates the triggering state 2 according to the first indication information, it determines that the indicated time-slot offset value is 5.

(3) The second time unit offset value is a time unit offset value whose identifier is a first identifier in the second time unit offset value set, and the first identifier is an identifier indicated by the first indication information.

When the first indication information indicates an association, the second time unit offset value of the first triggering state in the second time unit offset value set corresponding to each first RS resource set may be determined through the first indication information. Assuming that the time unit is a time slot, the UE determines that a set of time-slot offset values corresponding to one RS resource set according to the network side device are respectively: {0, 1, 2, 3}; the corresponding identifiers are {2, 1, 3, 0}. When the UE triggers the RS resources in the RS resource set according to the DCI, it determines that the time-slot offset value corresponding to the RS resource in the RS resource set is 3 according to the identifier indicated by the first indication information carried in the DCI being 0.

For the above associations and determination schemes, in one embodiment, the first indication information indicates that the association between the second time unit offset value and the second time unit offset value set includes at least one of the followings.

(1) The first indication information indicates that the second time unit offset value is a time unit offset value at a first position in the second time unit offset value set or the second time unit offset value is pre-agreed as a time unit offset value at a first position indicated by the first indication information in the second time unit offset value set, where the first indication information indicates the first position.

(2) The first indication information indicates that the second time unit offset value is a time unit offset value associated with a first triggering state in the second time unit offset value set or the second time unit offset value is pre-agreed as a time unit offset value associated with a first triggering state indicated by the first indication information in the second time unit offset value set, where the first indication information indicates the first triggering state.

(3) The first indication information indicates that the second time unit offset value is a time unit offset value identified by a first identifier in the second time unit offset value set or the second time unit offset value is pre-agreed as a time unit offset value identified by a first identifier indicated by the first indication information in the second time unit offset value set, where the first indication information indicates the first identifier.

The pre-agreed manner can be pre-agreed according to a protocol. It can also be that the UE receives a third indication information from the network side device, and the third indication information indicates that the second time unit offset value is a time unit offset value at a first position/in a first triggering state/identified by a first identifier indicated by the first indication information in the second time unit offset value set, etc.

If the UE receives the third indication information from the network side device, the step of receiving the third indication information may be before S302: "receiving the DCI from the network side, and determining at least one RS resource in the RS resources according to the DCI".

In some embodiments, the third indication information is the same indication information as the second indication information.

In some embodiments, the first indication information indicates that the second time unit offset value is a time unit offset value at the first position in the second time unit offset value set or the second time unit offset value is pre-agreed as a time unit offset value at the first position indicated by the first indication information in the second time unit offset value set, where the first indication information indicates the first position, including any of the followings.

(1) The first indication information indicates that the second time unit offset value is a time unit offset value with a first sequence in the second time unit offset value set or the second time unit offset value is pre-agreed as a time unit offset value with a first sequence indicated by the first indication information in the second time unit offset value set, where the first indication information indicates the first sequence.

(2) The first indication information indicates that the second time unit offset value is a time unit offset value corresponding to a first sequence number in the second time unit offset value set or the second time unit offset value is pre-agreed as a time unit offset value corresponding to a first sequence number indicated by the first indication information in the second time unit offset value set, where the first indication information indicates the first sequence number.

The association indicated by the first indication information may be a combination of the aforementioned associations. Specifically, the second association may be combined with any other association, such as when the second association is combined with the first association, through the first indication information, the UE may determine the second time unit offset value at the first position in the first triggering state in the second time unit offset value set corresponding to each first RS resource set. Assuming that the time unit is a time slot, the UE determines that the time-slot offset values corresponding to the RS resource set according to the indication of the network side device are: {0, 1, 2, 3} corresponding to triggering state 1, {1, 2} corresponding to triggering state 2, {2, 3, 4, 5} corresponding to triggering state 3, when the UE triggers the RS resource in the RS resource set in triggering state 2 according to the DCI, it indicates the time-slot offset value of the sequence 2 in the triggering state 2 according to the first indication information carried in the DCI, and determines the time-slot offset value corresponding to the RS resource in this RS resource set is 2.

When the UE determines at least one set of time unit offset values corresponding to RS resources according to the network side device, the above determination scheme 1 may be used for all RS resources, or the above determination scheme 2 may be used for all RS resources, or the above determination scheme 1 may be used for some RS resources, and the above determination scheme 2 used for some RS resources.

In some embodiments, determining at least one set of time unit offset values corresponding to the RS resource according to an indication from the network side, includes:

determining at least one set of time unit offset values corresponding to the RS resources according to at least one set of time unit offset values corresponding to each RS resource independently configured by the network side for at least part of the RS resources. The numbers of configured time unit offset values can be the same or different. At least one set of configured time unit offset values corresponding to each RS resource may include at least one set of time unit offset values applicable to all triggering states, and may include at least one set of time unit offset values corresponding to at least part of triggering states.

In some embodiments, determining at least one set of time unit offset values corresponding to the RS resource according to an indication from the network side, includes:

according to at least one set of time unit offset values corresponding to at least one RS resource in at least part of the RS resources independently configured by the network side in at least part of the triggering states for each of the at least one RS resource, determining at least one set of time unit offset values corresponding to the RS resource.

This scheme establishes an association between the triggering state of the RS resource and the RS time-domain transmission position, so that in the case of the same DCI overhead as the previous method, more RS resource time-domain transmission position combinations can be indicated through the DCI.

In one embodiment, the network side independently configures at least one set of time unit offset values for each of at least one RS resource in at least part of the RS resources, where the at least one set of time unit offset values corresponds to the each of the at least one RS resource in all triggering states.

According to an indication from the network side, when determining a set of time unit offset values corresponding to each triggering state in at least some of triggering states of RS resources, it can be determined that the network side configures a set of time unit offset values consisting of time unit offset values corresponding to each of at least some of triggering states for each RS resource. In one embodiment, according to an indication from the network side, a set of time unit offset values consisting of time unit offset values corresponding to each of a part of triggering states configured for each RS resource is determined. For example, RS resource 1 has three triggering states, and a set of time-slot offset values {2, 5} is configured for RS resource 1, where triggering state 1 corresponds to a time-slot offset value 2, and triggering state 2 corresponds to a time-slot offset value 5. In one embodiment, according to an instruction from the network side, a set of time unit offset values consisting of time unit offset values corresponding to each of all triggering states configured for each RS resource is determined. For example, RS resource 1 has three triggering states, and a set of time-slot offset values {2, 5, 4} is configured for RS resource 1, where triggering state 1 corresponds to a time-slot offset value 2, and triggering state 2 corresponds to a time-slot offset value 5, triggering state 3 corresponds to a time-slot offset value 4. For example, RS resource 1 has three triggering states, and a time-slot offset value is configured for each triggering state of RS resource 1, which are 1, 2, and 3 respectively, and the time-slot offset values corresponding to each triggering state configured for RS resource 1 forms a set of time-slot offset values {1, 2, 3}.

In some embodiments, according to an instruction from the network side, it is determined that a set of time unit offset values corresponding to each triggering state in at least some triggering states may be, in one embodiment, a set of time unit offset values corresponding to each triggering state in a part of triggering states configured for the RS resources. For example, RS resource 1 has three triggering states, a set of time-slot offset values {2, 5, 4} is configured for triggering state 1 of the RS resource 1, and a set of time-slot offset values {0, 1, 2} is configured for triggering state 2 of the RS resource 1. In one embodiment, a set of time unit offset values corresponding to each triggering state in all triggering states may also be configured for the RS resource. For example, RS resource 1 has three triggering states, a set of time-slot offset values {2, 5, 4} is configured for triggering state 1 of the RS resource 1, a set of time-slot offset values {0, 1, 2} is configured for triggering state 2 of the RS resource 1, and a set of time-slot offset values {0, 3, 4} is configured for triggering state 3 of the RS resource 1.

The first time unit offset value set corresponding to at least one RS resource includes at least one of the followings.

(1) A set of time unit offset values including time unit offset values respectively corresponding to each triggering state configured for a second RS resource.

(2) A set of time unit offset values including all time unit offset values corresponding to a first triggering state configured for a second RS resource.

Here, the first triggering state is a corresponding triggering state when the DCI triggers the first RS resource.

When the network-side device adopts the configuration scheme 2 to configure the time unit offset value for at least one RS resource, the RS resource for which the time unit offset value is configured includes at least one first RS resource, and the UE determines at least one set of time unit offset values corresponding to the first RS resource set associated with each first RS resource by the network side, which may include at least one set of time unit offset values applicable to all triggering states, or may include at least one set of time unit offset values corresponding to at least part of the triggering states respectively.

In some embodiments, the RS resources include first RS resources, and determining at least one set of time unit offset values corresponding to the RS resources according to an instruction from the network side, includes:

determining at least one set of time unit offset values corresponding to the RS resource, according to at least one set of time unit offset values independently configured by the network side for each of at least part of first RS resource sets associated with the plurality of first RS resources, where the at least one set of time unit offset values corresponds to the each of the first RS resource sets.

In one embodiment, the first RS resource sets associated with at least part of the plurality of first RS resources include multiple second RS resource sets, and the second RS resource set is a first RS resource set where at least part of associated triggering states are configured with at least one set of corresponding time unit offset values and the at least part of associated triggering states include triggering states indicated by the DCI, in the first RS resource sets. For example, the triggered first RS resources include RS resource 1, RS resource 2, RS resource 3, RS resource 4, RS resource 5, RS resource 6, and RS resource 7; where the RS resource 1, the RS resource 2 and the RS resource 3 are associated with RS resource set 1, the RS resource 4 and the RS resource 5 are associated with RS resource set 2, the RS resource 5, the RS resource 6 and the RS resource 7 are associated with RS resource set 3, and the UE, according to the instruction of the network side, determines a set of time unit offset values applicable to all triggering states for the RS resource set 1; determines two sets of time unit offset values for the RS resource set 2, i.e., a set of time unit offset values corresponding to triggering state 1 and a set of time unit offset values corresponding to triggering state 2; determines a set of time unit offset values applicable to all triggering states for the RS resource set 1; and determines three sets of time unit offset values for the RS resource set 3, i.e., a set of time unit offset values applicable to all triggering states, a set of time unit offset values corresponding to triggering state 1, and a set of time unit offset values corresponding to triggering state 2.

In one embodiment, the at least part of first RS resource sets associated with the plurality of first RS resources include multiple second RS resource sets, and determining at least one set of time unit offset values corresponding to the RS resources according to the indication of the network side, includes:

determining at least one set of time unit offset values corresponding to the RS resources according to at least one set of time unit offset values in at least part of triggering states corresponding to the respective second RS resource sets in at least part of the plurality of second RS resource sets independently configured by the network side.

In some embodiments, when it is determined that a set of time unit offset values is composed of time unit offset values corresponding to at least part of the triggering states corresponding to each configured second RS resources set, a set of time unit offset values consisting of time unit offset values corresponding to each triggering state is configured for the second RS resource set. In one embodiment, a set of time unit offset values including time unit offset values corresponding to each of at least part of triggering states is configured for each second RS resource set. For example, RS resource set 1 has three triggering states, and a set of time-slot offset values {2, 5} is configured for the RS resource set 1, where the triggering state 1 corresponds to a time-slot offset value 2, and the triggering state 2 corresponds to a time-slot offset value 5. In one embodiment, a set of time unit offset values consisting of time unit offset values corresponding to each triggering state in all triggering states is configured for the respective second RS resource sets. For example, RS resource set 1 has three triggering states, and a set of time-slot offset values {2, 5, 4} is configured for the RS resource set 1, where the triggering state 1 corresponds to a time-slot offset value 2, and the triggering state 2 corresponds to a time-slot offset value is 5, and the triggering state 3 corresponds to a time-slot offset value 4.

When determining at least one set of time unit offset values corresponding to each of the second RS resource sets independently configured by the network side in their corresponding at least part of triggering states, In one embodiment, a set of time unit offset values corresponding to each triggering state in a part of the triggering states can be configured to the respective second RS resource sets. For example, RS resource set 1 has three triggering states, a set of time-slot offset values {2, 5, 4} is configured for triggering state 1 of the RS resource set 1, and a set of time-slot offset values {0, 1, 2} is configured for triggering state 2 of the RS resource set 1. In one embodiment, a set of time unit offset values corresponding to each triggering state in all triggering states may also be configured for the respective second RS resource sets. For example, RS resource set 1 has three triggering states, a set of time-slot offset values {2, 5, 4} is configured for triggering state 1 of the RS resource set 1, a set of time-slot offset values {0, 1, 2} is configured for triggering state 2 of the RS resource set 1, and a set of time-slot offset values {0, 3, 4} is configured for triggering state 3 of the RS resource set 1.

In some embodiments, at least one of second time unit offset value sets corresponding to a first RS resource set includes at least one of the followings:

a set of time unit offset values including time unit offset values corresponding to each triggering state configured for the first RS resource set;

a set of time unit offset values including all time unit offset values corresponding to the first triggering state configured for the first RS resource set;

where the first triggering state is a corresponding triggering state when the DCI triggers the first RS resource set.

In some embodiments, at least one of second time unit offset value sets corresponding to a second RS resource set includes a set of time unit offset values corresponding to the triggering state indicated by the DCI.

In some embodiments, according to an instruction from the network side, determining at least one set of time unit offset values corresponding to the RS resource includes:

Scheme 1: determining the configuration of RS resources and at least one set of corresponding time unit offset values according to RRC signaling sent by the network side.

In some embodiments, determining the configuration of the indicated RS resources and at least one set of corresponding time unit offset values according to RRC signaling sent by the network side, includes: determining, according to RRC signaling sent by the network side, the configuration of the indicated RS resources, the configuration of the RS resource set associated with the RS resources, and at least one set of time unit offset values corresponding to the RS resource set associated with the RS resources.

Scheme 2: determining the configuration of RS resources and at least one set of corresponding time unit offset values according to MAC-CE signaling sent by the network side.

In some embodiments, determining the configuration of RS resources and at least one set of corresponding time unit offset values according to MAC-CE signaling sent by the network side, includes:

determining, by the network side through MAC-CE signaling, the configuration of the indicated RS resources, the configuration of the RS resource set associated with the RS resources, and at least one set of time unit offset values corresponding to the RS resource set associated with the RS resources.

Scheme 3: determining the configuration of the RS resources and corresponding multiple time unit offset values of the RS resources according to RRC signaling sent by the network side, and determining, according to MAC-CE signaling sent by the network side, at least one set of time unit offset values in the multiple time unit offset values corresponding to at least part of the RS resources.

In some embodiments, determining the configuration of the RS resources and corresponding multiple time unit offset values of the RS resources according to RRC signaling sent by the network side, and determining, according to MAC-CE signaling sent by the network side, at least one set of time unit offset values in the multiple time unit offset values corresponding to at least part of the RS resources, includes: determining, according to RRC signaling sent by the network side, the configuration of the RS resource set associated with the indicated RS resources and time unit offset values corresponding to the RS resource set associated with the indicated RS resources, and determining, according to MAC-CE signaling sent by the network side, at least one set of time unit offset values among the plurality of time unit offset values corresponding to the RS resource set associated with the RS resources.

In some embodiments, the bitwidth of the first indication information in the DCI is a predefined fixed value, or the bitwidth of the first indication information in the DCI is determined according to the number of time unit offset values included in each of at least one set of time unit offset values. For example, the network side agrees with the UE that the first indication information occupies N bits (N is a positive integer) in the DCI, commonly including 1 bit, 2 bits, 3 bits, 4 bits, etc.

In some embodiments, the bitwidth of the first indication information in the DCI is determined according to the number of time unit offset values included in each of the at least one set of time unit offset values, including:

the bitwidth of the first indication information in the DCI is determined according to the maximum number of time unit offset values included in each of the at least one set of time unit offset values.

The bitwidth of the first indication information in the DCI is $\lceil \log_2 N \rceil$ or $[\log_2(N+1)]$, where N is the maximum number of time unit offset values in each set of time unit offset values. For example, the network side indicates to the UE three configured RS resource sets, i.e., RS set 1, RS set 2 and RS set 3, and sets of time unit offset values corresponding to the three RS resource sets are respectively: $\{0, 1, 2, 3\}$, $\{1, 2\}$, $\{2, 2, 4, 4\}$. Since the maximum number of time unit offset values corresponding to the three RS resources is 4, the bitwidth of the first indication information in the DCI is $\lceil \log_2 4 \rceil = 2$ bits.

In some embodiments, the bitwidth of the first indication information in the DCI is determined according to RRC signaling or MAC-CE signaling sent by the network side.

In some embodiments, the RS resources are RS resources configured for the UE in one BWP/serving cell/frequency band.

In some embodiments, a set of time unit offset values of the RS resource is determined according to the following information, including:

(1) The maximum time unit offset value configured by the network side.

A set of time unit offset values corresponding to the RS resource are values from the minimum time unit offset value to the maximum time unit offset value in default, and the maximum time unit offset value can be determined through the DCI indication. Taking the time unit as a time slot as an example, if the default minimum slot offset value is 0, the UE determines a set of time-slot offsets corresponding to the RS resource 1 are $\{0, 1, 2, 3\}$ according to the maximum time-slot value 3 of the RS resource 1 configured by the network side device.

In some embodiments, the maximum time unit offset value includes: the maximum time unit offset value of the RS resource set associated with the RS resource. Taking the RS resource as an SRS resource as an example, it may be the maximum time unit offset value corresponding to one or more RS resource sets.

(2) The minimum time unit offset value and the maximum time unit offset value configured by the network side.

A set of time unit offset values corresponding to the RS resource are values from the configured minimum time unit offset value to the maximum time unit offset value. The minimum time unit offset value and the maximum time unit offset value may be determined through the DCI indication. Taking the time unit as the time slot as an example, if the UE determines a set of time-slot offset values corresponding to the RS resource 1 is $\{2, 3, 4, 5, 6\}$ according to the minimum slot offset value 2 and the maximum slot offset value 6 of the RS resource 1 which are configured by the network side device.

In some embodiments, the minimum time unit offset value and the maximum time unit offset value of the RS resource include: the minimum time unit offset value and the maximum time unit offset value of the RS resource set associated with the RS resource. Taking the RS resource as an SRS resource as an example, it may be the minimum time unit offset value and the maximum time unit offset value corresponding to one or more RS resource sets.

(3) The number of bits N occupied by the first indication information in the DCI.

A set of time unit offset values corresponding to the RS resource includes values from the minimum time unit offset value to $2^N$ or $2^N-1$ in default, and the time unit offset value can be determined according to the number of bits N occupied by the first indication information in the DCI. ① Taking the time unit as a time slot as an example, the default minimum time-slot offset value is 1, and the UE configures a set of time-slot offset values {1, 2, 3, 4} corresponding to the RS resource 1 according to number of bits 2 occupied by the first indication information in the DCI indicated by the network side device. ② If the default minimum time-slot offset value is 0, the UE configures a set of time-slot offset values {0, 1, 2, 3} corresponding to the RS resource 1 according to the number of bits 2 occupied by the first indication information in the DCI indicated by the network side device is.

In some embodiments, when at least one set of time unit offset values corresponding to RS resources includes one or more sets of time unit offset values corresponding to RS resource sets associated with the RS resources, a set of time unit offset values corresponding to the RS resource sets are values from the minimum time unit offset value to $2^N$ or $2^N-1$ in default, and the time unit offset value may be determined according to the number of bits N occupied by the first indication information in the DCI. ① If the default minimum time-slot offset value is 1, the UE configures a set of time-slot offset values {1, 2, 3, 4} corresponding to RS resource set 1 according to the number of bits 2 occupied by the first indication information in the DCI indicated by the network side device. ② If the default minimum time-slot offset value is 0, the UE configures a set of time-slot offset values {0, 1, 2, 3} corresponding to RS resource set 1 according to the number of bits 2 occupied by the first indication information in the DCI indicated by the network side device.

(4) The number of bits N occupied by the first indication information in the DCI and the configured minimum time unit offset value.

A set of time unit offset values corresponding to the RS resource are configured as values from the minimum time unit offset value to $2^N$ or $2^N-1$, and the time unit offset values can be determined according to the number of bits N occupied by the first indication information in the DCI. Taking the time unit as a time slot as an example, ① the UE determines a set of time-slot offset values {2, 3, 4} corresponding to the RS resource 1, if the network side device indicates that the bitwidth of the first indication information in the DCI is 2, and the configured minimum time-slot offset value is 2. In one embodiment, ② The UE configures a set of time-slot offset values {0, 1, 2, 3} corresponding to the RS resource 1, if the network side device indicates that the minimum time-slot offset value is 0 and the bitwidth of the first indication information in the DCI is 2.

In some embodiments, when at least one set of time unit offset values corresponding to RS resources includes one or more sets of time unit offset values corresponding to RS resource sets associated with RS resources, a set of time unit offset values corresponding to RS resource sets include values from the minimum time unit offset value to $2^N$ or $2^N-1$, the time unit offset value may be determined according to the number of bits N occupied by the first indication information in the DCI. Taking the time unit as a time slot as an example, ① the UE determines a set of time-slot offset values {2, 3, 4} corresponding to the RS resource set 1 if the network side device indicates that the bitwidth of the first indication information in the DCI is 2, and the minimum time-slot offset value is 2. In one embodiment, ② the UE determines a set of time unit offset values {0, 1, 2, 3} corresponding to the RS resource set 1, if the network side device indicates that the bitwidth of the first indication information in the DCI is 2 and the minimum time-slot offset value is 0.

In some embodiments, determining the first time unit offset value corresponding to the RS resource according to the first indication information in the DCI, includes at least one of the followings.

(1) Determining a third RS resource that is not configured with at least one set of corresponding time unit offset values, and adopting a pre-agreed time unit offset value for the third RS resource. In some embodiments, the pre-agreed time unit offset value is 0.

For example, the UE determines two RS resources, i.e., RS resource 1 and RS resource 2, according to the instruction of the network side device, where the time unit offset values corresponding to the RS resource 1 and the RS resource 2 are respectively {0, 1, 2, 3}, {1, 2}. When the UE triggers the RS resource 1 and the RS resource 2 according to the DCI, it determines that the time-slot offset value corresponding to the RS resource 1 is 1 according to that a sequence corresponding to the time unit offset value is 2 which is indicated by the first indication information carried in the DCI. The RS resource 2 is not configured with a corresponding time unit offset value, so the time unit offset value corresponding to RS resource 2 is 0 as agreed in advance. Further, it determines an RS resource set associated with a third RS resource that is not configured with at least one set of corresponding time unit offset values, and adopts a pre-agreed time unit offset value for the third RS resource set.

For example, the UE determines the time unit offset values corresponding to the two RS resource sets, RS set 1 and RS set 2, according to the instruction of the network side device as: {0, 1, 2, 3}, {1, 2}. When the UE triggers RS set 1 and RS set 2 according to the DCI, it determines that the time-slot offset value corresponding to the RS set 1 is 1 according to that a sequence corresponding to the time unit offset value is 2 which is indicated by the first indication information carried in the DCI. The RS set 2 is not configured with a corresponding time unit offset value, and the time unit offset value corresponding to the RS set 2 is 0 as agreed in advance.

Further, it determines a third RS resource that is not configured with at least one set of time unit offset values under a part of triggering states, and adopts a pre-agreed time unit offset value for the third RS resource that is not configured with at least one set of time unit offset values under the part of the triggering states.

For example, the UE determines that the time unit offset values corresponding to the RS resource 1 in the triggering state 1 and the triggering state 2 are respectively {0, 1, 2, 3}, {1, 2} according to the instruction of the network side device. When the UE triggers the RS resource 1 in the triggering state 3 according to the DCI, the corresponding time unit offset value of the RS resource 1 in the triggering state 3 is 0 as agreed in advance.

Further, it determines a third RS resource set associated with a third RS resource that is not configured with at least one set of time unit offset values under a part of triggering states, and adopts a pre-agreed time unit offset value for the third RS resource set associated with the third RS resource that is not configured with at least one set of time unit offset values under the part of the triggering states.

For example, the UE determines that the time unit offset values corresponding to RS set 1 in triggering state 1 and triggering state 2 are respectively {0, 1, 2, 3}, {1, 2} according to the instruction of the network side device. When the UE triggers the RS set 1 in triggering state 3 according to the DCI, the corresponding time unit offset value of the RS set 1 in triggering state 3 is 0 as agreed in advance.

(2) Determining a fourth RS resource without a time unit offset value corresponding to an association indicated by the first indication information in a corresponding first time unit offset value set, and adopting a pre-agreed time unit offset value for the fourth RS resource, or adopting a minimum time unit offset value, or a maximum time unit offset value, or a time unit offset value at a specified position in the first time unit offset value set corresponding to the fourth RS resource.

For example, the UE determines the time unit offset values {0, 1, 2, 3}, {1, 2} corresponding to two RS resources: RS resource 1 and RS resource 2 according to the instruction of the network side device. When the UE triggers the RS resource 1 and the RS resource 2 according to the DCI, it determines that the time-slot offset value corresponding to the RS resource 1 is 3 according to that a sequence of the time unit offset value indicated by the first indication information carried in the DCI is 4. There is no time unit offset value of which the sequence is 4 in the RS resource 2, and the time unit offset value corresponding to the RS resource 2 is the minimum time unit offset value 1.

Further, when determining a fourth RS resource set associated with the fourth RS resource without a time unit offset value corresponding to the association indicated by the first indication information in the corresponding first time unit offset value set, and it adopts a pre-agreed time unit offset value for the fourth RS resource set, or adopts the minimum time unit offset value, or the maximum time unit offset value, or the time unit offset value at a specified position in the first time unit offset value set corresponding to the fourth RS resource set.

For example, the UE determines the time unit offset values corresponding to the two RS resource sets RS set 1 and RS set 2 according to the instruction of the network side device as: {0, 1, 2, 3}, {1, 2}. When the UE triggers the RS set 1 and the RS set 2 according to the DCI, it determines that the time-slot offset value corresponding to the RS set 1 is 3 according to that a sequence of the time unit offset value indicated by the first indication information carried in the DCI is 4. The RS set 2 does not have a time unit offset value whose sequence is 4, then the time unit offset value corresponding to the RS set 2 is the maximum time unit offset value of 2.

Further, when determining a fourth RS resource without a time unit offset value corresponding to the association indicated by the first indication information in parts of the triggering states of the corresponding first time unit offset value set, it adopts a pre-agreed time unit offset value for the fourth RS resource in triggering states without corresponding time unit offset values, or adopts the minimum time unit offset value, or the maximum time unit offset value, or the time unit offset value at a specified position in the first time unit offset value set corresponding to the fourth RS resource.

For example, the UE determines that the time unit offset values corresponding to the RS resource 1 in the triggering state 1 and the triggering state 2 are respectively {0, 1, 2, 3}, {1, 2} according to the instruction of the network side device. When the UE triggers the RS resource 1 in the triggering state 2 according to the DCI, the corresponding time unit offset value of the RS resource 1 in the triggering state 3 is pre-agreed as 0 in response to the first indication information carried in the DCI indicating a time unit offset value of a sequence 4.

Further, when determining a fourth RS resource set associated with the fourth RS resource without a time unit offset value corresponding to the association indicated by the first indication information in the corresponding first time unit offset value set, it adopts a pre-agreed time unit offset value for the fourth RS resource set in a triggering state without corresponding time unit offset values, or adopts the minimum time unit offset value, or the maximum time unit offset value, or the time unit offset value at a specified position in the first time unit offset value set corresponding to the fourth RS resource.

For example, the UE determines that the time unit offset values corresponding to RS set 1 in triggering state 1 and triggering state 2 are respectively: {0, 1, 2, 3}, {1, 2} according to the instruction of the network side device. When the UE triggers the RS set 1 in the triggering state 2 according to the DCI, the corresponding time unit offset value of the RS set 1 in the triggering state 2 is pre-agreed as 0 in response to the first indication information carried in the DCI indicating a time unit offset value of which sequence is 4.

The following will describe the corresponding implementations of the two embodiments mentioned above on the UE side, and the following will mainly explain the correspondence implementations between the UE side and the network side. For repeated content, please refer to the corresponding parts above, which will not be repeated below.

Implementation 1

In this implementation, the UE receives configuration information of an SRS resource set and the DCI sent by a base station.

The UE determines transmission time-slots of each aperiodic SRS resource set triggered by the DCI according to transmission time-slot indication information in the DCI, and the transmission time-slots of each SRS resource set are time slots corresponding to time-slot offset values corresponding to each SRS resource set determined according to the sequence numbers indicated by the transmission time-slot indication information. Still taking the above example as an example, the UE determines that the SRS set 1 is transmitted over the first available time slot from a reference time slot corresponding to the SRS set 1, and the SRS set 2 is transmitted over the second available time slot from a reference time slot corresponding to the SRS set 2.

Implementation 3

The UE receives configuration information of an SRS resource set and the DCI sent by a base station.

The UE determines the transmission time-slots of each aperiodic SRS resource set triggered by the DCI according to the transmission time-slot indication information in the DCI, and the transmission slots of each SRS resource set are time-slots corresponding to the time-slot offset values corresponding to each SRS resource set determined according to the sequence numbers indicated by the transmission time-slot indication information.

The UE determines that the transmission time-slots of each SRS resource set are a quantity (the quantity is equal to time-slot offset value+1) of available time slots from the reference time slot corresponding to each SRS resource set determined according to the sequence number indicated by the transmission time-slot indication information.

When there is no time-slot offset value of a sequence number indicated by the DCI in an SRS resource set, the time-slot offset value corresponding to the SRS resource set is a default value, such as 0. It still takes that the base station configures three aperiodic SRS resource sets SRS set 1, SRS set 2 and SRS set 3 for the UE through RRC signaling, and the configured time-slot offset values of these three SRS resource sets in triggering state 1 are {0, 1, 2, 3}, {1, 2} and {2, 2, 4, 4} as an example. Assuming that the base station sends a DCI that triggers aperiodic SRS transmission to the UE, this DCI triggers the transmission of SRS set 1 and SRS set 2 through the triggering state 1, and the SRS transmission time-slot indication information in the DCI indicates that the sequence number is 3, then the time-slot offset value corresponding to the SRS set 1 is the third time-slot offset value 2 configured in triggering state 1, while the SRS set 2 does not have a third time-slot offset value in triggering state 1, so the time-slot offset value corresponding to the SRS set 2 should be a default value. In one embodiment, the default value is the first time-slot offset value configured by the base station for the SRS resource set, then the time-slot offset value corresponding to the SRS set 2 is 1 at this time. In one embodiment, the default value is 0, then the time-slot offset value corresponding to the SRS set 2 is 0 at this time.

Figure 4:
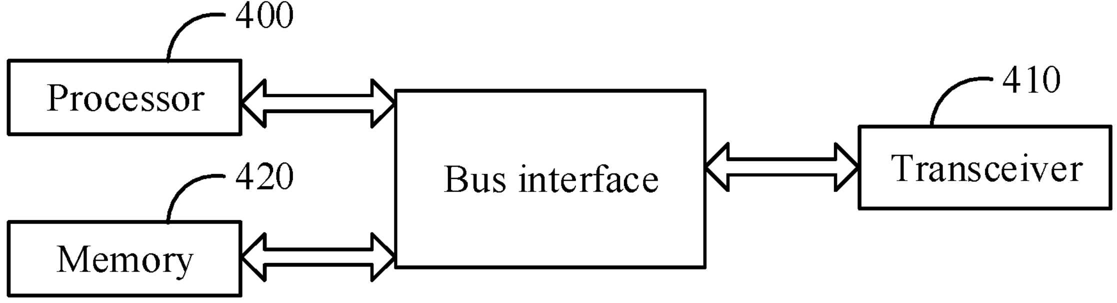
FIG. 4 is a schematic structural diagram of a RS transmission position indication apparatus according to an embodiment of the present application.

Embodiments of the present application further provide an RS transmission position indicating device, as shown in FIG. 4, including a memory 420, a transceiver 410, and a processor 400.

The memory 420 is configured to store computer programs; the transceiver 410 is configured to send and receive data under the control of the processor 400; the processor 400 is configured to read the computer programs in the memory and perform the following operations: indicating to the UE at least one set of time unit offset values corresponding to each of the configured RS resources;

triggering at least one RS resource in the RS resources through DCI, and sending first indication information through the DCI;

here, an association between the first time unit offset value corresponding to each RS resource in the at least one RS resource and the first time unit offset value set corresponding to each RS resource is indicated by the same first indication information. The first time unit offset value is a time unit offset value corresponding to the transmission position of each RS resource. The first time unit offset value set is one of the at least one set of time unit offset values.

In some embodiments, the at least one RS resource includes RS resources.

The associations between the first time unit offset values corresponding to the respective RS resources in the at least one RS resource and the first time unit offset value sets corresponding to the respective RS resources are the same.

The first indication information indicates an association.

In some embodiments, the association between the first time unit offset value and the first time unit offset value set includes at least one of the followings:

the first time unit offset value is a time unit offset value at the first position in the first time unit offset value set;

the first time unit offset value is a time unit offset value associated with the first triggering state in the first time unit offset value set;

the first time unit offset value is a time unit offset value identified with the first identifier in the first time unit offset value set.

The first position is a position indicated by the first indication information, the first triggering state is a triggering state indicated by the first indication information, and the first identifier is an identifier indicated by the first indication information.

In some embodiments, the first time unit offset value is the time unit offset value at the first position in the first time unit offset value set, any of the following:

the first time unit offset value is a time unit offset value of the first sequence in the first time unit offset value set;

the first time unit offset value is a time unit offset value corresponding to the first sequence number in the first time unit offset value set.

The first sequence is a sequence indicated by the first indication information, and the first sequence number is a sequence number indicated by the first indication information.

In some embodiments, indicating to the UE at least one set of time unit offset values corresponding to the RS resource, includes:

indicating to the UE at least one set of time unit offsets corresponding to the first RS resource set associated with the first RS resource among the RS resources, where the first RS resource is an associated RS resource set, and the associated RS resource set includes RS resources configured with at least one set of time unit offset values, the first RS resource set is a set of RS resources associated with at least one of the first RS resources and configured with at least one set of time unit offset values.

Here, the at least one RS resource includes at least one first RS resource, and the first time unit offset value corresponding to the first RS resource is the second time unit offset value corresponding to the first RS resource set associated with the first RS resource. The first time unit offset value set corresponding to the first RS resource is the second time unit offset value set corresponding to the first RS resource set associated with the first RS resource.

The first indication information indicates an association between the second time unit offset value corresponding to at least part of the first RS resource sets associated with each first RS resource in the at least one first RS resource and the second time unit offset value set corresponding to each first RS resource set.

Specifically, indicating to the UE at least one set of time unit offset values corresponding to each of the configured RS resources, including:

indicating to the UE at least one set of time unit offset values corresponding to the first RS resource set to which the first RS resource belongs among the RS resources.

Here, the association between the second time unit offset value corresponding to the first RS resource set and the second time unit offset value set corresponding to the first RS resource set is indicated by the first indication information, and through the indication of the first indication information, the second time unit offset value is a time unit offset value corresponding to the transmission position of the first RS resource set, and the second time unit offset value set is a set of time unit offset values corresponding to the first RS resource set.

In some embodiments, the first RS resource in the at least one RS resource includes first RS resources.

The associations between the second time unit offset value corresponding to each first RS resource set associated with the first RS resource in the at least one RS resource and the second time unit offset value set corresponding to each first RS resource set are the same.

The first indication information indicates an association.

In some embodiments, the association between the second time unit offset value and the second time unit offset value set includes at least one of the followings:

the second time unit offset value is a time unit offset value at the first position in the second time unit offset value set;

the second time unit offset value is a time unit offset value associated with the first triggering state in the second time unit offset value set;

the second time unit offset value is a time unit offset value identified with the first identifier in the second time unit offset value set.

The first position is a position indicated by the first indication information, the first triggering state is a triggering state indicated by the first indication information, and the first identifier is an identifier indicated by the first indication information.

In some embodiments, the second time unit offset value is a time unit offset value at the first position in the second time unit offset value set, specifically:

the second time unit offset value is the time unit offset value whose sequence is the first sequence in the second time unit offset value set;

the second time unit offset value is the time unit offset value corresponding to the first sequence number in the second time unit offset value set.

The first sequence is the sequence indicated by the first indication information, and the first sequence number is the sequence number indicated by the first indication information.

In some embodiments, the second RS resource set is at least one set of time unit offset values corresponding to at least part of the associated triggering states in the first RS resource set, and the at least part of the associated triggering states include the triggering state indicated by the DCI, in the first RS resource set.

The at least one second time unit offset value set corresponding to the second RS resource set is a set of time unit offset values corresponding to the triggering state indicated by the DCI.

In some embodiments, the second RS resource set is at least one set of time unit offset values corresponding to at least part of the associated triggering states in the first RS resource set, and the at least part of the associated triggering states include the triggering state indicated by DCI, in the first RS resource set, and the at least one second time unit offset value set corresponding to the first RS resource set, including at least one of the followings:

a set of time unit offset values including time unit offset values respectively corresponding to each triggering state configured for the second RS resource set;

a set of time unit offset values including all time unit offset values corresponding to the first triggering state configured for the second RS resource set.

Here, the first triggering state is the corresponding triggering state when the DCI triggers the first RS resource set.

In some embodiments, the first time unit offset value set corresponding to at least one RS resource includes at least one of the followings:

a set of time unit offset values including time unit offset values respectively corresponding to each triggering state configured for the RS resource;

a set of time unit offset values including all time unit offset values corresponding to the first triggering state configured for the first RS resource.

Here, the first triggering state is the corresponding triggering state when the DCI triggers the RS resource.

In some embodiments, indicating to the UE at least one set of time unit offset values corresponding to the RS resource, includes:

for at least part of the RS resources, independently configuring at least one set of time unit offset values corresponding to each RS resource.

In some embodiments, for at least part of the RS resources, independently configuring at least one set of time unit offset values corresponding to each RS resource, includes:

for at least one RS resource in at least part of the RS resources, independently configuring at least one set of time unit offset values corresponding to each RS resource in at least part of the triggering states.

In some embodiments, the RS resources indicated to the UE include first RS resources, and indicating to the UE at least one set of time unit offset values corresponding to the RS resources, includes:

for at least part of the first RS resource sets associated with the plurality of first RS resources, independently configuring at least one set of time unit offset values corresponding to each first RS resource set.

In some embodiments, the at least part of the first RS resource sets associated with the plurality of first RS resources include second RS resource sets, and independently configuring at least one set of time unit offsets corresponding to each first RS resource set, includes:

for at least part of the plurality of second RS resource sets, independently configuring at least one set of time unit offset values corresponding to each second RS resource set in each of at least part of the triggering states.

In some embodiments, indicating to the UE at least one set of time unit offset values corresponding to the RS resource, includes:

indicating to the UE the configuration of the RS resource and at least one set of time unit offset values corresponding to the RS resource through RRC signaling; or indicating to the UE the configuration of the RS resource and at least one set of time unit offset values corresponding to the RS resource through MAC-CE signaling; or indicating to the UE the configuration of the RS resource and time unit offset values corresponding to the RS resource through RRC signaling, and indicating to the UE at least one set of time unit offset values among the plurality of time unit offset values corresponding to at least part of the RS resources, through MAC-CE signaling.

In some embodiments, the bitwidth of the first indication information in the DCI is indicated to the UE through RRC signaling or MAC-CE signaling.

That is, the bitwidth of the first indication information in the DCI is indicated to the UE through RRC signaling or MAC-CE signaling.

In some embodiments, the bitwidth of the first indication information in the DCI is a predefined fixed value.

In one embodiment, the bitwidth of the first indication information in the DCI is determined according to the number of time unit offset values included in each of the at least one set of time unit offset values.

In some embodiments, the bitwidth of the first indication information in the DCI is determined according to the number of time unit offset values included in each of the at least one set of time unit offset values, specifically:

the bitwidth of the first indication information in the DCI is determined according to the maximum value of the number of time unit offset values included in each of the at least one set of time unit offset values.

In some embodiments, the RS resources are RS resources configured for the UE in one BWP/serving cell/frequency band.

In some embodiments, a set of time unit offset values of the RS resource is indicated in the following manner:

configuring the maximum time unit offset value, or configuring the minimum time unit offset value and the maximum time unit offset value, or, indicating the number of bits N occupied by the first indication information in the DCI, or indicating the number of bits N occupied by the first indication information in the DCI and configuring the minimum time unit offset value.

In some embodiments, the time unit is a time slot, a sub-slot, or a symbol.

Here, in FIG. 4, the bus architecture may include any number of interconnected buses and bridges, one or more processors represented by the processor 400 and various circuits of the memory represented by the memory 420 are linked together. The bus architecture can also link together various other circuits such as peripherals, voltage regulators, and power management circuits, etc., which are well known in the art and therefore will not be further described herein. The bus interface provides the interface. Transceiver 410 may be elements, including a transmitter and a receiver, providing a unit for communicating with various other devices over transmission media, including wireless channels, wired channels, optical cables, and other transmission media. The processor 400 is responsible for managing the bus architecture and general processing, and the memory 420 can store data used by the processor 400 when performing operations.

The processor 400 may be a Central Processing Unit, CPU, an Application Specific Integrated Circuit, ASIC, a Field-Programmable Gate Array, FPGA or a Complex Programmable Logic Device, CPLD. The processor can also adopt a multi-core architecture.

The processor 400 is configured to implement any of the methods provided in the embodiments of the present application according to the obtained executable instructions by invoking the computer program stored in the memory 420. The processor 400 and the memory 420 may also be arranged separately in physical.

Figure 5:
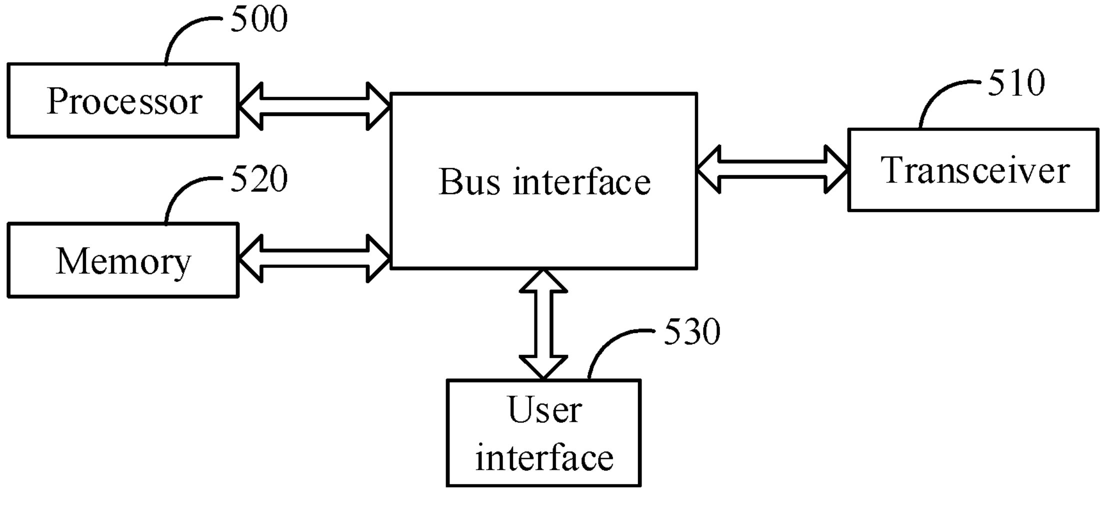
FIG. 5 is a schematic structural diagram of a RS transmission position determining apparatus according to an embodiment of the present application.

Correspondingly, embodiments of the present application further provide an apparatus for determining the transmission position of a reference signal RS, as shown in FIG. 5, including a memory 520, a transceiver 510, and a processor 500.

The memory 520 is configured to store computer programs; the transceiver 510 is configured to send and receive data under the control of the processor; the processor 500 is configured to read the computer programs in the memory and perform the following operations:

determining at least one set of time unit offset values corresponding to the RS resource according to an instruction from the network side;

receiving DCI sent by the network side, and determining at least one RS resource among the RS resources according to the DCI;

determining a first time unit offset value corresponding to the at least one RS resource according to the first indication information in the DCI;

determining the transmission position of the at least one RS resource according to the first time unit offset value corresponding to the at least one RS resource;

here, associations between the first time unit offset value corresponding to each RS resource in the at least one RS resource and the first time unit offset value set corresponding to each RS resource is indicated by the same first indication information. The first time unit offset value is a time unit offset value corresponding to the transmission position of each RS resource, and the first time unit offset value set is one of the at least one set of time unit offset values.

In some embodiment, the at least one RS resource includes RS resources.

The associations between the first time unit offset value corresponding to each RS resource in the at least one RS resource and the first time unit offset value set corresponding to each RS resource are the same.

The first indication information indicates an association.

In some embodiments, the association between the first time unit offset value and the first time unit offset value set includes at least one of the followings:

the first time unit offset value is a time unit offset value at the first position in the first time unit offset value set;

the first time unit offset value is a time unit offset value associated with the first triggering state in the first time unit offset value set;

the first time unit offset value is a time unit offset value identified with the first identifier in the first time unit offset value set;

the first position is a position indicated by the first indication information, the first triggering state is a triggering state indicated by the first indication information, and the first identifier is an identifier indicated by the first indication information.

In some embodiments, the first time unit offset value is the time unit offset value at the first position in the first time unit offset value set, any of the followings:

the first time unit offset value is a time unit offset value of which sequence is the first sequence in the first time unit offset value set;

the first time unit offset value is a time unit offset value corresponding to the first sequence number in the first time unit offset value set.

The first sequence is the sequence indicated by the first indication information, and the first sequence number is the sequence number indicated by the first indication information.

In some embodiments, determining at least one set of time unit offset values corresponding to the RS resource according to an instruction from the network side, includes:

determining at least one set of time unit offset values corresponding to a first RS resource set associated with the first RS resource among the RS resources indicated by the network side, where the first RS resource is a set of associated RS resources and the associated RS resources are configured with at least one set of time unit offset values, and the first RS resource set is an RS resource set associated with at least one of the first RS resources and configured with at least one set of time unit offset values.

Here, the at least one RS resource includes at least one first RS resource, and the first time unit offset value corresponding to the first RS resource is the second time unit offset value corresponding to the first RS resource set associated with the first RS resource. The first time unit offset value set corresponding to the first RS resource is the second time unit offset value set corresponding to the first RS resource set associated with the first RS resource.

The first indication information indicates associations between the second time unit offset value corresponding to at least part of the first RS resource sets associated with each first RS resource in the at least one first RS resource and the second time unit offset value set corresponding to each first RS resource set.

Specifically, determining at least one set of time unit offset values corresponding to the RS resource according to an instruction from the network side, includes:

determining at least one set of time unit offsets corresponding to the first RS resource set to which the first RS resource belongs among the RS resources indicated by the network side.

Here, the association between the second time unit offset value corresponding to the first RS resource set and the second time unit offset value set corresponding to the first RS resource set is indicated by the first indication information, and the second time unit offset value is a time unit offset value corresponding to the transmission position of the first RS resource set to which the first RS resource belongs, and the second time unit offset value set is a set of time unit offset values.

In some embodiments, the first RS resource in the at least one RS resource includes first RS resources.

The associations between the second time unit offset value corresponding to each first RS resource set associated with the first RS resource in the at least one RS resource and the second time unit offset value set corresponding to each first RS resource set are the same.

The first indication information indicates an association.

In some embodiments, the association between the second time unit offset value and the second time unit offset value set includes at least one of the followings:

the second time unit offset value is a time unit offset value at the first position in the second time unit offset value set, or, the second time unit offset value is a time unit offset value associated with the first triggering state in the second time unit offset value set; or, the second time unit offset value is a time unit offset value identified with a first identifier in the second time unit offset value set.

The first position is a position indicated by the first indication information, the first triggering state is a triggering state indicated by the first indication information, and the first identifier is an identifier indicated by the first indication information.

In some embodiments, the second time unit offset value is a time unit offset value at the first position in the second time unit offset value set, any of the followings:

the second time unit offset value is a time unit offset value whose sequence is the first sequence in the second time unit offset value set;

the second time unit offset value is a time unit offset value corresponding to the first sequence number in the second time unit offset value set.

The first sequence is the sequence indicated by the first indication information, and the first sequence number is the sequence number indicated by the first indication information.

In some embodiments, the second RS resource set is a first RS resource set which is configured with at least one set of time unit offset values in at least part of triggering states, and the at least part of triggering states include triggering states indicated by the DCI.

The at least one second time unit offset value set corresponding to the second RS resource set is a set of time unit offset values corresponding to the triggering states indicated by the DCI.

In some embodiments, the at least one second time unit offset value set corresponding to the first RS resource set includes at least one of the followings:

a set of time unit offset values including time unit offset values corresponding to each triggering state configured for the first RS resource set;

a set of time unit offset values including all time unit offset values corresponding to the first triggering state configured for the first RS resource set.

Here, the first triggering state is a corresponding triggering state when the DCI triggers the first RS resource set.

In some embodiments, the second RS resource set is a first RS resource set which is configured with at least one set of time unit offset values in at least part of triggering states, and the at least part of triggering states include triggering states indicated by the DCI. The first time unit offset value set corresponding to at least one RS resource includes at least one of the followings:

a set of time unit offset values including time unit offset values corresponding to each triggering state of the second RS resource configuration;

a set of time unit offset values including all time unit offset values corresponding to the first triggering state configured for the second RS resource.

Here, the first triggering state is a corresponding triggering state when the DCI triggers the first RS resource.

In some embodiments, determining at least one set of time unit offset values corresponding to the RS resource according to an instruction from the network side, includes:

determining at least one set of time unit offset values corresponding to the RS resources according to at least one set of time unit offset values corresponding to each RS resource independently configured by the network side for at least part of the RS resources.

In some embodiments, determining at least one set of time unit offset values corresponding to the RS resource according to an instruction from the network side, includes:

determining at least one set of time unit offset values corresponding to the RS resource according to at least one set of time unit offset values corresponding to at least one RS resource in at least part of the RS resources independently configured by the network side in at least part of the triggering states.

In some embodiments, the RS resources include first RS resources, and determining at least one set of time unit offset values corresponding to the RS resources according to an instruction from the network side, includes:

determining at least one set of time unit offset values according to at least one set of time unit offset values corresponding to the at least part of first RS resource sets associated with first RS resources independently configured by the network side.

In some embodiments, the first RS resource set associated with at least part of the plurality of first RS resources includes second RS resource sets, and determining at least one set of time unit offset values corresponding to the RS resources is determined according to an instruction from the network side, including:

determining at least one set of time unit offset values corresponding to the RS resources according to at least one set of time unit offset values corresponding to the second RS resource sets in the at least part of the second RS resource sets independently configured by the network side in at least part of the triggering states.

In some embodiments, determining at least one set of time unit offset values corresponding to the RS resource according to an instruction from the network side, includes:

determining the configuration of the RS resource and at least one set of time unit offset values corresponding the RS resource according to the RRC signaling sent by the network side; or determining the configuration of the RS resource and at least one set of time unit offset values corresponding the RS resource according to the MAC-CE signaling sent by the network side; or determining the configuration of the RS resource and time unit offset values corresponding to the RS resource according to the RRC signaling sent by the network side, and determining at least one set of time unit offset values in the plurality of time unit offset values corresponding to at least part of the RS resources.

In some embodiments, the bitwidth of the first indication information in the DCI is determined according to RRC signaling or MAC-CE signaling sent by the network side.

That is, the bitwidth of the first indication information in the DCI is determined through RRC signaling or MAC-CE signaling sent by the network side.

In some embodiments, the bitwidth of the first indication information in the DCI is a predefined fixed value.

In one embodiment, the bitwidth of the first indication information in the DCI is determined according to the number of time unit offset values included in each of the at least one set of time unit offset values.

In some embodiments, the bitwidth of the first indication information in the DCI is determined according to the number of time unit offset values included in each of the at least one set of time unit offset values, specifically:

the bitwidth of the first indication information in the DCI is determined according to the maximum value of the number of time unit offset values included in each of the at least one set of time unit offset values.

In some embodiments, the RS resources are RS resources configured for the UE in one BWP/serving cell/frequency band.

In some embodiments, a set of time unit offset values of the RS resource is determined according to the following information, including:

the maximum time unit offset value configured by the network side, or the minimum time unit offset value and the maximum time unit offset value; or the number of bits N occupied by the first indication information in the DCI, or the number of bits N occupied by the first indication information in the DCI and a configured minimum time unit offset value.

In some embodiments, the time unit is a time slot, a sub-slot or a symbol.

In some embodiments, determining the first time unit offset value corresponding to the RS resource according to the first indication information in the DCI, includes at least one of the following:

determining a third RS resource that is not configured with at least one set of corresponding time unit offset values, and adopting a pre-agreed time unit offset value for the third RS resource;

determining a fourth RS resource which does not have a time unit offset value corresponding to the association indicated by the first indication information in the corresponding first time unit offset value set, and adopting a pre-agreed time unit offset value for the fourth RS resource, or adopting the minimum time unit offset value or the maximum time unit offset value or the time unit offset value of the specified position in the first time unit offset value set corresponding to the fourth RS resource.

Here, in FIG. 5, the bus architecture may include any number of interconnected buses and bridges, one or more processors represented by the processor 500 and various circuits of the memory represented by the memory 520 are linked together. The bus architecture can also link together various other circuits such as peripherals, voltage regulators, and power management circuits, etc., which are well known in the art and therefore will not be further described herein. The bus interface provides the interface. Transceiver 510 may be elements, including a transmitter and a receiver, providing a unit for communicating with various other devices over transmission media, including wireless channels, wired channels, fiber optic cables, etc. Transmission medium. For different user equipments, the user interface 530 may also be an interface capable of connecting externally and internally to required equipment, and the connected equipment includes but not limited to a keypad, a display, a speaker, a microphone, a joystick, and the like.

The processor 500 is responsible for managing the bus architecture and general processing, and the memory 520 can store data used by the processor 500 when performing operations.

In some embodiments, the processor 500 may be a CPU, ASIC, FPGA or CPLD, and the processor may also adopt a multi-core architecture.

The processor 500 is configured to implement any one of the methods provided in the embodiments of the present application according to the obtained executable instructions by invoking the computer program stored in the memory 520. The processor 500 and the memory 520 may also be arranged separately in physical.

It should be noted here that the aforementioned device provided by the embodiment of the present disclosure can realize all the method steps realized by the aforementioned method embodiment, and can achieve the same effect. The part and the beneficial effect are described in detail.

Figure 6:
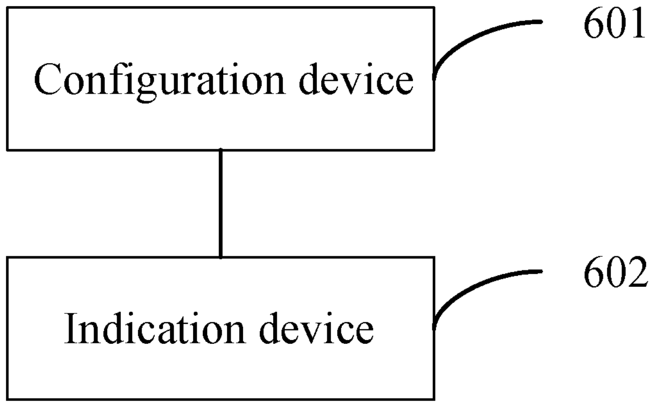
FIG. 6 is a schematic structural diagram of a RS transmission position indication apparatus according to an embodiment of the present application.

Embodiments of the present application further provide a reference signal RS transmission position indicating device, as shown in FIG. 6, including:

a configuration device 601 is configured to indicate to the UE at least one set of time unit offset values corresponding to each of the configured RS resources;

an indication device 602, configured to trigger at least one RS resource in the RS resources through downlink control information DCI, and send first indication information through the DCI.

The association between the first time unit offset value corresponding to each RS resource in the at least one RS resource and the first time unit offset value set corresponding to each RS resource is indicated by the same first indication information. The first time unit offset value is a time unit offset value corresponding to the transmission position of each RS resource, and the first time unit offset value set is one of the at least one set of time unit offset values.

In some embodiments, the at least one RS resource includes RS resources.

The associations between the first time unit offset value corresponding to each RS resource in the at least one RS resource and the first time unit offset value set corresponding to each RS resource are the same.

The first indication information indicates an association.

In some embodiments, the association between the first time unit offset value and the first time unit offset value set includes at least one of the following:

the first time unit offset value is a time unit offset value at a first position in the first time unit offset value set;

the first time unit offset value is a time unit offset value associated with the first triggering state in the first time unit offset value set;

the first time unit offset value is a time unit offset value identified as the first identifier in the first time unit offset value set.

The first position is a position indicated by the first indication information, the first triggering state is a triggering state indicated by the first indication information, and the first identifier is an identifier indicated by the first indication information.

In some embodiments, the first time unit offset value is a time unit offset value at the first position in the first time unit offset value set, any of the following:

the first time unit offset value is a time unit offset value of which sequence is the first sequence in the first time unit offset value set;

the first time unit offset value is a time unit offset value corresponding to the first sequence number in the first time unit offset value set.

The first sequence is the sequence indicated by the first indication information, and the first sequence number is the sequence number indicated by the first indication information.

In some embodiments, indicating to the UE at least one set of time unit offset values corresponding to the RS resource, including:

indicating to the UE at least one set of time unit offset values corresponding to the first RS resource set associated with the first RS resource among the RS resources, the first RS resource is an associated RS resource set, and the associated RS resource set includes RS resources configured with at least one set of time unit offset values, the first RS resource set is a set of RS resources associated with at least one of the first RS resources and configured with at least one set of time unit offset values.

Here, the at least one RS resource includes at least one first RS resource, and the first time unit offset value corresponding to the first RS resource is the second time unit offset value corresponding to the first RS resource set associated with the first RS resource. The first time unit offset value set corresponding to the first RS resource is the second time unit offset value set corresponding to the first RS resource set associated with the first RS resource.

The first indication information indicates the association between the second time unit offset value corresponding to at least part of the first RS resource sets associated with each first RS resource in the at least one first RS resource and the second time unit offset value set corresponding to each first RS resource set.

Specifically, indicating to the UE at least one set of time unit offset values corresponding to each of the configured RS resources, including:

indicating to the UE at least one set of time unit offset values corresponding to the first RS resource set to which the first RS resource belongs among the RS resources.

Here, the association between the second time unit offset value corresponding to the first RS resource set and the second time unit offset value set corresponding to the first RS resource set is indicated by the first indication information, and the second time unit offset value is a time unit offset value corresponding to the transmission position of the first RS resource set, and the second time unit offset value set is a set of time unit offset values corresponding to the first RS resource set.

In some embodiments, the first RS resource in the at least one RS resource includes first RS resources.

The associations between the second time unit offset value corresponding to each first RS resource set associated with the first RS resource in the at least one RS resource and the second time unit offset value set corresponding to each first RS resource set are the same.

The first indication information indicates an association.

In some embodiments, the association between the second time unit offset value and the second time unit offset value set includes at least one of the following:

the second time unit offset value is a time unit offset value at the first position in the second time unit offset value set;

the second time unit offset value is a time unit offset value associated with the first triggering state in the second time unit offset value set;

the second time unit offset value is a time unit offset value identified as the first identifier in the second time unit offset value set.

The first position is a position indicated by the first indication information, the first triggering state is a triggering state indicated by the first indication information, and the first identifier is an identifier indicated by the first indication information.

In some embodiments, the second time unit offset value is the time unit offset value at the first position in the second time unit offset value set, specifically:

the second time unit offset value is a time unit offset value of which sequence is the first sequence in the second time unit offset value set;

the second time unit offset value is a time unit offset value corresponding to the first sequence number in the second time unit offset value set.

The first sequence is the sequence indicated by the first indication information, and the first sequence number is the sequence number indicated by the first indication information.

In some embodiments, the second RS resource set is a set of time unit offset values corresponding to at least part of the triggering states in the first RS resource set, and the at least part of the triggering states include the triggering states indicated by the DCI.

The at least one second time unit offset value set corresponding to the second RS resource set is a set of time unit offset values corresponding to the triggering state indicated by the DCI.

In one embodiment, the second RS resource set is the first RS resource set of which at least parts of associated triggering states are configured with at least one set of time unit offset values in the first RS resource sets, and the at least parts of the associated triggering states include triggering states indicated by the DCI, and at least one second time unit offset value set corresponding to the first RS resource set, include at least one of the following:

a set of time unit offset values including time unit offset values respectively corresponding to each triggering state configured for the second RS resource set;

a set of time unit offset values including all time unit offset values corresponding to the first triggering state configured for the second RS resource set.

Here, the first triggering state is the corresponding triggering state when the DCI triggers the first RS resource set.

In some embodiments, the first time unit offset value set corresponding to at least one RS resource includes at least one of the following:

a set of time unit offset values including time unit offset values respectively corresponding to each triggering state configured for the RS resource;

a set of time unit offsets including all time unit offset values corresponding to the first triggering state configured for the first RS resource.

Here, the first triggering state is the corresponding triggering state when the DCI triggers the RS resource.

In some embodiments, indicating to the UE at least one set of time unit offset values corresponding to the RS resource, including:

for at least parts of the RS resources, independently configuring at least one set of time unit offset values corresponding to each RS resource.

In some embodiments, for at least parts of the RS resources, independently configuring at least one set of time unit offset values corresponding to each RS resource includes:

for at least one RS resource among at least parts of the RS resources, independently configuring at least one set of time unit offset values corresponding to each RS resource in at least a part of the triggering states.

In some embodiments, the RS resources indicated to the UE include multiple first RS resources, and indicating to the UE at least one set of time unit offset values corresponding to the RS resources, including:

for the at least part of first RS resource sets associated with the plurality of first RS resources, independently configuring at least one set of time unit offset values corresponding to each first RS resource set.

In some embodiments, the at least part of first RS resource sets associated with the multiple first RS resources include multiple second RS resource sets, and independently configuring at least one set of time unit offsets corresponding to each first RS resource set, including:

for at least part of the plurality of second RS resource sets, independently configuring at least one set of time unit offset values corresponding to each second RS resource set in each corresponding at least parts of the triggering states.

In some embodiments, indicating to the UE at least one set of time unit offset values corresponding to the RS resource, including:

indicating to the UE the configuration of the RS resource and at least one set of time unit offset values corresponding to the RS resource through RRC signaling; or indicating to the UE the configuration of the RS resource and at least one set of time unit offset values corresponding to the RS resource through MAC-CE signaling; or indicating to the UE the configuration of the RS resource and multiple time unit offset values correspond to the RS resource through RRC signaling, and indicating to the UE at least one set of time unit offset values among the multiple time unit offset values corresponding to at least part of the RS resources through MAC-CE signaling.

In some embodiments, the bitwidth of the first indication information in the DCI is indicated to the UE through RRC signaling or MAC-CE signaling.

That is, the bitwidth of the first indication information in the DCI is indicated to the UE through RRC signaling or MAC-CE signaling.

In some embodiments, the bitwidth of the first indication information in the DCI is a predefined fixed value.

In one embodiment, the bitwidth of the first indication information in the DCI is determined according to the number of time unit offset values included in each set of the at least one set of time unit offset values.

In some embodiments, the bitwidth of the first indication information in the DCI is determined according to the number of time unit offset values included in each set of the at least one set of time unit offset values, specifically:

the bitwidth of the first indication information in the DCI is determined according to the maximum number of time unit offset values included in each set of the at least one set of time unit offset values.

In some embodiments, the RS resources are RS resources configured for the UE in one BWP/serving cell/frequency band.

In some embodiments, a set of time unit offset values of the RS resource is indicated in the following manner:

configuring the maximum time unit offset value, or configuring the minimum time unit offset value and the maximum time unit offset value; or indicating the number of bits N occupied by the first indication information in the DCI, or indicating the number of bits N occupied by the first indication information in the DCI and configuring the minimum time unit offset value.

In some embodiments, the time unit is a time slot, a sub-slot or a symbol.

Figure 7:
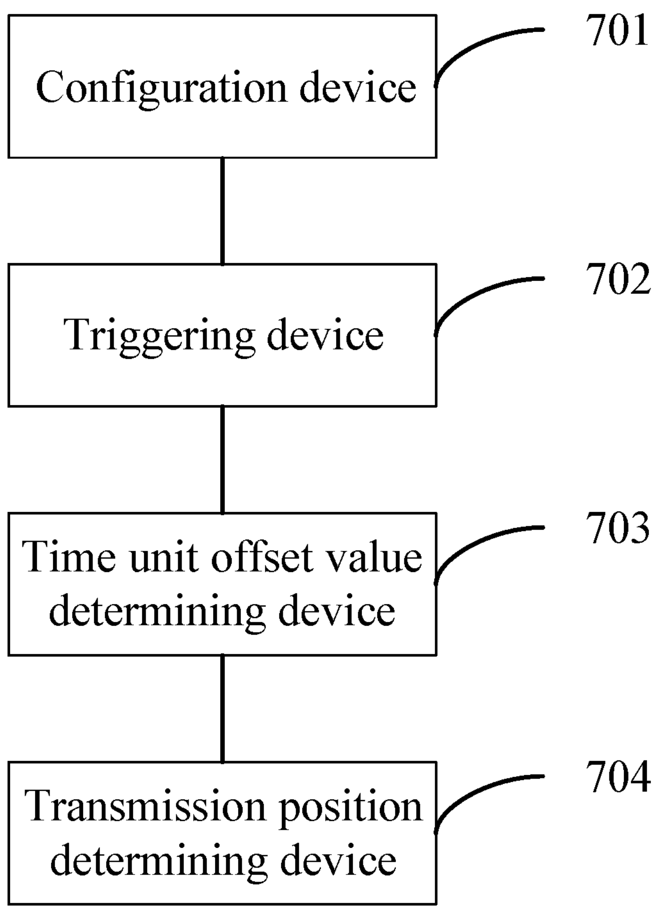
FIG. 7 is a schematic structural diagram of a RS transmission position determining apparatus according to an embodiment of the present application.

Correspondingly, embodiments of the present application further provide an apparatus for determining a reference signal RS transmission position, as shown in FIG. 7, including:

a configuration device 701 configured to determine at least one set of time unit offset values corresponding to the RS resource according to an instruction from the network side; a triggering device 702 configured to receive DCI sent by the network side, and determine at least one RS resource in the RS resources according to the DCI;

a time unit offset value determining device 703 configured to determine a first time unit offset value corresponding to the at least one RS resource according to the first indication information in the DCI;

a transmission position determining device 704 configured to determine the transmission position of the at least one RS resource according to the first time unit offset value corresponding to the at least one RS resource.

Here, the associations between the first time unit offset value corresponding to each RS resource in the at least one RS resource and the first time unit offset value set corresponding to each RS resource is indicated by the same first indication information. The first time unit offset value is a time unit offset value corresponding to the transmission position of each RS resource, and the first time unit offset value set is one of the at least one set of time unit offset values.

In some embodiments, the at least one RS resource includes RS resources.

The associations between the first time unit offset value corresponding to each RS resource in the at least one RS resource and the first time unit offset value set corresponding to each RS resource are the same.

The first indication information indicates an association.

In some embodiments, the associations between the first time unit offset value and the first time unit offset value set includes at least one of the following:

- the first time unit offset value is a time unit offset value at the first position in the first time unit offset value set;
- the first time unit offset value is a time unit offset value associated with the first triggering state in the first time unit offset value set;
- the first time unit offset value is a time unit offset value identified as the first identifier in the first time unit offset value set.

The first position is a position indicated by the first indication information, the first triggering state is a triggering state indicated by the first indication information, and the first identifier is an identifier indicated by the first indication information.

In some embodiments, the first time unit offset value is the time unit offset value at the first position in the first time unit offset value set, any of the following:

- the first time unit offset value is a time unit offset value of which sequence is the first sequence in the first time unit offset value set;
- the first time unit offset value is a time unit offset value corresponding to the first sequence number in the first time unit offset value set.

The first sequence is the sequence indicated by the first indication information, and the first sequence number is the sequence number indicated by the first indication information.

In some embodiments, determining at least one set of time unit offset values corresponding to the RS resource according to an instruction from the network side, includes:

- determining at least one set of time unit offsets corresponding to a first set of RS resources associated with the first RS resource among the RS resources indicated by the network side, where the first RS resource is an associated RS resource set and the associated RS resources set of RS resources are configured with at least one set of time unit offset values, the first RS resource set is an RS resource set associated with at least one of the first RS resources and configured with at least one set of time unit offset values.

Here, the at least one RS resource includes at least one first RS resource, and the first time unit offset value corresponding to the first RS resource is the second time unit offset value corresponding to the first RS resource set associated with the first RS resource. The first time unit offset value set corresponding to the first RS resource is the second time unit offset value set corresponding to the first RS resource set associated with the first RS resource.

The first indication information indicates an association between the second time unit offset value corresponding to at least parts of the first RS resource sets associated with each first RS resource in the at least one first RS resource and the second time unit offset value corresponding to each first RS resource set.

Specifically, determining at least one set of time unit offset values corresponding to the RS resource according to an instruction from the network side, includes:

- determining at least one set of time unit offsets corresponding to the first RS resource set to which the first RS resource belongs in the RS resources indicated by the network side.

Here, the association between the second time unit offset value corresponding to the first RS resource set and the second time unit offset value set corresponding to the first RS resource set is indicated by the first indication information, and the second time unit The unit offset value is a time unit offset value corresponding to the transmission position of the first RS resource set to which the first RS resource belongs, and the second time unit offset value set is a set of time unit offset values.

In some embodiments, the first RS resource in the at least one RS resource includes first RS resources.

The associations between the second time unit offset value corresponding to each first RS resource set associated with the first RS resource in the at least one RS resource and the second time unit offset value set corresponding to each first RS resource set are the same.

The first indication information indicates an association.

In some embodiments, the association between the second time unit offset value and the second time unit offset value set includes at least one of the following:

- the second time unit offset value is a time unit offset value at the first position in the second time unit offset value set; or
- the second time unit offset value is a time unit offset value associated with the first triggering state in the second time unit offset value set; or
- the second time unit offset value is the time unit offset value identified as the first identifier in the second time unit offset value set.

The first position is a position indicated by the first indication information, the first triggering state is a triggering state indicated by the first indication information, and the first identifier is an identifier indicated by the first indication information.

In some embodiments, the second time unit offset value is the time unit offset value at the first position in the second time unit offset value set, any of the following:

- the second time unit offset value is a time unit offset value of which sequence is the first sequence in the second time unit offset value set;
- the second time unit offset value is a time unit offset value corresponding to the first sequence number in the second time unit offset value set.

The first sequence is the sequence indicated by the first indication information, and the first sequence number is the sequence number indicated by the first indication information.

In some embodiments, the second RS resource set is a first RS resource set configured with at least one set of time unit offset values in at least parts of the triggering states in the first RS resource set, and the at least part of the triggering states include triggering states indicated by the DCI.

The at least one second time unit offset value set corresponding to the second RS resource set is a set of time unit offset values corresponding to the triggering state indicated by the DCI.

In some embodiments, at least one second time unit offset value set corresponding to the first RS resource set includes at least one of the following:

a set of time unit offset values including time unit offset values corresponding to each triggering state configured for the first RS resource set;

a set of time unit offset values including all time unit offset values corresponding to the first triggering state configured for the first set of RS resources.

Here, the first triggering state is the corresponding triggering state when the DCI triggers the first RS resource set.

In some embodiments, the second RS resource set is a first RS resource set configured with at least one set of time unit offset values in at least parts of the triggering states in the first RS resource set, and the at least part of the triggering states include triggering states indicated by the DCI; the first time unit offset value set corresponding to at least one RS resource, including at least one of the following:

a set of time unit offset values including time unit offset values respectively corresponding to each triggering state configured for the second RS resource;

a set of time unit offsets including all time unit offset values corresponding to the first triggering state configured for the second RS resource.

Here, the first triggering state is a corresponding triggering state when the DCI triggers the first RS resource.

In some embodiments, determining at least one set of time unit offset values corresponding to the RS resource according to an instruction from the network side, includes:

determining at least one set of time unit offset values corresponding to the RS resources according to at least one set of time unit offset values corresponding to each RS resource independently configured by the network side for at least part of the RS resources.

In some embodiments, determining at least one set of time unit offset values corresponding to the RS resource according to an instruction from the network side, includes:

determining at least one set of time unit offset values corresponding to the RS resource according to at least one set of time unit offset values corresponding to at least one RS resource in at least parts of the RS resources independently configured by the network side in at least part of the triggering state.

In some embodiments, the RS resources include multiple first RS resources, and determining at least one set of time unit offset values corresponding to the RS resources according to an instruction from the network side includes:

determining at least one set of the time unit offset value corresponding the RS source according to at least one set of time unit offset values corresponding to the first RS sources independently configured for the first RS resource set associated with at least parts of the plurality RS resources.

In some embodiments, the first RS resource set associated with at least parts of the plurality of first RS resources includes second RS resource sets. Determining at least one set of time unit offset values corresponding to the RS resource according to an instruction from the network side, includes:

determining at least one set of time unit offset values corresponding to the RS resource, by independently configuring via the network side at least parts of the plurality of the second RS resource sets with at least one set of time unit offset values corresponding to at least parts of the triggering states.

In some embodiments, determining at least one set of time unit offset values corresponding to the RS resource according to an instruction from the network side, includes:

determining the configuration of the RS resource and at least one set of time unit offset values corresponding the RS resource according to the RRC signaling sent by the network side; or determining the configuration of the RS resource and at least one set of time unit offset values corresponding the RS resource according to the MAC-CE signaling sent by the network side; or determining the configuration of the RS resource and multiple time unit offset values corresponding to the RS resource according to the RRC signaling sent by the network side, and determining at least one set of time unit offset values corresponding to the multiple time unit offset values corresponding to at least part of the RS resources according to the MAC-CE signaling sent by the network side.

In some embodiments, the bitwidth of the first indication information in the DCI is determined according to RRC signaling or MAC-CE signaling sent by the network side.

That is, the bitwidth of the first indication information in the DCI is determined through RRC signaling or MAC-CE signaling sent by the network side.

In some embodiments, the bitwidth of the first indication information in the DCI is a predefined fixed value.

In one embodiment, the bitwidth of the first indication information in the DCI is determined according to the number of time unit offset values included in each set of the at least one set of time unit offset values.

In some embodiments, the bitwidth of the first indication information in the DCI is determined according to the number of time unit offset values included in each set of the at least one set of time unit offset values, specifically:

the bitwidth of the first indication information in the DCI is determined according to the maximum number of time unit offset values included in each set of the at least one set of time unit offset values.

In some embodiments, the RS resources are RS resources configured for the UE in one BWP/serving cell/frequency band.

In some embodiments, a set of time unit offset values of the RS resource is determined according to the following information, including:

the maximum time unit offset value configured by the network side, or the minimum time unit offset value and the maximum time unit offset value.

In one embodiment, the number of bits N occupied by the first indication information in the DCI, or the number of bits N occupied by the first indication information in the DCI and a configured minimum time unit offset value.

In some embodiments, the time unit is a time slot, a sub-slot or a symbol.

In some embodiments, determining the first time unit offset value corresponding to the RS resource according to the first indication information in the DCI, includes at least one of the following:

determining a third RS resource that is not configured with at least one set of corresponding time unit offset values, and adopting a pre-agreed time unit offset value for the third RS resource;

determining a fourth RS resource corresponding to the time unit offset values without associations indicated by the first indication information in the first time unit offset values; adopting a pre-agreed time unit offset value for the fourth RS resource, or adopting the minimum time unit offset value or the maximum time unit offset value or the time unit offset value of the specified position in the first time unit offset value set corresponding to the fourth RS resource.

It should be noted that the division of units in the embodiment of the present application is schematic, and is only a logical function division, and there may be another division manner in actual implementation. In addition, each functional unit in each embodiment of the present application may be integrated into one processing unit, each unit may exist separately and physically, or two or more units may be integrated into one unit. The aforementioned integrated units can be implemented in the form of hardware or in the form of software functional units.

If the integrated unit is implemented in the form of a software function unit and sold or used as an independent product, it can be stored in a processor-readable storage medium. Based on this understanding, the essence of the embodiments of this application or the part that contributes to the prior art or all or part of the embodiments can be embodied in the form of a software product, and the computer software product is stored in a storage medium. Several instructions are included to make a computer device (which may be a personal computer, a server, or a network device, etc.) or a processor execute all or part of the steps of the methods described in the various embodiments of the present application. The aforementioned storage medium includes: U disk, mobile hard disk, read-only memory (Read-Only Memory, ROM), random access memory (Random Access Memory, RAM), magnetic disk or optical disk and other various media that can store program codes.

It should be noted here that the aforementioned device provided by the embodiment of the present disclosure can realize all the method steps realized by the aforementioned method embodiment, and can achieve the same effect. The part and the beneficial effect are described in detail.

Some embodiments of the present application also provide a processor-readable storage medium, the processor-readable storage medium stores a computer program, and the computer program is used to enable the processor to perform the reference signal RS transmission position indication method, or execute the method for determining the reference signal RS transmission position.

The processor-readable storage medium can be any available medium or data storage device that can be accessed by a processor, including but not limited to magnetic storage (e.g., floppy disk, hard disk, magnetic tape, magneto-optical disk (MO), etc.), optical storage (e.g., CD, DVD, BD, HVD, etc.), and semiconductor memory (such as ROM, EPROM, EEPROM, non-volatile memory (NAND FLASH), solid state disk (SSD)), etc.

The embodiments of the present application may be provided as methods, systems, or computer program products. Accordingly, the present application may take the form of an entirely hardware embodiment, an entirely software embodiment, or an embodiment combining software and hardware aspects. Furthermore, the present application may take the form of a computer program product embodied on one or more computer-usable storage media (including but not limited to disk storage and optical storage, etc.) having computer-usable program code embodied therein.

The present application is described with reference to flowcharts and/or block diagrams of methods, apparatus (systems), and computer program products according to embodiments of the present application. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, and instructions executed by the processor of the computer or other programmable data processing equipment produce means for realizing the functions specified in one or more procedures of the flowchart and/or one or more blocks of the block diagram.

These processor-executable instructions may also be stored in a processor-readable memory capable of directing a computer or other programmable data processing device to operate in a specific manner, and the instructions stored in the processor-readable memory produce a manufacturing product, the instruction device realizes the functions specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented The executed instructions provide steps for implementing the functions specified in the procedure or procedures of the flowchart and/or the block or blocks of the block diagrams.

What is claimed is:

1. A Reference Signal, RS, transmission position indication method, comprising:

indicating to a User Equipment, UE, at least one set of time unit offset values corresponding to RS resources; and triggering at least one of the RS resources through Downlink Control Information, DCI, and sending first indication information through the DCI;

wherein an association between a first time unit offset value corresponding to each RS resource in the at least one of the RS resources and a first time unit offset value set corresponding to the each RS resource is indicated by a same first indication information, and the first time unit offset value is a time unit offset value corresponding to a transmission position of the each RS resource, and the first time unit offset value set is one of the at least one set of time unit offset values.

2. The method according to claim 1, wherein the at least one of the RS resources comprises a plurality of RS resources;

the association between the first time unit offset value corresponding to each RS resource in the at least one of the RS resources and the first time unit offset value set corresponding to the each RS resource is the same; and the first indication information indicates one association.

3. The method according to claim 1, wherein the association between the first time unit offset value and the first time unit offset value set comprises at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

the first time unit offset value is a time unit offset value of which sequence is a first sequence in the first time unit offset value set; or the first time unit offset value is a time unit offset value corresponding to a first sequence number in the first time unit offset value set;

wherein the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

4. The method according to claim 1, wherein the indicating to the UE at least one set of time unit offset values corresponding to the RS resources, comprises:

indicating to the UE at least one set of time unit offset values corresponding to a first RS resource set to which a first RS resource belongs in the RS resources;

wherein an association between a second time unit offset value corresponding to the first RS resource set and a second time unit offset value set corresponding to the first RS resource set is indicated by the first indication information, and the second time unit offset value is a time unit offset value corresponding to a transmission position of the first RS resource set, and the second time unit offset value set is a set of time unit offset values corresponding to the first RS resource set.

5. The method according to claim 4, wherein the first RS resource in the at least one of the RS resources comprises a plurality of first RS resources;

the plurality of first RS resources belong to a plurality of first RS resource set;

the association between the second time unit offset value corresponding to the first RS resource set and the second time unit offset value set corresponding to the first RS resource set is the same for different first RS resource sets;

the first indication information indicates one association.

6. The method according to claim 4, wherein at least one of second time unit offset value sets corresponding to a second RS resource set is a set of time unit offset values corresponding to a triggering state indicated by the DCI;

wherein the second RS resource set is a first RS resource set satisfying following:

at least parts of triggering states are configured with at least one set of time unit offset values, and the at least parts of triggering states comprise triggering states indicated by the DCI; and/or at least one of second time unit offset value sets corresponding to a first RS resource set comprises at least one of following:

a set of time unit offset values comprising time unit offset values corresponding to each triggering state configured for a second RS resource set; or a set of time unit offset values comprising all time unit offset values corresponding to a first triggering state configured for a second RS resource set;

wherein the second RS resource set is a first RS resource set satisfying following:

at least parts of triggering states are configured with at least one set of time unit offset values, and the at least parts of triggering states comprise triggering states indicated by the DCI;

wherein the first triggering state is a triggering state when the DCI triggers the first RS resource set.

7. The method according to claim 1, wherein the indicating to the UE at least one set of time unit offset values corresponding to the RS resources, comprises:

for at least parts of the RS resources, independently configuring at least one set of time unit offset values corresponding to each RS resource;

wherein for at least parts of the RS resources, the independently configuring at least one set of time unit offset values corresponding to each RS resource, comprises:

for at least one RS resource in the at least parts of the RS resources, independently configuring at least one set of time unit offset values corresponding to at least parts of triggering states.

8. The method according to claim 4, wherein the RS resources indicated to the UE comprise a plurality of first RS resources; and the indicating to the UE at least one set of time unit offset values corresponding to the RS resources, comprises:

for at least parts of first RS resource sets associated with the first RS resources, independently configuring at least one set of time unit offset values corresponding to the respective first RS resource sets;

wherein the at least parts of first RS resource sets associated with the first RS resources comprise a plurality of second RS resource sets; and the independently configuring at least one set of time unit offset values corresponding to the respective first RS resource sets, comprising:

for at least parts of the second RS resource sets, independently configuring at least one set of time unit offset values corresponding to at least parts of triggering states.

9. A Reference Signal, RS, transmission position indication device comprising a memory, a transceiver, and a processor:

the memory is configured to store computer programs;

the transceiver is configured to send and receive data under the control of the processor;

the processor is configured to read the computer programs in the memory and perform the method according to claim 1.

10. A Reference Signal, RS, transmission position determination method, comprising:

determining at least one set of time unit offset values corresponding to RS resources;

receiving DCI sent by a network side, and determining at least one of the RS resources according to the DCI;

determining a first time unit offset value corresponding to the at least one of the RS resources according to first indication information in the DCI; and determining a transmission position of the at least one of the RS resources according to the first time unit offset value corresponding to the at least one of the RS resource;

wherein an association between the first time unit offset value corresponding to each RS resource in the at least one of the RS resources and a first time unit offset value set corresponding to the each RS resource is indicated by a same first indication information, and the first time unit offset value is a time unit offset value corresponding to the transmission position of the RS resource, and the first time unit offset value set is one of the at least one set of time unit offset values.

11. The method according to claim 10, wherein the at least one of the RS resources comprises a plurality of RS resources;

the association between the first time unit offset value corresponding to each RS resource in the at least one of the RS resources and the first time unit offset value set corresponding to the each RS resource is the same; and the first indication information indicates one association.

12. The method according to claim 10, wherein the association between the first time unit offset value and the first time unit offset value set comprises at least one of following:

the first time unit offset value is a time unit offset value at a first position in the first time unit offset value set;

the first time unit offset value is a time unit offset value associated with a first triggering state in the first time unit offset value set;

the first time unit offset value is a time unit offset value whose identifier is a first identifier in the first time unit offset value set;

the first time unit offset value is a time unit offset value of which sequence is a first sequence in the first time unit offset value set; or the first time unit offset value is a time unit offset value corresponding to a first sequence number in the first time unit offset value set;

wherein the first position is a position indicated by the first indication information, the first triggering state is a triggering state indicated by the first indication information, the first identifier is an identifier indicated by the first indication information, the first sequence is a sequence indicated by the first indication information, and the first sequence number is a sequence number indicated by the first indication information.

13. The method according to claim 10, wherein the determining the at least one set of time unit offset values corresponding to the RS resource, comprises:

determining at least one set of time unit offset values corresponding to a first RS resource set to which a first RS resource belongs in the RS resources indicated by the network side;

wherein an association between a second time unit offset value corresponding to the first RS resource set and a second time unit offset value set corresponding to the first RS resource set is indicated by the first indication information, and the second time unit offset value is a time unit offset value corresponding to a transmission position of the first RS resource set, and the second time unit offset value set is a set of time unit offset values.

14. The method according to claim 13, wherein the first RS resource in the at least one of the RS resources comprises a plurality of first RS resources;

the plurality of first RS resources belong to a plurality of first RS resource set;

the association between the second time unit offset value corresponding to the first RS resource set and the second time unit offset value set corresponding to the first RS resource set is the same for different first RS resource sets;

the first indication information indicates one association.

15. The method according to claim 13, wherein at least one of second time unit offset value sets corresponding to a second RS resource set is a set of time unit offset values corresponding to a triggering state indicated by the DCI;

wherein the second RS resource set is a first RS resource set satisfying following:

at least parts of triggering states are configured with at least one set of time unit offset values, and the at least parts of triggering states comprise triggering states indicated by the DCI; and/or at least one of second time unit offset value sets corresponding to a first RS resource set comprises at least one of following:

a set of time unit offset values comprising time unit offset values corresponding to each triggering state configured for the first RS resource set; or a set of time unit offset values comprising all time unit offset values corresponding to a first triggering state configured for the first RS resource set;

wherein the first triggering state is a triggering state when the DCI triggers the first RS resource set.

16. The method according to claim 10, wherein the determining the at least one set of time unit offset values corresponding to the RS resources, comprises:

determining at least one set of time unit offset values corresponding to the RS resources according to at least one set of time unit offset values corresponding to each RS resource independently configured by the network side for at least parts of the RS resources;

wherein the determining the at least one set of time unit offset values corresponding to the RS resources, comprises:

determining at least one set of time unit offset values corresponding to the RS resources according to at least one set of time unit offset values corresponding to at least one of parts of the RS resources independently configured by the network side in at least parts of triggering states.

17. The method according to claim 13, wherein the RS resources comprise a plurality of first RS resources; and the determining the at least one set of time unit offsets corresponding to the RS resources, comprises:

determining at least one set of time unit offset values corresponding to the RS resources according to at least one set of time unit offset values corresponding to each first RS resource set independently configured by the network side for the first RS resource set to which at least parts of the first RS resources belong;

wherein the first RS resource set associated with the at least parts of the first RS resources comprises a plurality of second RS resource sets; and the determining the at least one set of time unit offset values corresponding to the RS resources, comprises:

determining at least one set of time unit offset values corresponding to the RS resources according to at least one set of time unit offset values corresponding to at least parts of the second RS resource sets independently configured by the network side in at least parts of triggering states.

18. The method according to claim 10, wherein a bitwidth of the first indication information in the DCI is determined according to RRC signaling or MAC-CE signaling sent by the network side; or a bitwidth of the first indication information in the DCI is a predefined fixed value; or a bitwidth of the first indication information in the DCI is determined according to a quantity of time unit offset values comprised in the at least one set of time unit offset values; and/or wherein the RS resources are RS resources configured for the UE in a Bandwidth Part, BWP/serving cell/frequency band.

19. The method according to claim 10, wherein the determining the first time unit offset value corresponding to the at least one of the RS resources according to the first indication information in the DCI, comprises at least one of following:

determining a third RS resource that is not configured with at least one set of time unit offset values, and adopting a pre-agreed time unit offset value for the third RS resource;

determining a fourth RS resource of a time unit offset value which corresponds to the association indicated by the first indication information and is not in the first time unit offset value set, and adopting a pre-agreed time unit offset value for the fourth RS resource, or adopting a minimum time unit offset value or a maximum time unit offset value or a time unit offset value of a specified position in the first time unit offset value set corresponding to the fourth RS resource.

20. A Reference Signal, RS, transmission position determination device comprising a memory, a transceiver, and a processor:

the memory is configured to store computer programs;

the transceiver is configured to send and receive data under the control of the processor; and the processor is configured to read the computer programs in the memory and perform following operations:

determining at least one set of time unit offset values corresponding to RS resources;

receiving DCI sent by a network side, and determining at least one of the RS resources according to the DCI;

determining a first time unit offset value corresponding to the at least one of the RS resources according to first indication information in the DCI; and determining a transmission position of the at least one of the RS resources according to the first time unit offset value corresponding to the at least one of the RS resource;

wherein an association between the first time unit offset value corresponding to each RS resource in the at least one of the RS resources and a first time unit offset value set corresponding to the each RS resource is indicated by a same first indication information, and the first time unit offset value is a time unit offset value corresponding to the transmission position of the RS resource, and the first time unit offset value set is one of the at least one set of time unit offset values.

* * * * *